US007133529B2

(12) United States Patent
Ura

(10) Patent No.: US 7,133,529 B2
(45) Date of Patent: Nov. 7, 2006

(54) HOWLING DETECTING AND SUPPRESSING APPARATUS, METHOD AND COMPUTER PROGRAM PRODUCT

(75) Inventor: Takefumi Ura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 910 days.

(21) Appl. No.: 10/194,673

(22) Filed: Jul. 12, 2002

(65) Prior Publication Data

US 2003/0012388 A1 Jan. 16, 2003

(30) Foreign Application Priority Data

Jul. 16, 2001 (JP) ............................ 2001-215149

(51) Int. Cl.
*H04B 3/20* (2006.01)

(52) U.S. Cl. .................................... 381/66; 379/406.01

(58) Field of Classification Search .................. 381/66, 381/94.1, 94.3, 93, 83, 98, 103, 61, 71.11, 381/71.1, 71.8, 71.3, 71.14; 379/406.01–406.16
See application file for complete search history.

(56) References Cited

U.S. PATENT DOCUMENTS 5,677,987 A * 10/1997 Seki et al. .................. 704/226
5,729,614 A * 3/1998 Nagata et al. ................ 381/83
6,130,949 A * 10/2000 Aoki et al. ................ 381/94.3
6,480,610 B1 * 11/2002 Fang et al. ................. 381/321

FOREIGN PATENT DOCUMENTS

JP 7-143034 6/1995

* cited by examiner

*Primary Examiner*—Vivian Chin
*Assistant Examiner*—Lao Lun-See
(74) *Attorney, Agent, or Firm*—Pearne & Gordon LLP

(57) ABSTRACT

Herein disclosed a howling detecting and suppressing apparatus for detecting and suppressing howling sound components comprising: a frequency dividing processing section for converting a plurality of sound time signal segments each corresponding to a time segment into a plurality of sound frequency signal segments each corresponding to a frequency segment; a howling suppressing section for respectively adjusting gains for said sound frequency signal segments converted by said frequency dividing processing section to generate howling-suppressed sound frequency signal segments; a howling detecting section for judging whether a howling sound component is present or not for each of said howling-suppressed sound frequency signal segments generated by said howling suppressing section to detect howling sound frequency signal segments each in which it is judged that said howling sound component is present and non-howling sound frequency signal segments each in which it is judged that said howling sound component is not present; and a frequency synthesizing processing section for synthesizing said howling-suppressed sound frequency signal segments suppressed by said howling suppressing section to generate howling-suppressed sound time signal segments, whereby said howling suppressing section is operative to respectively adjust gains for said sound frequency signal segments converted by said frequency dividing processing section by changing the gains of said howling sound frequency signal segments detected by said howling detecting section and passing through said non-howling sound frequency signal segments detected by said howling detecting section.

54 Claims, 19 Drawing Sheets

| | |
|---|---|
| G | : Adjusted gain value |
| Gdown | : Reduced gain value |
| Gup | : Increased gain value |
| Gthr | : Gain through value |

G : Adjusted gain value
Gdown : Reduced gain value
Gup : Increased gain value
Gthr : Gain through value
a, b : Gain updating constant

HOWLING DETECTING AND SUPPRESSING APPARATUS, METHOD AND COMPUTER PROGRAM PRODUCT

BACKGROUND OF THE INVENTION

1. Field of the Invention

The present invention relates to a howling detecting and suppressing apparatus for, a howling detecting and suppressing method of, and a howling detecting and suppressing computer program product for automatically detecting and suppressing howling sound components occurred as a result of acoustic coupling between a speaker and a microphone, and an acoustic apparatus comprising the same.

2. Description of the Related Art

Up until now, there have been proposed a wide variety of howling detecting and suppressing apparatuses for automatically detecting and suppressing howling sound components occurred as a result of acoustic coupling between a speaker and a microphone. One of the conventional howling detecting and suppressing apparatuses of this type is disclosed, for example, in the Patent Application Laid-Open No. H07-143034.

One typical example of the howling detecting and suppressing apparatus will be described hereinlater with reference to FIG. 19. The conventional howling detecting and suppressing apparatus is shown in FIG. 19 as comprising an input terminal 1901, an A/D converter 1902, a plurality of notch filters 1903, a plurality of coefficient memories 1904, a D/A converter 1905, an output terminal 1906, a fast Fourier Transformation performing unit 1907, a judging unit 1908, a coefficient selecting means 1909, and a coefficient memory 1910. In the conventional howling detecting and suppressing apparatus, the input terminal 1901 connected with, for example, a microphone, not shown, is adapted to input an analog sound signal therethrough. The A/D converter 1902 is adapted to convert the analog sound signal inputted through by the input terminal 1901 into a digital sound signal including a plurality of frequency segments. The notch filters 1903 are connected in series with the A/D converter 1902. Each of the notch filters 1903 uniquely corresponds to a frequency segment and is adapted to filter the corresponding frequency segment of the digital sound signal in accordance with a coefficient stored in one of the coefficient memories 904 to suppress or pass through the corresponding frequency segment. Each of the coefficient memories 1904 uniquely connected to one of the notch filters 1903 and is adapted to store the coefficient to be used by the one of corresponding notch filters 1903. D/A converter 1905 is adapted to convert the digital sound signal including the frequency segments thus filtered through by all of the notch filters 1903 into a filtered analog sound signal. The output terminal 1906 is adapted to output the analog sound signal thus filtered to, for example, a speaker, not shown. The fast Fourier Transformation performing unit 1907 is adapted to analyze the frequency segments of the digital sound signal filtered through by all of the notch filters 1903 to generate analyzed frequency segment information. The judging unit 1908 is adapted to detect a peak frequency segment to be used to suppress and eliminate a howling sound component. The coefficient memory 1910 is adapted to store coefficients such as, for example, coefficients f0, f1, f2, . . . fn to be set to the notch filters 1903. The coefficient selecting means 1909 is adapted to select the coefficients to be respectively set to the notch filters 1903 on the basis of the peak frequency segment detected by the judging unit 1908 from among the coefficients f0, f1, f2, . . . fn stored in the coefficient memory 1910.

The operation of the conventional howling detecting and suppressing apparatus above stated will be described hereinlater. In the conventional howling detecting and suppressing apparatus, each of the notch filters 1903 is assumed to have flat frequency characteristics in their respective default states.

In the conventional howling detecting and suppressing apparatus, the input terminal 1901 connected with, for example, a microphone, not shown is operated to input an analog sound signal therethrough. The A/D converter 1902 is operated to convert the analog sound signal inputted through by the input terminal 1901 into a digital sound signal including a plurality of frequency segments. The notch filters 1903 connected in series with the A/D converter 1902 are operated to input the digital sound signal. Each of the notch filters 1903 is operated to filter one of the frequency segments of the digital sound signal in accordance with a coefficient stored in the corresponding one of the coefficient memories 1904 to suppress or pass through the one of the frequency segments of the corresponding frequency segment. The D/A converter 1905 is operated to convert the digital sound signal including a plurality of frequency segments thus filtered through by all of the notch filters 1903 into a filtered analog sound signal. The output terminal 1906 is operated to output the filtered analog sound signal to, for example, a speaker, not shown. The fast Fourier Transformation performing unit 1907 is operated to analyze the frequency segments of the digital sound signal filtered through by all of the notch filters 1903 by calculating power values of frequency segments to generate analyzed frequency segment information. The judging unit 1908 is operated to judge maximum and average power values of frequency segments to detect a maximum frequency segment on the basis of the analyzed frequency segment information generated by the fast Fourier Transformation performing unit 1907. Here, a maximum frequency segment is intended to mean a frequency segment having the maximum power value. A frequency segment having the maximum power value may also be referred to as a peak frequency segment.

The analog sound signal inputted through the input terminal 1901, for example, includes a howling sound component; the frequency segment containing the howling sound component will appear as a peak frequency segment because of the fact that the frequency segments containing the howling sound component have great power values. This means that the judging unit 1908 can detect a frequency segment containing a howling sound component as a maximum frequency segment.

More specifically, the judging unit 1908 is operated to judge maximum and average power values of frequency segments to detect a maximum frequency segment, i.e, a peak frequency segment, and judge if the ratio of the maximum power value to the average power value is greater than a predetermined threshold value or not. The judging unit 1908 is operated to determine that the maximum frequency segment contains a howling sound component if it is judged that the ratio of the maximum power value to the average power value is greater than the predetermined threshold value because of the fact that a frequency segment containing a howling sound component has a peak power value. Alternatively, the judging unit 1908 may count how many times it is judged that the ratio of the maximum power value to the average power value with respect to a maximum frequency segment is greater than the predetermined threshold value and determine that the maximum frequency segment contains a howling sound component if the number of times thus counted with respect to the maximum frequency segment exceeds a predetermined number because of the fact that the frequency segments containing howling sound components continuously maintain remarkably great power values. This means that the conventional howling detecting and suppressing apparatus thus constructed detects a howling frequency segment by judging whether the ratio of the maximum power value to the average power value is greater than a predetermined threshold value or not because of the fact that a frequency segment containing a frequency component has a peak power value.

The judging unit 1908 is operated to generate and transmit howling information indicating the maximum frequency segment thus determined to contain a howling sound component to the coefficient selecting means 1909. The coefficient selecting means 1909 is operated to select a coefficient specified for the howling frequency segment, for example, coefficient f0, to be set to one of the notch filters 1903 corresponding to the howling frequency segment from among the coefficient f0, f1, f2, . . . fn stored in the coefficient memory 1910. The coefficient selecting means 1909 is operated to transfer the thus selected coefficient f0 stored in the coefficient memory 1910 to the corresponding one of the coefficient memories 1904 uniquely connected to the one of the notch filters 1903 corresponding to the howling frequency segment. The one of the notch filters 1903 corresponding to the howling frequency segment is operated to filter the howling frequency segment in accordance with the coefficient f0 stored in the corresponding one of the coefficient memories 1904 to suppress and eliminate the howling sound component.

The conventional howling detecting and suppressing apparatus above described detects a howling frequency segment by judging whether the ratio of the maximum power value to the average power value is greater than a predetermined threshold value or not, making it possible to automatically and reliably detect the howling sound component regardless of whether the noise level of the inputted sound signal fluctuates.

Furthermore, the conventional howling detecting and suppressing apparatus above described comprises a plurality of notch filters 1903 each corresponding to a frequency segment to filter the corresponding frequency segment of the digital sound signal in accordance with a coefficient stored in the corresponding one of the coefficient memories 1904 to suppress or pass through the corresponding frequency segment, thereby enabling to automatically and reliably suppress the howling sound component.

The conventional howling detecting and suppressing apparatus, however, encounters a drawback that the conventional howling detecting and suppressing apparatus may erroneously detect a howling frequency segment when the conventional howling detecting and suppressing apparatus happens to input a sound signal containing a frequency segment with a remarkably great power value. This means that the conventional howling detecting and suppressing apparatus may erroneously detect a howling frequency segment when the power value of the frequency segment contained in the sound signal is remarkably great because of the fact that the conventional howling detecting and suppressing apparatus detects a howling sound component on the basis of the ratio of the maximum power value to the average power value.

The conventional howling detecting and suppressing apparatus, furthermore, encounters another drawback that the conventional howling detecting and suppressing must increase the number of the notch filters 1903 and coefficients f1 to fn in order to enhance the frequency resolution because of the fact that the conventional howling detecting and suppressing apparatus must comprise the number of notch filters 1903 equal to the number of frequency segments to be filtered. This means that the conventional howling detecting and suppressing apparatus is required to be large in the size in order to enhance the frequency resolution.

The present invention contemplates resolution of such problems.

SUMMARY OF THE INVENTION

It is, therefore, an object of the present invention to provide a howling detecting and suppressing apparatus which can eliminate the needs of the plurality of notch filters, thereby being simple in construction, and reliably, accurately, and promptly detect and suppress a howling sound component to enhance the sound quality.

It is another object of the present invention to provide a sound apparatus comprising a howling detecting and suppressing apparatus which can eliminate the needs of the plurality of notch filters, thereby being simple in construction, and reliably, accurately, and promptly detect and suppress a howling sound component to enhance the sound quality.

It is a further object of the present invention to provide a howling detecting and suppressing method which can eliminate the needs of the plurality of notch filters, and reliably, accurately, and promptly detect and suppress a howling sound component to enhance the sound quality.

It is a still further object of the present invention to provide a howling detecting and suppressing computer program product which can eliminate the needs of the plurality of notch filters, and reliably, accurately, and promptly detect and suppress a howling sound component to enhance the sound quality.

In accordance with a first aspect of the present invention, there is provided a howling detecting and suppressing apparatus for detecting and suppressing howling sound components comprising: a frequency dividing processing section for converting a plurality of sound time signal segments each corresponding to a time segment into a plurality of sound frequency signal segments each corresponding to a frequency segment; a howling suppressing section for respectively adjusting gains for the sound frequency signal segments converted by the frequency dividing processing section to generate howling-suppressed sound frequency signal segments; a howling detecting section for judging whether a howling sound component is present or not for each of the howling-suppressed sound frequency signal segments generated by the howling suppressing section to detect howling sound frequency signal segments each in which it is judged that the howling sound component is present and non-howling sound frequency signal segments each in which it is judged that the howling sound component is not present; and a frequency synthesizing processing section for synthesizing the howling-suppressed sound frequency signal segments suppressed by the howling suppressing section to generate howling-suppressed sound time signal segments. The aforesaid howling suppressing section may be operative to respectively adjust gains for the sound frequency signal segments converted by the frequency dividing processing section by changing the gains of the howling sound frequency signal segments detected by the howling detecting section and passing through the non-howling sound frequency signal segments detected by the howling detecting section.

The aforesaid frequency dividing processing section may be operative to convert a plurality of sound time signal segments collected for a predetermined number of sample periods into a plurality of sound frequency signal segments collectively forming one frame. The howling detecting section includes: a delay generator for respectively delaying the howling-suppressed sound frequency signal segments collectively forming a frame generated by the howling suppressing section for a predetermined number of frames to be outputted as reference frequency signal segments collectively forming a frame; an adaptive filter for respectively convolving the reference frequency signal segments outputted by the delay generator with coefficients to generate adapted reference frequency signal segments collectively forming a frame; a coefficient updating calculating section for respectively updating the coefficients on the basis of the sound howling-suppressed sound frequency signal segments generated by the howling suppressing section, the reference frequency signal segments outputted by the delay generator, and the adapted reference frequency signal segments generated by the adaptive filter; a frequency power calculating section for respectively calculating frequency signal powers of the adapted reference frequency signal segments collectively forming a frame generated by the adaptive filter; a smoothing processing section for respectively smoothing the frequency signal powers of the adapted reference frequency signal segments collectively forming a frame calculated by the frequency power calculating section to generate smoothed frequency signal powers of the adapted reference frequency signal segments collectively forming a frame; a total average frequency power calculating section for inputting the smoothed frequency signal powers of the adapted reference frequency signal segments collectively forming a frame generated by the smoothing processing section to calculate a total average value of the smoothed frequency signal powers of the frame; a power ratio calculating section for inputting frequency signal power ratios of the smoothed frequency signal powers of the adapted reference frequency signal segments collectively forming the frame generated by the smoothing processing section to respectively calculate frequency signal power ratios of the smoothed frequency signal powers of the adapted reference frequency signal segments thus inputted to the total average value of the frequency signal powers of the frame calculated by the total average frequency power calculating section to respectively generate frequency signal power ratios each corresponding to frequency segments in the frame; a power ratio comparing section for respectively comparing the frequency signal power ratios in the frame calculated by the power ratio calculating section with a predetermined first howling detecting threshold value to detect howling frequency signal power ratios and howling frequency segments respectively corresponding to the howling frequency signal power ratios in the frame each of which exceeds the first howling detecting threshold value from among the frequency signal power ratios; a target frame counting section for respectively counting the number of target frames in which the howling frequency signal power ratios are detected by the power ratio comparing section with respect to the howling frequency segments; and a howling judging section for judging whether a howling sound component is present or not for each of the howling frequency segments by comparing the number of target frames counted by the target frame counting section with respect to each of the howling frequency segments detected by the power ratio comparing section and a predetermined second howling detecting threshold value to detect howling sound frequency signal segments each in which it is judged that the howling sound component is present because of the fact that the number of target frames counted by the target frame counting section with respect to the howling frequency segment exceeds the second howling detecting threshold value and non-howling sound frequency signal segments each in which it is judged that the howling sound component is not present because of the fact that the number of target frames counted by the target frame counting section with respect to the howling frequency segment does not exceed the second howling detecting threshold value.

In the aforesaid howling detecting and suppressing apparatus, the howling detecting section may be operative to judge whether a howling sound component is present or not only for each of sound frequency signal segments corresponding to specified one or more frequency segments. Alternatively, the total average frequency power calculating section may be operative to input the smoothed frequency signal powers of the adapted reference frequency signal segments collectively forming a frame generated by the smoothing processing section, detect maximum and quasi-maximum smoothed frequency signal powers of maximum and quasi-maximum adapted reference frequency signal segments from among the smoothed frequency signal powers of the adapted reference frequency signal segments collectively forming a frame thus inputted, judge if any one or more of the maximum and quasi-maximum adapted reference frequency signal segments correspond to specified one or more frequency segments, and calculate a total average value of the smoothed frequency signal powers of the frame excluding one or more of the maximum and quasi-maximum adapted reference frequency signal segments corresponding to the specified one or more frequency segments when it is judged that the one or more of the maximum and quasi-maximum adapted reference frequency signal segments correspond to the specified one or more frequency segments.

In the aforesaid howling detecting and suppressing apparatus, the howling detecting section may generate judging information indicating a howling sound frequency signal segment corresponding to a howling frequency segment, transfer the judging information and the total average value of the smoothed frequency signal powers to the howling suppressing section, and stop operations of the total average frequency power calculating section, the power ratio calculating section, the power ratio comparing section, the target frame counting section, and the howling judging section with respect to the howling frequency segment when the howling detecting section detects the howling sound frequency signal segment, and the howling suppressing section may input judging information indicating a howling sound frequency signal segment corresponding to a howling frequency segment and the total average value of the smoothed frequency signal powers generated when the howling detecting section detects the howling sound frequency signal segment. The howling suppressing section may include: a reference power ratio calculating section provided with a storage unit for storing the total average value of the smoothed frequency signal powers generated when the howling detecting section detects the howling sound frequency signal segment, for calculating a reference power ratio by dividing a smoothed frequency signal power of an adapted reference frequency signal segment with respect to the howling frequency segment generated by the smoothing processing section by the total average value of the smoothed frequency signal powers stored in the storage unit to generate a reference power ratio with respect to the howling frequency segment; a reference power ratio comparing section for comparing the reference power ratio with respect to the howling frequency segment generated by the reference power ratio calculating section with a predetermined gain control threshold value to judge if the reference power ratio with respect to the howling frequency segment is to be processed in a gain adjusting manner on the basis of the result of the comparison; a frequency gain setting section for setting an adjusted gain value for the howling sound frequency signal segment when it is judged by the reference power ratio comparing section that the reference power ratio with respect to the howling frequency segment is to be processed in a gain adjusting manner or setting a gain through value for the howling sound frequency signal segment when it is judged by the reference power ratio comparing section that the reference power ratio with respect to the howling frequency segment is not to be processed in a gain adjusting manner to generate an adjusted gain value for the howling sound frequency signal segment; and a gain multiplying section for respectively adjusting gains for the sound frequency signal segments converted by the frequency dividing processing section by multiplying the gains of the howling sound frequency signal segments detected by the howling detecting section by the adjusted gain value generated by the frequency gain setting section, and passing through the non-howling sound frequency signal segments detected by the howling detecting section. The aforesaid reference power ratio comparing section may generate a control signal indicating that the reference power ratio comparing section is not operating with respect to the howling frequency segment to the howling detecting section when the reference power ratio comparing section judges that the reference power ratio with respect to the howling frequency segment is not to be processed in a gain adjusting manner. The howling detecting section may resume operations of the total average frequency power calculating section, the power ratio calculating section, the power ratio comparing section, the target frame counting section, and the howling judging section with respect to the howling frequency segment when the howling detecting section receives the control signal with respect to the howling frequency segment.

In the aforesaid howling detecting and suppressing apparatus, the howling suppressing section may change the gains of the howling sound frequency signal segments respectively corresponding to specified one or more frequency segments detected by the howling detecting section and pass through the non-howling sound frequency signal segments detected by the howling detecting section. The adjusted gain value may be a fixed value.

In the aforesaid howling detecting and suppressing apparatus, the frequency gain setting section may be provided with an adjusted gain value updating unit for updating the adjusted gain value by subtracting an adjusted gain updating constant from the adjusted gain value. The frequency gain setting section may set an adjusted gain value for the howling sound frequency signal segment and the adjusted gain value updating unit is operative to update the adjusted gain value by subtracting the adjusted gain updating constant from the adjusted gain value when it is judged by the reference power ratio comparing section that the reference power ratio with respect to the howling frequency segment is to be processed in a gain adjusting manner.

The frequency gain setting section may be provided with an adjusted gain value updating unit for updating the adjusted gain value by adding an adjusted gain updating constant to the adjusted gain value. The aforesaid frequency gain setting section may set an adjusted gain value for the howling sound frequency signal segment and the adjusted gain value updating unit is operative to update the adjusted gain value by adding the adjusted gain updating constant to the adjusted gain value when it is judged by the reference power ratio comparing section that the reference power ratio with respect to the howling frequency segment is to be processed in a gain adjusting manner.

The frequency gain setting section may be provided with an adjusted gain value updating unit for updating the adjusted gain value by multiplying the adjusted gain value with a adjusted gain updating coefficient. The frequency gain setting section may set an adjusted gain value for the howling sound frequency signal segment and the adjusted gain value updating unit is operative to update the adjusted gain value by multiplying the adjusted gain value with the adjusted gain updating coefficient when it is judged by the reference power ratio comparing section that the reference power ratio with respect to the howling frequency segment is to be processed in a gain adjusting manner.

The aforesaid reference power ratio comparing section may compare the reference power ratio with respect to the howling frequency segment generated by the reference power ratio calculating section with a predetermined gain control threshold value to judge if the reference power ratio with respect to the howling frequency segment is to be processed in a gain reducing manner, a gain restoring manner, or a gain through manner on the basis of the result of the comparison.

The frequency gain setting section may set a reduced gain value for the howling sound frequency signal segment when the reference power ratio comparing section judges that the reference power ratio with respect to the howling frequency segment is to be processed in the gain reducing manner, set an increased gain value for the howling sound frequency signal segment when the reference power ratio comparing section judges that the reference power ratio with respect to the howling frequency segment is to be processed in the gain restoring manner, or set a gain through value for the howling sound frequency signal segment when the reference power ratio comparing section judges that the reference power ratio with respect to the howling frequency segment is to be processed in the gain through manner.

The reference power ratio comparing section may generate a control signal indicating that the reference power ratio comparing section is not operating with respect to the howling frequency segment to the howling detecting section when the reference power ratio comparing section judges that the reference power ratio with respect to the howling frequency segment is to be processed in a gain through manner. The howling detecting section may resume operations of the total average frequency power calculating section, the power ratio calculating section, the power ratio comparing section, the target frame counting section, and the howling judging section with respect to the howling frequency segment when the howling detecting section receives the control signal with respect to the howling frequency segment.

The reference power ratio comparing section may compare the reference power ratio with respect to the howling frequency segment generated by the reference power ratio calculating section with a predetermined gain control threshold value to judge if the reference power ratio with respect to the howling frequency segment is to be processed in a plurality of gain reducing manners, a plurality of gain restoring manners, or a gain through manner on the basis of the result of the comparison.

The frequency gain setting section may set a specified reduced gain value for the howling sound frequency signal segment when the reference power ratio comparing section judges that the reference power ratio with respect to the howling frequency segment is to be processed in one of the gain reducing manners, the specified reduced gain value uniquely corresponding to the one of the gain reducing manners, set a specified increased gain value for the howling sound frequency signal segment when the reference power ratio comparing section judges that the reference power ratio with respect to the howling frequency segment is to be processed in one of the gain restoring manners, the specified increased gain value uniquely corresponding to the one of the gain restoring manners, or set a gain through value for the howling sound frequency signal segment when the reference power ratio comparing section judges that the reference power ratio with respect to the howling frequency segment is to be processed in the gain through manner.

The aforesaid reference power ratio comparing section may generate a control signal indicating that the reference power ratio comparing section is operating with respect to a howling frequency segment or the reference power ratio comparing section is not operating with respect to a howling frequency segment, The howling suppressing section further may include: a howling detecting threshold value updating section for judging whether the reference power ratio comparing section is operating or not on the basis of the control signal inputted from the reference power ratio comparing section to update the first howling detecting threshold value with respect to the howling frequency segment by decrementing the first howling detecting threshold value with respect to the howling frequency segment by a predetermined updating value to output the first howling detecting threshold value with respect to the howling frequency segment thus updated to the power ratio comparing section when it is judged that the reference power ratio comparing section is not operating with respect to the howling frequency segment on the basis of the control signal inputted from the reference power ratio comparing section; and a threshold value updating counting section for judging whether the first howling detecting threshold value with respect to the howling frequency segment updated by the howling detecting threshold value updating section is equal to an original first howling detecting threshold value with respect to the howling frequency segment or not, counting the number of frames in which it is judged that the reference power ratio comparing section is not operating with respect to the howling frequency segment on the basis of the control signal inputted from the reference power ratio comparing section when it is judged that the first howling detecting threshold value with respect to the howling frequency segment is not equal to the original first howling detecting threshold value with respect to the howling frequency segment, and judging whether the number of frames thus calculated with respect to the howling frequency segment is greater than a predetermined threshold value to update the first howling detecting threshold value with respect to the howling frequency segment by incrementing the first howling detecting threshold value with respect to the howling frequency segment by a predetermined increment value and output the first howling detecting threshold value with respect to the howling frequency segment thus updated to the howling detecting threshold value updating section when it is judged that the number of flames thus calculated with respect to the howling frequency segment is greater than the threshold value until the first howling detecting threshold value with respect to the howling frequency segment becomes equal to the original first howling detecting threshold value with respect to the howling frequency segment or output the first howling detecting threshold value with respect to the howling frequency segment updated by the howling detecting threshold value updating section to the howling detecting threshold value updating section when it is judged that the number of frames thus calculated with respect to the howling frequency segment is not greater than the threshold value.

The howling detecting threshold value updating section may output the first howling detecting threshold value with respect to the howling frequency segment thus outputted by the threshold value updating counting section to the power ratio comparing section when it is judged that the reference power ratio comparing section is operating with respect to the howling frequency segment on the basis of the control signal inputted from the reference power ratio comparing section. The power ratio comparing section may respectively compare the frequency segment power ratios in the frame calculated by the power ratio calculating section with the first howling detecting threshold value outputted by the howling detecting threshold value updating section to detect howling frequency segment power ratios and howling frequency segments respectively corresponding to the howling frequency segment power ratios in the frame each of which exceeds the first howling detecting threshold value from among the frequency segment power ratios.

In accordance with a second aspect of the present invention, there is provided a howling detecting and suppressing method of detecting and suppressing howling sound components comprising the steps of: (a) converting a plurality of sound time signal segments each corresponding to a time segment into a plurality of sound frequency signal segments each corresponding to a frequency segment; (b) respectively adjusting gains for the sound frequency signal segments converted in the step (a) to generate howling-suppressed sound frequency signal segments; (c) judging whether a howling sound component is present or not for each of the howling-suppressed sound frequency signal segments generated in the step (b) to detect howling sound frequency signal segments each in which it is judged that the howling sound component is present and non-howling sound frequency signal segments each in which it is judged that the howling sound component is not present; and (d) synthesizing the howling-suppressed sound frequency signal segments suppressed in the step (b) to generate howling-suppressed sound time signal segments.

The step (b) may have a step of respectively adjusting gains for the sound frequency signal segments converted in the step (a) by changing the gains of the howling sound frequency signal segments detected in the step (c) and passing through the non-howling sound frequency signal segments detected in the step (c).

In the aforesaid howling detecting and suppressing method, the step (a) has a step of converting a plurality of sound time signal segments collected for a predetermined number of sample periods into a plurality of sound frequency signal segments collectively forming one frame. The step (c) may include the steps of: (c1) respectively delaying the howling-suppressed sound frequency signal segments collectively forming a frame generated in the step (b) for a predetermined number of frames to be outputted as reference frequency signal segments collectively forming a frame; (c2) respectively convolving the reference frequency signal segments outputted in the step (c1) with coefficients to generate adapted reference frequency signal segments collectively forming a frame; (c3) respectively updating the coefficients on the basis of the sound howling-suppressed sound frequency signal segments generated in the step (b), the reference frequency signal segments outputted in the step (c1), and the adapted reference frequency signal segments generated in the step (c2); (c4) respectively calculating frequency signal powers of the adapted reference frequency signal segments collectively forming a frame generated in the step (c2); (c5) respectively smoothing the frequency signal powers of the adapted reference frequency signal segments collectively forming a frame calculated in the step (c4) to generate smoothed frequency signal powers of the adapted reference frequency signal segments collectively forming a frame; (c6) inputting the smoothed frequency signal powers of the adapted reference frequency signal segments collectively forming a frame generated in the step (c5) to calculate a total average value of the smoothed frequency signal powers of the frame; (c7) inputting frequency signal power ratios of the smoothed frequency signal powers of the adapted reference frequency signal segments collectively forming the frame generated in the step (c5) to respectively calculate frequency signal power ratios of the smoothed frequency signal powers of the adapted reference frequency signal segments thus inputted to the total average value of the frequency signal powers of the frame calculated in the step (c6) to respectively generate frequency signal power ratios each corresponding to frequency segments in the frame; (c8) respectively comparing the frequency signal power ratios in the frame calculated in the step (c7) with a predetermined first howling detecting threshold value to detect howling frequency signal power ratios and howling frequency segments respectively corresponding to the howling frequency signal power ratios in the frame each of which exceeds the first howling detecting threshold value from among the frequency signal power ratios; (c9) respectively counting the number of target frames in which the howling frequency signal power ratios are detected in the step (c8) with respect to the howling frequency segments; and (c10) judging whether a howling sound component is present or not for each of the howling frequency segments by comparing the number of target frames counted in the step (c9) with respect to each of the howling frequency segments detected in the step (c8) and a predetermined second howling detecting threshold value to detect howling sound frequency signal segments each in which it is judged that the howling sound component is present because of the fact that the number of target frames counted in the step (c9) with respect to the howling frequency segment exceeds the second howling detecting threshold value and non-howling sound frequency signal segments each in which it is judged that the howling sound component is not present because of the fact that the number of target frames counted in the step (c9) with respect to the howling frequency segment does not exceed the second howling detecting threshold value.

The aforesaid step (c) may have a step of judging whether a howling sound component is present or not only for each of sound frequency signal segments corresponding to specified one or more frequency segments. Alternatively, the aforesaid step (c6) may have steps of inputting the smoothed frequency signal powers of the adapted reference frequency signal segments collectively forming a frame generated in the step (c5), detecting maximum and quasi-maximum smoothed frequency signal powers of maximum and quasi-maximum adapted reference frequency signal segments from among the smoothed frequency signal powers of the adapted reference frequency signal segments collectively forming a frame thus inputted, judging if any one or more of the maximum and quasi-maximum adapted reference frequency signal segments correspond to specified one or more frequency segments, and calculating a total average value of the smoothed frequency signal powers of the frame excluding one or more of the maximum and quasi-maximum adapted reference frequency signal segments corresponding to the specified one or more frequency segments when it is judged that the one or more of the maximum and quasi-maximum adapted reference frequency signal segments correspond to the specified one or more frequency segments.

The aforesaid step (c) may have steps of generating judging information indicating a howling sound frequency signal segment corresponding to a howling frequency segment, transferring the judging information and the total average value of the smoothed frequency signal powers to the step (b), and stopping operations of the step (c6), the step (c7), the step (c8), the step (c9), and the step (c10) with respect to the howling frequency segment when the howling sound frequency signal segment is detected in the step (c), and the step (b) has a step of inputting judging information indicating a howling sound frequency signal segment corresponding to a howling frequency segment and the total average value of the smoothed frequency signal powers generated when the howling sound frequency signal segment is detected in the step (c), The step (b) may include the steps of: (b1-1) storing the total average value of the smoothed frequency signal powers generated when the howling sound frequency signal segment is detected in the step (c); (b1) calculating a reference power ratio by dividing a smoothed frequency signal power of an adapted reference frequency signal segment with respect to the howling frequency segment generated in the step (c5) in the total average value of the smoothed frequency signal powers stored in the step (b1-1) to generate a reference power ratio with respect to the howling frequency segment; (b2) comparing the reference power ratio with respect to the howling frequency segment generated in the step (b1) with a predetermined gain control threshold value to judge if the reference power ratio with respect to the howling frequency segment is to be processed in a gain adjusting manner on the basis of the result of the comparison; (b3) setting an adjusted gain value for the howling sound frequency signal segment when it is judged in the step (b2) that the reference power ratio with respect to the howling frequency segment is to be processed in a gain adjusting manner or setting a gain through value for the howling sound frequency signal segment when it is judged in the step (b2) that the reference power ratio with respect to the howling frequency segment is not to be processed in a gain adjusting manner to generate an adjusted gain value for the howling sound frequency signal segment; and (b4) respectively adjusting gains for the sound frequency signal segments converted in the step (a) by multiplying the gains of the howling sound frequency signal segments detected in the step (c) in the adjusted gain value generated in the step (b3), and passing through the non-howling sound frequency signal segments detected in the step (c). The aforesaid step (b2) may have a step of generating a control signal indicating that the step (b2) is not operating with respect to the howling frequency segment to the step (c) when it is judged in the step (b2) that the reference power ratio with respect to the howling frequency segment is not to be processed in a gain adjusting manner. The aforesaid signal step (c) may have a step of resuming operations of the step (c6), the step (c7), the step (c8), the step (c9), and the step (c10) with respect to the howling frequency segment when the control signal with respect to the howling frequency segment is received in the step (c).

In accordance with a third aspect of the present invention, there is provided a computer program product comprising a computer usable storage medium having computer readable code embodied therein for detecting and suppressing howling sound components, the computer readable code comprising: a computer readable program code (a) for converting a plurality of sound time signal segments each corresponding to a time segment into a plurality of sound frequency signal segments each corresponding to a frequency segment; a computer readable program code (b) for respectively adjusting gains for the sound frequency signal segments converted by the computer readable program code (a) to generate howling-suppressed sound frequency signal segments; a computer readable program code (c) for judging whether a howling sound component is present or not for each of the howling-suppressed sound frequency signal segments generated by the computer readable program code (b) to detect howling sound frequency signal segments each in which it is judged that the howling sound component is present and non-howling sound frequency signal segments each in which it is judged that the howling sound component is not present; and a computer readable program code (d) for synthesizing the howling-suppressed sound frequency signal segments suppressed by the computer readable program code (b) to generate howling-suppressed sound time signal segments.

The aforesaid computer readable program code (b) may have a computer readable program code for respectively adjusting gains for the sound frequency signal segments converted by the computer readable program code (a) by changing the gains of the howling sound frequency signal segments detected by the computer readable program code (c) and passing through the non-howling sound frequency signal segments detected by the computer readable program code (c).

The aforesaid computer readable program code (a) may have a computer readable program code for converting a plurality of sound time signal segments collected for a predetermined number of sample periods into a plurality of sound frequency signal segments collectively forming one frame. The computer readable program code (c) may include: a computer readable program code (c1) for respectively delaying the howling-suppressed sound frequency signal segments collectively forming a frame generated by the computer readable program code (b) for a predetermined number of frames to be outputted as reference frequency signal segments collectively forming a frame; a computer readable program code (c2) for respectively convolving the reference frequency signal segments outputted by the computer readable program code (c1) with coefficients to generate adapted reference frequency signal segments collectively forming a frame; a computer readable program code (c3) for respectively updating the coefficients on the basis of the sound howling-suppressed sound frequency signal segments generated by the computer readable program code (b), the reference frequency signal segments outputted by the computer readable program code (c1), and the adapted reference frequency signal segments generated by the computer readable program code (c2); a computer readable program code (c4) for respectively calculating frequency signal powers of the adapted reference frequency signal segments collectively forming a frame generated by the computer readable program code (c2); a computer readable program code (c5) for respectively smoothing the frequency signal powers of the adapted reference frequency signal segments collectively forming a frame calculated by the computer readable program code (c4) to generate smoothed frequency signal powers of the adapted reference frequency signal segments collectively forming a frame; a computer readable program code (c6) for inputting the smoothed frequency signal powers of the adapted reference frequency signal segments collectively forming a frame generated by the computer readable program code (c5) to calculate a total average value of the smoothed frequency signal powers of the frame; a computer readable program code (c7) for inputting frequency signal power ratios of the smoothed frequency signal powers of the adapted reference frequency signal segments collectively forming the frame generated by the computer readable program code (c5) to respectively calculate frequency signal power ratios of the smoothed frequency signal powers of the adapted reference frequency signal segments thus inputted to the total average value of the frequency signal powers of the frame calculated by the computer readable program code (c6) to respectively generate frequency signal power ratios each corresponding to frequency segments in the frame; a computer readable program code (c8) for respectively comparing the frequency signal power ratios in the frame calculated by the computer readable program code (c7) with a predetermined first howling detecting threshold value to detect howling frequency signal power ratios and howling frequency segments respectively corresponding to the howling frequency signal power ratios in the frame each of which exceeds the first howling detecting threshold value from among the frequency signal power ratios; a computer readable program code (c9) for respectively counting the number of target frames in which the howling frequency signal power ratios are detected by the computer readable program code (c8) with respect to the howling frequency segments; and a computer readable program code (c10) for judging whether a howling sound component is present or not for each of the howling frequency segments by comparing the number of target frames counted by the computer readable program code (c9) with respect to each of the howling frequency segments detected by the computer readable program code (c8) and a predetermined second howling detecting threshold value to detect howling sound frequency signal segments each in which it is judged that the howling sound component is present because of the fact that the number of target frames counted by the computer readable program code (c9) with respect to the howling frequency segment exceeds the second howling detecting threshold value and non-howling sound frequency signal segments each in which it is judged that the howling sound component is not present because of the fact that the number of target frames counted by the computer readable program code (c9) with respect to the howling frequency segment does not exceed the second howling detecting threshold value.

The computer readable program code (c) may have a computer readable program code for judging whether a howling sound component is present or not only for each of sound frequency signal segments corresponding to specified one or more frequency segments.

The aforesaid computer readable program code (c6) may have computer readable program codes for inputting the smoothed frequency signal powers of the adapted reference frequency signal segments collectively forming a frame generated by the computer readable program code (c5), detecting maximum and quasi-maximum smoothed frequency signal powers of maximum and quasi-maximum adapted reference frequency signal segments from among the smoothed frequency signal powers of the adapted reference frequency signal segments collectively forming a frame thus inputted, judging if any one or more of the maximum and quasi-maximum adapted reference frequency signal segments correspond to specified one or more frequency segments, and calculating a total average value of the smoothed frequency signal powers of the frame excluding one or more of the maximum and quasi-maximum adapted reference frequency signal segments corresponding to the specified one or more frequency segments when it is judged that the one or more of the maximum and quasi-maximum adapted reference frequency signal segments correspond to the specified one or more frequency segments.

The aforesaid computer readable program code (c) may have computer readable program codes for generating judging information indicating a howling sound frequency signal segment corresponding to a howling frequency segment, transferring the judging information and the total average value of the smoothed frequency signal powers to the computer readable program code (b), and stopping operations of the computer readable program code (c6), the computer readable program code (c7), the computer readable program code (c8), the computer readable program code (c9), and the computer readable program code (c10) with respect to the howling frequency segment when the howling sound frequency signal segment is detected by the computer readable program code (c).

The aforesaid computer readable program code (b) may have a computer readable program code for inputting judging information indicating a howling sound frequency signal segment corresponding to a howling frequency segment and the total average value of the smoothed frequency signal powers generated when the howling sound frequency signal segment is detected by the computer readable program code (c), The computer readable program code (b) may include: a computer readable program code (b1-1) for storing the total average value of the smoothed frequency signal powers generated when the howling sound frequency signal segment is detected by the computer readable program code (c); a computer readable program code (b1) for calculating a reference power ratio by dividing a smoothed frequency signal power of an adapted reference frequency signal segment with respect to the howling frequency segment generated by the computer readable program code (c5) in the total average value of the smoothed frequency signal powers stored by the computer readable program code (b1-1) to generate a reference power ratio with respect to the howling frequency segment; a computer readable program code (b2) for comparing the reference power ratio with respect to the howling frequency segment generated by the computer readable program code (b1) with a predetermined gain control threshold value to judge if the reference power ratio with respect to the howling frequency segment is to be processed in a gain adjusting manner on the basis of the result of the comparison; a computer readable program code (b3) for setting an adjusted gain value for the howling sound frequency signal segment when it is judged by the computer readable program code (b2) that the reference power ratio with respect to the howling frequency segment is to be processed in a gain adjusting manner or setting a gain through value for the howling sound frequency signal segment when it is judged by the computer readable program code (b2) that the reference power ratio with respect to the howling frequency segment is not to be processed in a gain adjusting manner to generate an adjusted gain value for the howling sound frequency signal segment; and a computer readable program code (b4) for respectively adjusting gains for the sound frequency signal segments converted by the computer readable program code (a) by multiplying the gains of the howling sound frequency signal segments detected by the computer readable program code (c) in the adjusted gain value generated by the computer readable program code (b3), and passing through the non-howling sound frequency signal segments detected by the computer readable program code (c).

The aforesaid computer readable program code (b2) may have a computer readable program code for generating a control signal indicating that the computer readable program code (b2) is not operating with respect to the howling frequency segment to the computer readable program code (c) when it is judged by the computer readable program code (b2) that the reference power ratio with respect to the howling frequency segment is not to be processed in a gain adjusting manner.

The signal computer readable program code (c) may have a computer readable program code for resuming operations of the computer readable program code (c6), the computer readable program code (c7), the computer readable program code (c8), the computer readable program code (c9), and the computer readable program code (c10) with respect to the howling frequency segment when the control signal with respect to the howling frequency segment is received by the computer readable program code (c).

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Figure 1:
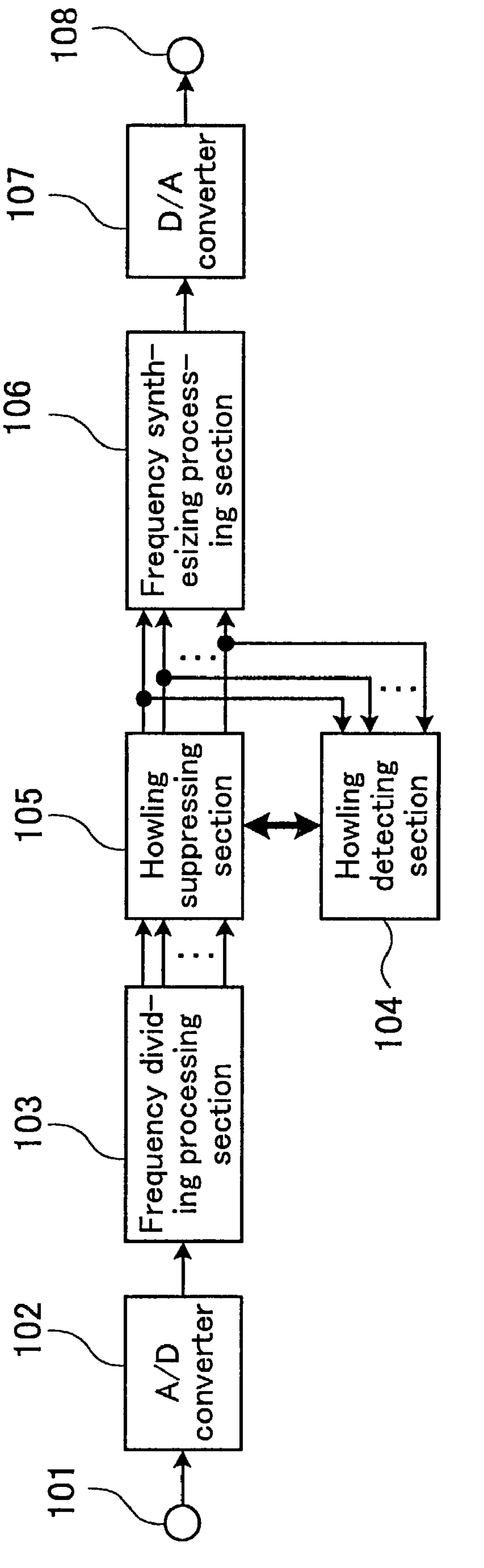
FIG. 1 is a block diagram of a first preferred embodiment of the howling detecting and suppressing apparatus according to the present invention.

Referring now to FIGS. 1 through 4 of the drawings, there is shown a first preferred embodiment of the howling detecting and suppressing apparatus according to the present invention. The first embodiment of the howling detecting and suppressing apparatus is shown in FIG. 1 as comprising an input terminal 101, an A/D converter 102, a frequency dividing processing section 103, a howling detecting section 104, a howling suppressing section 105, a frequency synthesizing processing section 106, a D/A converter 107, and an output terminal 108.

In the howling detecting and suppressing apparatus, the input terminal 101 is connected with, for example but not limited to, a microphone, not shown. The input terminal 101 is adapted to input an analog sound signal therethrough. The A/D converter 102 is adapted to convert the analog sound signal inputted through by the input terminal 101 into a digital sound signal including a plurality of sound time signal segments. Each of the sound time signal segments corresponds to a time segment. The frequency dividing processing section 103 is adapted to input the digital sound signal including a plurality of sound time signal segments converted by the A/D converter 102 and convert the plurality of sound time signal segments each corresponding to a time segment into a plurality of sound frequency signal segments each corresponding to a frequency segment.

The howling suppressing section 105 is operative to respectively adjust gains for the sound frequency signal segments converted by the frequency dividing processing section 103 to generate howling-suppressed sound frequency signal segments. The howling detecting section 104 is adapted to judge whether a howling sound component is present or not for each of the howling-suppressed sound frequency signal segments generated by the howling suppressing section 105 to detect howling sound frequency signal segments each in which it is judged that the howling sound component is present and non-howling sound frequency signal segments each in which it is judged that the howling sound component is not present. The frequency synthesizing processing section 106 is adapted to synthesize the howling-suppressed sound frequency signal segments suppressed by the howling suppressing section 105 to generate howling-suppressed sound time signal segments collectively forming a howling-suppressed digital sound signal. The D/A converter 107 is adapted to convert the howling-suppressed sound time signal segments collectively forming a howling-suppressed digital sound signal generated by the frequency synthesizing processing section 106 into a howling-suppressed analog sound signal. The output terminal 108 connected with, for example but not limited to, a speaker, not shown, is adapted to output the howling-suppressed analog sound signal converted by the D/A converter 107 therethrough.

More specifically, the howling suppressing section 105 is operative to respectively adjust the gains for the sound frequency signal segments converted by the frequency dividing processing section 103 by changing the gains of the howling sound frequency signal segments detected by the howling detecting section 104 and passing through the non-howling sound frequency signal segments detected by the howling detecting section 104. The howling detecting and suppressing apparatus thus constructed can automatically detect and suppress howling sound components occurred as a result of acoustic coupling, for example, between a speaker and a microphone.

The howling detecting section 104 of the first embodiment of the howling detecting and suppressing apparatus according to the present invention will be described in detail with reference to FIG. 2, hereinlater.

Figure 2:
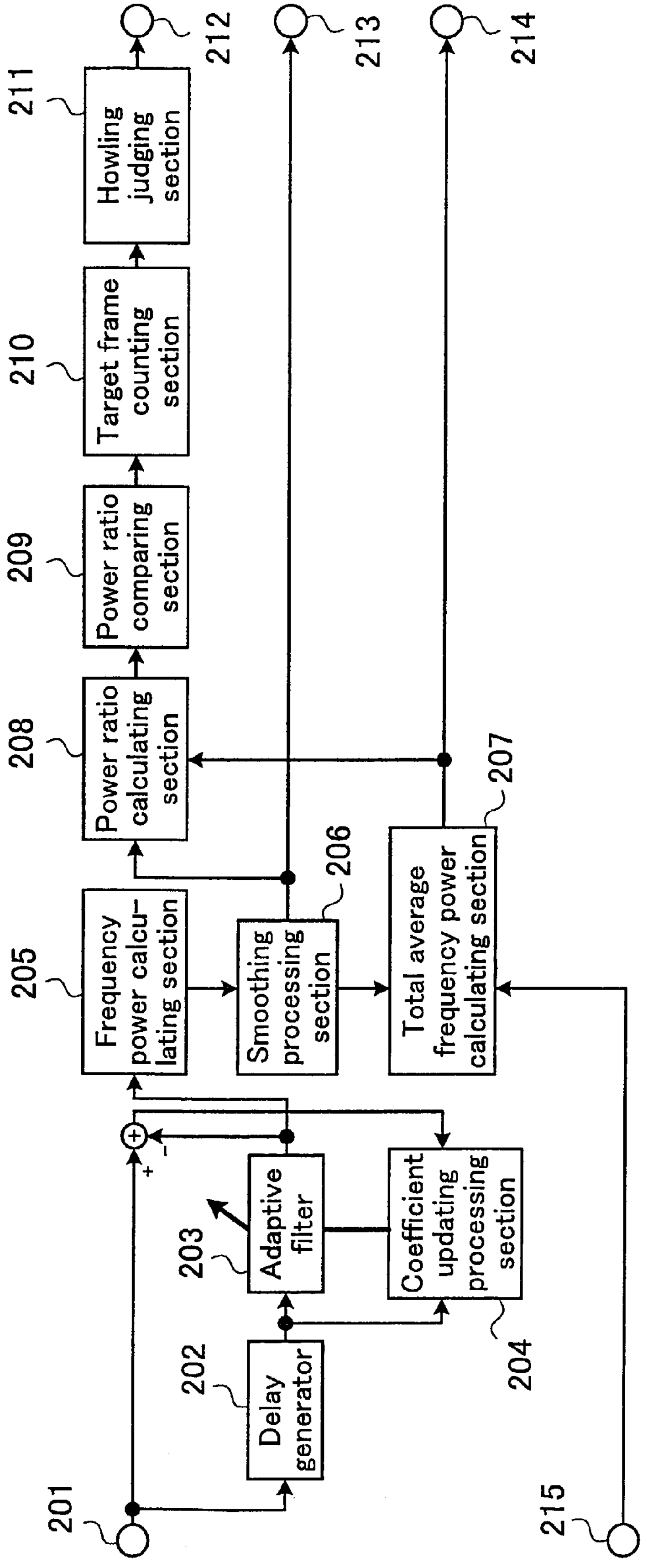
FIG. 2 is a block diagram of a howling detecting section forming part of the howling detecting and suppressing apparatus shown in FIG. 1.

The howling detecting section 104 of the first embodiment of the howling detecting and suppressing apparatus is shown in FIG. 2 as comprising an input terminal 201, an input terminal 215, a delay generator 202, an adaptive filter 203, a coefficient updating calculating section 204, a frequency power calculating section 205, a smoothing processing section 206, a total average frequency power calculating section 207, a power ratio calculating section 208, a power ratio comparing section 209, a target frame counting section 210, a howling judging section 211, an output terminal 213, and an output terminal 214.

The frequency dividing processing section 103 is operative to convert a plurality of sound time signal segments collected for a predetermined number of sample periods into a plurality of sound frequency signal segments collectively forming one frame. The howling suppressing section 105 is operative to respectively adjust gains for the sound frequency signal segments collectively forming a frame converted by the frequency dividing processing section 103 to generate howling-suppressed sound frequency signal segments collectively forming a frame.

The input terminal 201 is adapted to input the howling-suppressed sound frequency signal segments collectively forming a frame generated by the howling suppressing section 105 therethrough. The input terminal 215 is adapted to input a control signal indicating the operation state of the howling suppressing section 105, which will be described later, from the howling suppressing section 105. The total average frequency power calculating section 207 is adapted to input the control signal from the input terminal 215.

The delay generator 202 is adapted to respectively delay the howling-suppressed sound frequency signal segments collectively forming a frame inputted by the input terminal 201 for a predetermined number of frames to be outputted as reference frequency signal segments collectively forming a frame. The adaptive filter 203 is adapted to respectively convolve the reference frequency signal segments outputted by the delay generator 202 with coefficients to generate adapted reference frequency signal segments collectively forming a frame.

The coefficient updating calculating section 204 is adapted to respectively update the coefficients on the basis of the sound howling-suppressed sound frequency signal segments generated by the howling suppressing section 105 inputted by the input terminal 201, the reference frequency signal segments outputted by the delay generator 202, and the adapted reference frequency signal segments generated by the adaptive filter 203.

The frequency power calculating section 205 is adapted to respectively calculate frequency signal powers of the adapted reference frequency signal segments collectively forming a frame generated by the adaptive filter 203. The smoothing processing section 206 is adapted to respectively smooth the frequency signal powers of the adapted reference frequency signal segments collectively forming a frame calculated by the frequency power calculating section 205 to generate smoothed frequency signal powers of the adapted reference frequency signal segments collectively forming a frame. The output terminal 213 is adapted to output the smoothed frequency signal powers of the adapted reference frequency signal segments collectively forming a frame generated by the smoothing processing section 206 to the howling suppressing section 105.

The total average frequency power calculating section 207 is adapted to input the smoothed frequency signal powers of the adapted reference frequency signal segments collectively forming a frame generated by the smoothing processing section 206 to calculate a total average value of the smoothed frequency signal powers of the frame. The output terminal 214 is adapted to output the total average value of the smoothed frequency signal powers of the frame calculated by the total average frequency power calculating section 207 to the howling suppressing section 105.

The power ratio calculating section 208 is adapted to input frequency signal power ratios of the smoothed frequency signal powers of the adapted reference frequency signal segments collectively forming the frame generated by the smoothing processing section 206 to respectively calculate frequency signal power ratios of the smoothed frequency signal powers of the adapted reference frequency signal segments thus inputted to the total average value of the frequency signal powers of the frame calculated by the total average frequency power calculating section 207 to respectively generate frequency signal power ratios each corresponding to frequency segments in the frame.

The power ratio comparing section 209 is adapted to respectively compare the frequency signal power ratios in the frame calculated by the power ratio calculating section 208 with a predetermined first howling detecting threshold value to detect howling frequency signal power ratios and howling frequency segments respectively corresponding to the howling frequency signal power ratios in the frame each of which exceeds the first howling detecting threshold value from among the frequency signal power ratios.

The target frame counting section 210 is adapted to respectively count the number of target frames in which the howling frequency signal power ratios are detected by the power ratio comparing section 209 with respect to the howling frequency segments. The howling judging section 211 is adapted to judge whether a howling sound component is present or not for each of the howling frequency segments by comparing the number of target frames counted by the target frame counting section 210 with respect to each of the howling frequency segments detected by the power ratio comparing section 209 and a predetermined second howling detecting threshold value to detect howling sound frequency signal segments each in which it is judged that the howling sound component is present because of the fact that the number of target frames counted by the target frame counting section 210 with respect to the howling frequency segment exceeds the second howling detecting threshold value and non-howling sound frequency signal segments each in which it is judged that the howling sound component is not present because of the fact that the number of target frames counted by the target frame counting section 210 with respect to the howling frequency segment does not exceed the second howling detecting threshold value.

The howling judging section 211 is adapted to generate judging information indicating howling frequency signal segments respectively corresponding to howling frequency segments, which will be described later, when howling sound frequency segments are detected. The output terminal 212 is adapted to output the judging information to the howling suppressing section 105. Furthermore, the howling detecting section 104 is operative to stop the operations of the total average frequency power calculating section 207, the power ratio calculating section 208, the power ratio comparing section 209, the target frame counting section 210, and the howling judging section 211 with respect to a howling frequency segment when the howling judging section 211 detect a howling sound frequency segment with respect to the howling frequency segment.

The howling suppressing section 105 of the first embodiment of the howling detecting and suppressing apparatus according to the present invention will be described in detail with reference to FIG. 3, hereinlater.

As described earlier, the howling detecting section 104 is operative to generate judging information indicating a howling sound frequency signal segment corresponding to a howling frequency segment, transfer the judging information through the output terminals 212 and the total average value of the smoothed frequency signal powers through the output terminal 214 to the howling suppressing section 105 and stop operations of the total average frequency power calculating section 207, the power ratio calculating section 208, the power ratio comparing section 209, the target frame counting section 210, and the howling judging section 211 with respect to the howling frequency segment when the howling detecting section 104 detects the howling sound frequency signal segment.

Figure 3:
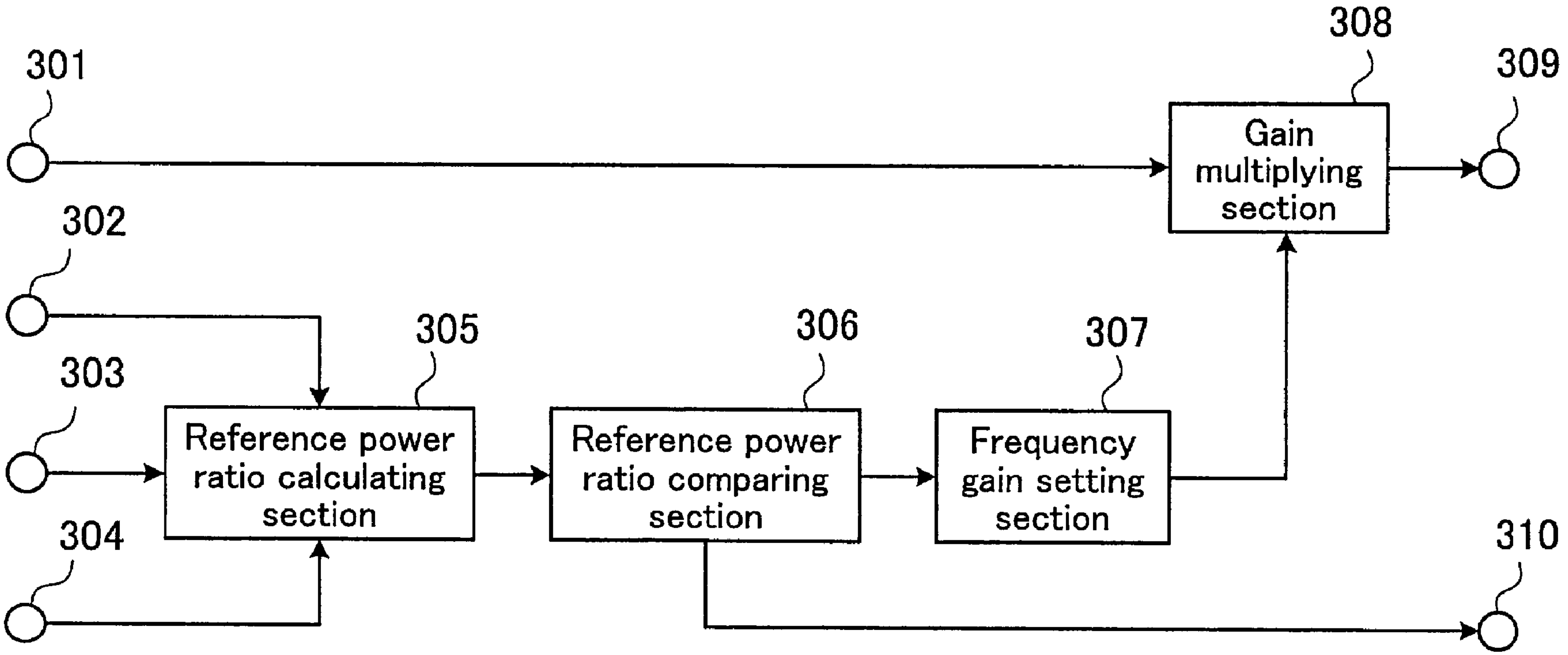
FIG. 3 is a block diagram of a howling suppressing section forming part of the howling detecting and suppressing apparatus shown in FIG. 1.

The howling suppressing section 105 of the first embodiment of the howling detecting and suppressing apparatus is shown in FIG. 3 as comprising input terminals 301, 302, 303, and 304, a reference power ratio calculating section 305, a reference power ratio comparing section 306, a frequency gain setting section 307, a gain multiplying section 308, and output terminals 309 and 310.

The howling suppressing section 105 is operative to input judging information indicating a howling sound frequency signal segment corresponding to a howling frequency segment and the total average value of the smoothed frequency signal powers generated when the howling detecting section 104 detects the howling sound frequency signal segment.

The input terminal 301 is adapted to input the sound frequency signal segments converted by the frequency dividing processing section 103. The input terminal 302 is connected with the output terminal 212 of the howling detecting section 104 and adapted to input the judging information from the howling detecting section 104. The input terminal 303 is connected with the output terminal 213 of the howling detecting section 104 and adapted to input the smoothed frequency signal powers of the adapted reference frequency signal segments collectively forming a frame from the howling detecting section 104. The input terminal 304 is connected with the output terminal 214 of the howling detecting section 104 and is adapted to input the total average value of the smoothed frequency signal powers of a frame from the howling detecting section 104.

The reference power ratio calculating section 305 provided with a storage unit. The reference power ratio calculating section 305 is adapted to input the total average value of the smoothed frequency signal powers of a frame when the howling detecting section 104 detects the howling sound frequency signal segment through the input terminal 304 from the howling detecting section 104. The storage unit of the reference power ratio calculating section 305 is adapted to store the total average value of the smoothed frequency signal powers of the frame generated when the howling detecting section 104 detects the howling sound frequency signal segment. The reference power ratio calculating section 305 is adapted to input the judging information indicating a howling sound frequency signal segment corresponding to a howling frequency segment through the input terminal 302, and the smoothed frequency signal powers of the adapted reference frequency signal segments collectively forming a frame through the input terminal 303 from the howling detecting section 104.

The reference power ratio calculating section 305 is adapted to calculate a reference power ratio by dividing a smoothed frequency signal power of an adapted reference frequency signal segment with respect to the howling frequency segment generated by the smoothing processing section 206 by the total average value of the smoothed frequency signal powers stored in the storage unit to generate a reference power ratio with respect to the howling frequency segment. The reference power ratio calculating section 305 can still obtain the smoothed frequency signal power of the adapted reference frequency signal segment with respect to the howling frequency segment through the input terminal 303 from the howling detecting section 104 regardless of whether the howling detecting section 104 detects the howling sound frequency signal segment or not.

The reference power ratio comparing section 306 is adapted to compare the reference power ratio with respect to the howling frequency segment generated by the reference power ratio calculating section 305 with a predetermined gain control threshold value to judge if the reference power ratio with respect to the howling frequency segment is to be processed in a gain adjusting manner on the basis of the result of a comparison.

The frequency gain setting section 307 is adapted to set an adjusted gain value for the howling sound frequency signal segment when it is judged by the reference power ratio comparing section 306 that the reference power ratio with respect to the howling frequency segment is to be processed in a gain adjusting manner or setting a gain through value for the howling sound frequency signal segment when it is judged by the reference power ratio comparing section 306 that the reference power ratio with respect to the howling frequency segment is not to be processed in a gain adjusting manner to generate an adjusted gain value for the howling sound frequency signal segment. Preferably, the adjusted gain value should be a fixed value.

The gain multiplying section 308 is adapted to respectively adjust gains for the sound frequency signal segments converted by the frequency dividing processing section 103 inputted through the input terminal 301 by multiplying the gains of the howling sound frequency signal segments detected by the howling detecting section 104 by the adjusted gain value set by the frequency gain setting section 307, and passing through the non-howling sound frequency signal segments detected by the howling detecting section 104 to generate howling-suppressed sound frequency signal segments. Here, the adjusted gain value is a gain through value in the default state. Preferably, the gain through value should be "1.0".

The output terminal 309 is adapted to output the howling-suppressed sound frequency signal segments thus generated by the gain multiplying section 308 to the frequency synthesizing processing section 106.

Furthermore, the reference power ratio comparing section 306 is operative to generate a control signal indicating that the reference power ratio comparing section 306 is not operating with respect to a howling frequency segment to the howling detecting section 104 when the reference power ratio comparing section 306 judges that the reference power ratio with respect to the howling frequency segment is not to be processed in a gain adjusting manner, and the howling detecting section 104 is operative to resume operations of the total average frequency power calculating section 207, the power ratio calculating section 208, the power ratio comparing section 209, the target frame counting section 210, and the howling judging section 211 with respect to the howling frequency segment when the howling detecting section 104 receives the control signal indicating that the reference power ratio comparing section 306 is not operating with respect to the howling frequency segment.

The output terminal 310 is adapted to output the control signal to the input terminal 215 of the howling detecting section 104.

The operation of the first embodiment of the howling detecting and suppressing apparatus according to the present invention will be described hereinlater.

The input terminal 101 is operated to input an analog sound signal therethrough. The A/D converter 102 is operated to convert the analog sound signal inputted through by the input terminal 101 into a digital sound signal including a plurality of sound time signal segments. Each of the sound time signal segments corresponds to a time segment. The frequency dividing processing section 103 is operated to input the digital sound signal including a plurality of sound time signal segments converted by the A/D converter 102 and convert the plurality of sound time signal segments each corresponding to a time segment into a plurality of sound frequency signal segments each corresponding to a frequency segment.

The frequency dividing processing section 103 may convert the plurality of sound time signal segments each corresponding to a time segment into a plurality of sound frequency signal segments each corresponding to a frequency segment by means of, for example but not limited to, a time-frequency transformation such as a fast Fourier Transformation (FFT).

The howling suppressing section 105 is operated to respectively adjust gains for the sound frequency signal segments converted by the frequency dividing processing section 103 to generate howling-suppressed sound frequency signal segments. The howling detecting section 104 is operated to judge whether a howling sound component is present or not for each of the howling-suppressed sound frequency signal segments generated by the howling suppressing section 105 to detect howling sound frequency signal segments each in which it is judged that the howling sound component is present and non-howling sound frequency signal segments each in which it is judged that the howling sound component is not present.

The frequency synthesizing processing section 106 is operated to synthesize the howling-suppressed sound frequency signal segments suppressed by the howling suppressing section 105 to generate howling-suppressed sound time signal segments collectively forming a howling-suppressed digital sound signal. The frequency synthesizing processing section 106 may synthesize the howling-suppressed sound frequency signal segments thus suppressed in a reversed manner to the conversion performed by the frequency dividing processing section 103 by means of, for example but not limited to an inverse fast Fourier Transformation (IFFT).

The D/A converter 107 is operated to convert the howling-suppressed sound time signal segments collectively forming a howling-suppressed digital sound signal generated by the frequency synthesizing processing section 106 into a howling-suppressed analog sound signal. The output terminal 108 connected with, for example but not limited to, a speaker, not shown, is operated to output the howling-suppressed analog sound signal converted by the D/A converter 107 therethrough.

This means that the howling suppressing section 105 is operated to respectively adjust the gains for the sound frequency signal segments converted by the frequency dividing processing section 103 by changing the gains of the howling sound frequency signal segments detected by the howling detecting section 104 and passing through the non-howling sound frequency signal segments detected by the howling detecting section 104.

The operations of the howling detecting section 104 and the howling suppressing section 105 will be described in detail, hereinlater. The howling detecting section 104 and the howling suppressing section 105 are cooperatively operated with respect to each of frequency segments. The operations of the howling detecting section 104 and the howling suppressing section 105 with respect to a plurality of frequency segments, however, are performed in parallel and separately. This means that the operation of the howling detecting section 104 and the howling suppressing section 105 with respect to a frequency segment of, for example, 10 Hz is performed in parallel with and separately from the operations of the howling detecting section 104 and the howling suppressing section 105 with respect to a frequency segment of, for example, 20 Hz.

The description hereinlater is directed to the operation of the howling detecting section 104 with reference to FIG. 2.

In the howling detecting section 104, the delay generator 202 is operated to respectively delay the howling-suppressed sound frequency signal segments collectively forming a frame generated by the howling suppressing section 105 inputted by the input terminal 201 for a predetermined number of frames to be outputted as reference frequency signal segments collectively forming a frame. More specifically, the number of frames is predetermined so large that there will be substantially no correlation between the howling-suppressed sound frequency signal segments inputted by the input terminal 201 and the howling-suppressed sound frequency signal segments delayed by the delay generator 202 in terms of wideband signal components. Here, the howling-suppressed sound frequency signal segments inputted by the input terminal 201 are assumed to be desired frequency signal segments. This means that the delay generator 202 is operated to respectively delay the howling-suppressed sound frequency signal segments collectively forming a frame for the number of frames and output the howling-suppressed sound frequency signal segments forming a frame thus delayed as reference frequency signal segments forming a frame so that there will be substantially no correlation between the reference frequency signal segments and desired frequency signal segments in terms of wideband signal components.

However, the reference frequency signal segments each having a sine wave signal component outputted by the delay generator 202 still remain strong correlations with the respective desired frequency signal segments. A frequency segment having a howling sound component has a sine wave signal component. This means that the reference frequency signal segments each having a howling sound component outputted by the delay generator 202 still remain strong correlations with the respective desired frequency signal segments.

The adaptive filter 203 is operated to respectively convolve the reference frequency signal segments outputted by the delay generator 202 with coefficients to generate adapted reference frequency signal segments collectively forming a frame. The coefficient updating calculating section 204 is operated to respectively update the coefficients on the basis of the sound howling-suppressed sound frequency signal segments generated by the howling suppressing section 105 inputted by the input terminal 201, the reference frequency signal segments outputted by the delay generator 202, and the adapted reference frequency signal segments generated by the adaptive filter 203. This means that the coefficient updating calculating section 204 is operated to respectively update the coefficients so that the mean-squared error between the adapted reference frequency signal segments generated by the adaptive filter 203 and the sound howling-suppressed sound frequency signal segments generated by the howling suppressing section 105 is minimized. The mean-squared error between the adapted reference frequency signal segments generated by the adaptive filter 203 and the sound howling-suppressed sound frequency signal segments generated by the howling suppressing section 105 is minimized when the adaptive filter 203 outputs adapted reference frequency signal segments each having a sine wave signal component.

As described above, a frequency segment having a howling sound component has a sine wave signal component. This leads to the fact that the adaptive filter 203 can extract adapted reference frequency signal segments having howling sound components by respectively convolving the reference frequency signal segments outputted by the delay generator 202 with coefficients updated by the coefficient updating calculating section 204. Preferably, the coefficient updating algorithm used in the howling detecting section may include, for example but not limited to, a complex LMS (Least Mean Square) algorithm, a complex NLMS (Normalized Least Mean Square) algorithm, a complex RLS (Recursive Least Squares) algorithm , and a complex FRSL (Fast Recursive Least Squares) algorithm. A frequency segment having a sine wave signal component may not always be a howling frequency segment having a howling sound component. This means that the adapted reference frequency signal segments generated by the adaptive filter 203 are still required to be judged if they contain howling sound components or not in order to prevent from erroneously detecting howling frequency segments. The process of judging if the adapted reference frequency signal segments thus generated contain howling sound components or not will be described hereinlater.

The frequency power calculating section 205 is operated to respectively calculate frequency signal powers of the adapted reference frequency signal segments collectively forming a frame generated by the adaptive filter 203. The smoothing processing section 206 is operated to respectively smooth the frequency signal powers of the adapted reference frequency signal segments collectively forming a frame calculated by the frequency power calculating section 205 to generate smoothed frequency signal powers of the adapted reference frequency signal segments collectively forming a frame.

This means that the smoothing processing section 206 is operated to smooth a frequency signal power of an adapted reference frequency signal segment with respect to a frequency segment of a frame calculated by the frequency power calculating section 205 in accordance with the Equation as follows:

$$P(k)=FF*P\_pre(k)+(1.0-FF)*P(k-1)$$

wherein: k is the current frame; P_pre(k) is the frequency signal power of the adapted reference frequency signal segment of the current frame calculated by the frequency power calculating section 205 with respect to the frequency signal; P(k) is the smoothed frequency signal powers of the adapted reference frequency signal segment of the current frame with respect to the same frequency signal generated by the smoothing processing section 206; and FF is a forgetting factor.

The operation of the smoothing processing section 206 to smooth a frequency signal power of an adapted reference frequency signal segment with respect to a frequency segment is described for the purpose of simplifying the description and assisting in understanding about the operation of the smoothing processing section 206 while, on the other hand, the operations of the howling detecting section 104 are performed in parallel and separately with respect to a plurality of frequency segments as described above.

The total average frequency power calculating section 207 is operated to input the smoothed frequency signal powers of the adapted reference frequency signal segments collectively forming a frame generated by the smoothing processing section 206 to calculate a total average value of the smoothed frequency signal powers of the frame.

The power ratio calculating section 208 is operated to input the frequency signal power ratios of the smoothed frequency signal powers of the adapted reference frequency signal segments collectively forming a frame calculated by the smoothing processing section 206 and the total average value of the smoothed frequency signal powers of the frame calculated by the total average frequency power calculating section 207 to respectively calculate frequency signal power ratios of the smoothed frequency signal powers of the adapted reference frequency signal segments thus inputted to the total average value of the frequency signal powers of the frame calculated by the total average frequency power calculating section 207 to respectively generate frequency signal power ratios each corresponding to frequency segments in the frame. This means that each of the frequency signal power ratios thus calculated corresponds to a frequency segment in the frame.

The power ratio comparing section 209 is operated to respectively compare the frequency signal power ratios in the frame calculated by the power ratio calculating section 208 with a predetermined first howling detecting threshold value to detect howling frequency signal power ratios and howling frequency segments respectively corresponding to the howling frequency signal power ratios in the frame each of which exceeds the first howling detecting threshold value from among the frequency signal power ratios.

The target frame counting section 210 is operated to respectively count the number of target frames in which the howling frequency signal power ratios are detected by the power ratio comparing section 209 with respect to the howling frequency segments. The target frame counting section 210 can reset the number of target frames so far counted with respect to a howling frequency segment when the howling frequency signal power ratio is not detected by the power ratio comparing section 209 with respect to the howling frequency segment.

The howling judging section 211 is operated to judge whether a howling sound component is present or not for each of the howling frequency segments by comparing the number of target frames counted by the target frame counting section 210 with respect to each of the howling frequency segments detected by the power ratio comparing section 209 and a predetermined second howling detecting threshold value to detect howling sound frequency signal segments each in which it is judged that the howling sound component is present because of the fact that the number of target frames counted by the target frame counting section 210 with respect to the howling frequency segment exceeds the second howling detecting threshold value and non-howling sound frequency signal segments each in which it is judged that the howling sound component is not present because of the fact that the number of target frames counted by the target frame counting section 210 with respect to the howling frequency segment does not exceed the second howling detecting threshold value.

The howling judging section 211 is operated to generate judging information indicating howling frequency signal segments respectively corresponding to the howling frequency segments when howling sound frequency segments are detected. The output terminal 212 is operated to output the judging information to the howling suppressing section 105. The output terminal 213 is operated to output the smoothed frequency signal powers of the adapted reference frequency signal segments collectively forming a frame generated by the smoothing processing section 206 to the howling suppressing section 105. The output terminal 214 is operated to output the total average value of the smoothed frequency signal powers of the frame calculated by the total average frequency power calculating section 207 to the howling suppressing section 105.

Furthermore, the howling detecting section 104 is operative to temporally stop the operations of the total average frequency power calculating section 207, the power ratio calculating section 208, the power ratio comparing section 209, the target frame counting section 210, and the howling judging section 211 with respect to a howling frequency segment when the howling judging section 211 detect a howling sound frequency segment with respect to the howling frequency segment.

The howling detecting section 104 of the howling detecting and suppressing apparatus according to the present invention detects a howling frequency segment containing a howling sound component attaching great importance to the fact that a howling frequency segment containing a howling sound component has a sine wave signal component and continuously maintains remarkably great power values. As described before, the howling frequency segment thus extracted by the adaptive filter 203 may contain a howling sound component. Some frequency segments such as an ambulance siren may also contain a sine wave signal. The total average frequency power calculating section 207, the power ratio calculating section 208, the power ratio comparing section 209, the target frame counting section 210, and the howling judging section 211 are operated to judge whether the frequency segments so far determined to contain sine wave components continuously maintain remarkably great power values or not in order to prevent erroneously detecting howling frequency segments.

The description hereinlater is directed to the operation of the howling suppressing section 105 with reference to FIG. 3.

In the howling suppressing section 105, the input terminal 301 is operated to input the sound frequency signal segments converted by the frequency dividing processing section 103. The input terminal 302 is connected with the output terminal 212 of the howling detecting section 104 and operated to input the judging information from the howling detecting section 104. The input terminal 303 is connected with the output terminal 213 of the howling detecting section 104 and operated to input the smoothed frequency signal powers of the adapted reference frequency signal segments collectively forming a frame from the howling detecting section 104. The input terminal 304 is connected with the output terminal 214 of the howling detecting section 104 and is operated to input the total average value of the smoothed frequency signal powers of a frame from the howling detecting section 104.

The reference power ratio calculating section 305 is operated to input the total average value of the smoothed frequency signal powers of a frame when the howling detecting section 104 detects the howling sound frequency signal segment through the input terminal 304 from the howling detecting section 104. The storage unit of the reference power ratio calculating section 305 is operated to store the total average value of the smoothed frequency signal powers of the frame thus inputted. The reference power ratio calculating section 305 is operated to input the judging information indicating a howling sound frequency signal segment corresponding to a howling frequency segment through the input terminal 302, and the smoothed frequency signal powers of the adapted reference frequency signal segments collectively forming a frame through the input terminal 303 from the howling detecting section 104.

The reference power ratio calculating section 305 is operated to calculate a reference power ratio by dividing a smoothed frequency signal power of an adapted reference frequency signal segment with respect to the howling frequency segment generated by the smoothing processing section 206 by the total average value of the smoothed frequency signal powers stored in the storage unit to generate a reference power ratio with respect to the howling frequency segment. This means that the reference power ratio calculating section 305 can obtain the smoothed frequency signal power of the adapted reference frequency signal segment with respect to the howling frequency segment from the judging information indicating the howling frequency segment and the smoothed frequency signal powers of the adapted reference frequency signal segments inputted from the howling detecting section 104.

The reference power ratio comparing section 306 is operated to compare the reference power ratio with respect to the howling frequency segment generated by the reference power ratio calculating section 305 with a predetermined gain control threshold value to judge if the reference power ratio with respect to the howling frequency segment is to be processed in a gain adjusting manner on the basis of the result of a comparison.

The frequency gain setting section 307 is operated to set an adjusted gain value for the howling sound frequency signal segment when it is judged by the reference power ratio comparing section 306 that the reference power ratio with respect to the howling frequency segment is to be processed in a gain adjusting manner or setting a gain through value for the howling sound frequency signal segment when it is judged by the reference power ratio comparing section 306 that the reference power ratio with respect to the howling frequency segment is not to be processed in a gain adjusting manner to generate an adjusted gain value for the howling sound frequency signal segment. The adjusted gain value may be, for example a fixed value.

The howling suppressing section 105 may suppress the howling frequency segment in two manners consisting of a gain reducing manner performed when the howling frequency segment is detected and a gain restoring manner performed after the howling frequency segment is suppressed to a certain degree in order to avoid the degradation of sounds. This means that the reference power ratio comparing section 306 may judge if the reference power ratio with respect to a howling frequency segment is to be processed in a gain reducing manner, a gain restoring manner, or a gain through manner, and the frequency gain setting section 307 may set a reduced gain value, an in creased gain value, or a gain through value for the howling sound frequency signal segment with respect to the howling frequency segment in accordance with the result of judgment made by the reference power ratio comparing section 306.

The operation to suppress the howling frequency segment in two manners consisting of a gain reducing manner and a gain restoring manner performed by the reference power ratio comparing section 306 and the frequency gain setting section 307 will be described in detail.

The reference power ratio comparing section 306 is operative to compare the reference power ratio with respect to the howling frequency segment generated by the reference power ratio calculating section 305 with a predetermined gain control threshold value to judge if the reference power ratio with respect to the howling frequency segment is to be processed in a gain reducing manner, a gain restoring manner, or a gain through manner on the basis of the result of a comparison.

More specifically, the reference power ratio comparing section 306 is operative to judge if the reference power ratio with respect to the howling frequency segment generated by the reference power ratio calculating section 305 is greater than a first gain control threshold value to determine that the reference power ratio with respect to the howling frequency segment is to be processed in a gain reducing manner when it is judged that the reference power ratio with respect to the howling frequency segment is greater than the first gain control threshold value. The reference power ratio comparing section 306, otherwise, is operative to judge if the reference power ratio with respect to the howling frequency segment generated by the reference power ratio calculating section 305 is less than a second gain control threshold value to determine that the reference power ratio with respect to the howling frequency segment is to be processed in a gain restoring manner when it is judged that the reference power ratio with respect to the howling frequency segment is less than the second gain control threshold value, or determine that the reference power ratio with respect to the howling frequency segment is to be processed in a gain through manner when it is judged that the reference power ratio with respect to the howling frequency segment is not less than the second gain control threshold value.

The frequency gain setting section 307 is operative to set a reduced gain value for the howling sound frequency signal segment as long as the reference power ratio comparing section 306 determines that the reference power ratio with respect to the howling frequency segment is to be processed in the gain reducing manner, wherein the reduced gain value should be, preferably, within the range of 0 and 1.0. The frequency gain setting section 307 is operative to set an increased gain value for the howling sound frequency signal segment as long as the reference power ratio comparing section 306 determines that the reference power ratio with respect to the howling frequency segment is to be processed in the gain restoring manner, wherein the increased gain value should be, preferably, more than 1.0. The frequency gain setting section 307 is operative to set a gain through value for the howling sound frequency signal segment when the reference power ratio comparing section 306 determines that the reference power ratio with respect to the howling frequency segment is to be processed in the gain through manner, wherein the gain through value should be, preferably, equal to 1.0.

The reference power ratio comparing section 306 is operative to generate a control signal indicating that said reference power ratio comparing section 306 is not operating with respect to said howling frequency segment and output the control signal through the output terminal 310 and the input terminal 215 to the howling detecting section 104 when the reference power ratio comparing section 306 determines that the reference power ratio with respect to the howling frequency segment is to be processed in a gain through manner. The howling detecting section 104 is operative to resume operations of the total average frequency power calculating section 207, the power ratio calculating section 208, the power ratio comparing section 209, the target frame counting section 210, and the howling judging section 211 with respect to the howling frequency segment when the howling detecting section 104 receives the control signal with respect to the howling frequency segment.

The gain multiplying section 308 is operated to respectively adjust gains for the sound frequency signal segments converted by the frequency dividing processing section 103 inputted through the input terminal 301 by multiplying the gains of the howling sound frequency signal segments detected by the howling detecting section 104 by the adjusted gain value such as, for example, the reduced gain value, the increased gain value, the gain through value set by the frequency gain setting section 307, and passing through the non-howling sound frequency signal segments detected by the howling detecting section 104 to generate howling-suppressed sound frequency signal segments.

The output terminal 309 is operated to output the howling-suppressed sound frequency signal segments thus generated by the gain multiplying section 308 to the frequency synthesizing processing section 106.

Figure 4:
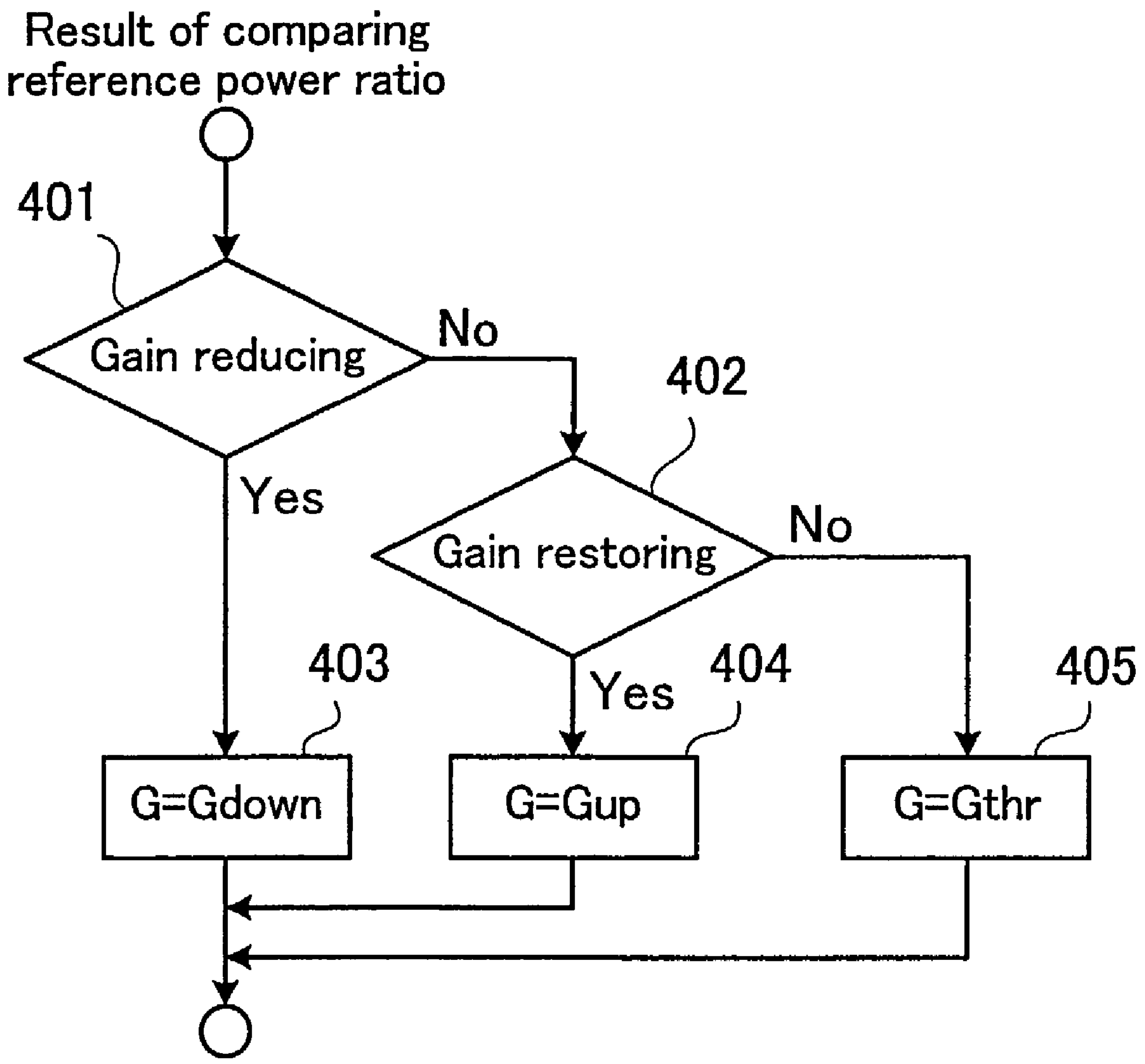
FIG. 4 is a flowchart showing a flow of a gain setting operation to be performed by the howling detecting and suppressing apparatus shown in FIG. 1.

The gain setting operation performed by the reference power ratio comparing section 306 and the frequency gain setting section 307 will be described with reference to FIG. 4.

The frequency gain setting section 307 is operative to set an adjusted gain value for the howling sound frequency signal segment on the basis of the result of comparing the reference power ratio performed by the reference power ratio comparing section 306.

In the step 401, the reference power ratio comparing section 306 is operated to compare the reference power ratio with respect to the howling frequency segment with a predetermined first gain control threshold value to judge if the reference power ratio with respect to the howling frequency segment is to be processed in a gain reducing manner. If the reference power ratio comparing section 306 judges that the reference power ratio with respect to the howling frequency segment is to be processed in a gain reducing manner, the step 401 goes forward to the step 403, in which the frequency gain setting section 307 is operated to set an increased gain value, i.e., "Gdown" for the howling sound frequency signal segment.

If the reference power ratio comparing section 306, on the other hand, judges that the reference power ratio with respect to the howling frequency segment is not to be processed in a gain reducing manner, the step 401 goes forward to the step 402, in which the reference power ratio comparing section 306 is operated to compare the reference power ratio with respect to the howling frequency segment with a predetermined second gain control threshold value to judge if the reference power ratio with respect to the howling frequency segment is to be processed in a gain restoring manner. If it is judged that the reference power ratio with respect to the howling frequency segment is to be processed in a gain restoring manner, the step 402 goes forward to the step 404, in which the frequency gain setting section 307 is operated to set an increased gain value, i.e., "Gup" for the howling sound frequency signal segment.

If it is judged that the reference power ratio with respect to the howling frequency segment is not to be processed in a gain restoring manner, the step 402 goes forward to the step 405, in which the frequency gain setting section 307 is operated to set a gain through value, i.e., "Gthr" for the howling sound frequency signal segment and the gain setting operation ends.

As will be seen from the foregoing description, it is to be understood that the howling detecting and suppressing apparatus according to the present invention can detect howling frequency segments in parallel and separately with respect to a plurality of frequency segments, thereby enhancing the frequency resolution and preventing the degradation of sound quality. In the howling detecting and suppressing apparatus thus constructed, the howling detecting section 104 judges whether a howling sound component is present or not for each of the howling-suppressed sound frequency signal segments outputted by the howling suppressing section 105, thereby immediately and reliably detect the occurrence of howling frequency segments.

Furthermore, the howling detecting and suppressing apparatus according to the present invention, in which the adaptive filter 203 can adaptively extract the frequency signal segments having sine wave signal components, and the frequency signal segments thus extracted are used as reference frequency signal segments to be judged whether howling sound components are present, makes it possible to accurately and reliably detect a howling frequency segments and prevent to erroneously detect a howling frequency segment when the noise level is extraordinary high or a sound frequency signal segment happens to continuously maintain remarkably great power values.

The howling detecting and suppressing apparatus thus constructed can suppress howling frequency segments by adjusting gains for the howling frequency segments eliminating the needs of notch filters, which are large-sized hardware. This leads to the fact that the first embodiment of the howling detecting and suppressing apparatus can be simple in construction.

The first embodiment of the howling detecting and suppressing apparatus according to the present invention, in which the reference power ratio calculating section 305 stores the total average value of the smoothed frequency signal powers when the howling detecting section 104 detects howling frequency segment, and calculate a reference power ratio with respect to the howling frequency segment on the basis of the total average value of the smoothed frequency signal powers thus stored, the reference power ratio comparing section 306 compares the reference power ratio with respect to the howling frequency segment thus calculated with a predetermined gain control threshold value, the frequency gain setting section 307 sets an adjusted gain value for the howling sound frequency segment on the basis of the result of the comparison made by the reference power ratio comparing section 306, and the gain multiplying section 308 adjusts gains for the howling frequency segment by multiplying the gain of the howling frequency segment by the adjusting value thus set, can suppress the howling frequency segment, thereby eliminating the needs of the notch filters.

Frequency segments, for example, in which howling sound components are expected to occur, are already known; the howling detecting and suppressing apparatus according to the present invention can effectively detect and suppress the howling frequency segments having howling sound components. This means that the operations of the power ratio calculating section 208, the power ratio comparing section 209, the target frame counting section 210, and the howling judging section 211 of the howling detecting section 104 and the howling suppressing section 105 may be limited to one or more frequency segments, each in which howling sound components are likely expected to occur. The howling detecting and suppressing apparatus according to the present invention, in which the howling detecting section 104 judges whether a howling sound component is present or not only for each of sound frequency signal segments corresponding to the specified one or more frequency segments, each in which howling sound components are expected to occur, and the howling suppressing section 105 changes the gains of the howling sound frequency signal segments respectively corresponding to specified one or more frequency segments detected by the howling detecting section 104, can eliminate unnecessary calculation operations and prevent the degradation of sound quality caused by the gain setting operation.

In the howling detecting and suppressing apparatus according present invention, the total average frequency power calculating section 207 may input the smoothed frequency signal powers of the adapted reference frequency signal segments collectively forming a frame generated by the smoothing processing section 206, detect maximum and quasi-maximum smoothed frequency signal powers of maximum and quasi-maximum adapted reference frequency signal segments from among the smoothed frequency signal powers of the adapted reference frequency signal segments collectively forming a frame thus inputted. Here, the maximum and quasi-maximum adapted reference frequency signal segments are intended to mean adapted reference frequency signal segments respectively having the maximum and quasi-maximum smoothed frequency signal powers. The total average frequency power calculating section 207 may then judge if any one or more of the maximum and quasi-maximum adapted reference frequency signal segments correspond to specified one or more frequency segments and calculate a total average value of the smoothed frequency signal powers of the frame excluding one or more of the maximum and quasi-maximum adapted reference frequency signal segments corresponding to the specified one or more frequency segments when it is judged that the one or more of the maximum and quasi-maximum adapted reference frequency signal segments correspond to the specified one or more frequency segments. Preferably, the specified one or more frequency segments may be frequency segments in which howling sound components are least expected to occur. The howling detecting and suppressing apparatus, in which the power ratio calculating section 208 can respectively calculate frequency signal power ratios of the smoothed frequency signal powers of the frame excluding one or more of the maximum and quasi-maximum adapted reference frequency signal segments corresponding to the specified one or more frequency segments in which, for example, howling sound components are least expected to occur, enabling the power ratio comparing section 209, the target frame counting section 210, and the howling judging section 211 to accurately and reliably detect howling frequency segments, can reliably detect howling sound components.

The first embodiment of the howling detecting and suppressing apparatus according to the present invention, in which the frequency gain setting section 307 may set the reduced gain value and the increased gain value for the howling sound frequency signal segments, and the gain multiplying section 308 adjusts gains for the howling sound frequency signal segments by multiplying the gains of the howling sound frequency signal segment by the reduced gain value and the increased gain value thus set, can eliminate the needs of a plurality of notch filters and prevent the degradation of sound quality.

In the howling detecting and suppressing apparatus according to the present invention, the reference power ratio comparing section 306 may judge if the reference power ratio with respect to the howling frequency segment is to be processed in a plurality of gain reducing manners, a plurality of gain restoring manners, or a gain through manner on the basis of the result of a comparison. The frequency gain setting section 307 may set a specified reduced gain value for the howling sound frequency signal segment when the reference power ratio comparing section 306 judges that the reference power ratio with respect to the howling frequency segment is to be processed in one of the gain reducing manners. There may be provided a plurality of specified reduced gain values and each of the gain reducing manners may uniquely correspond to one of the specified reduced gain values. The frequency gain setting section 307 may also set a specified increased gain value for the howling sound frequency signal segment when the reference power ratio comparing section 306 judges that the reference power ratio with respect to the howling frequency segment is to be processed in one of the gain restoring manners. There may be provided a plurality of specified increased gain values and each of the gain restoring manners may uniquely correspond to one of the specified increased gain values. The frequency gain setting section 307 may set a gain through value for the howling sound frequency signal segment when the reference power ratio comparing section 306 judges that the reference power ratio with respect to the howling frequency segment is to be processed in the gain through manner. The howling detecting and suppressing apparatus thus constructed can prevent the degradation of sound quality caused by the gain setting operation.

From the foregoing description, it is to be understood that the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 5:
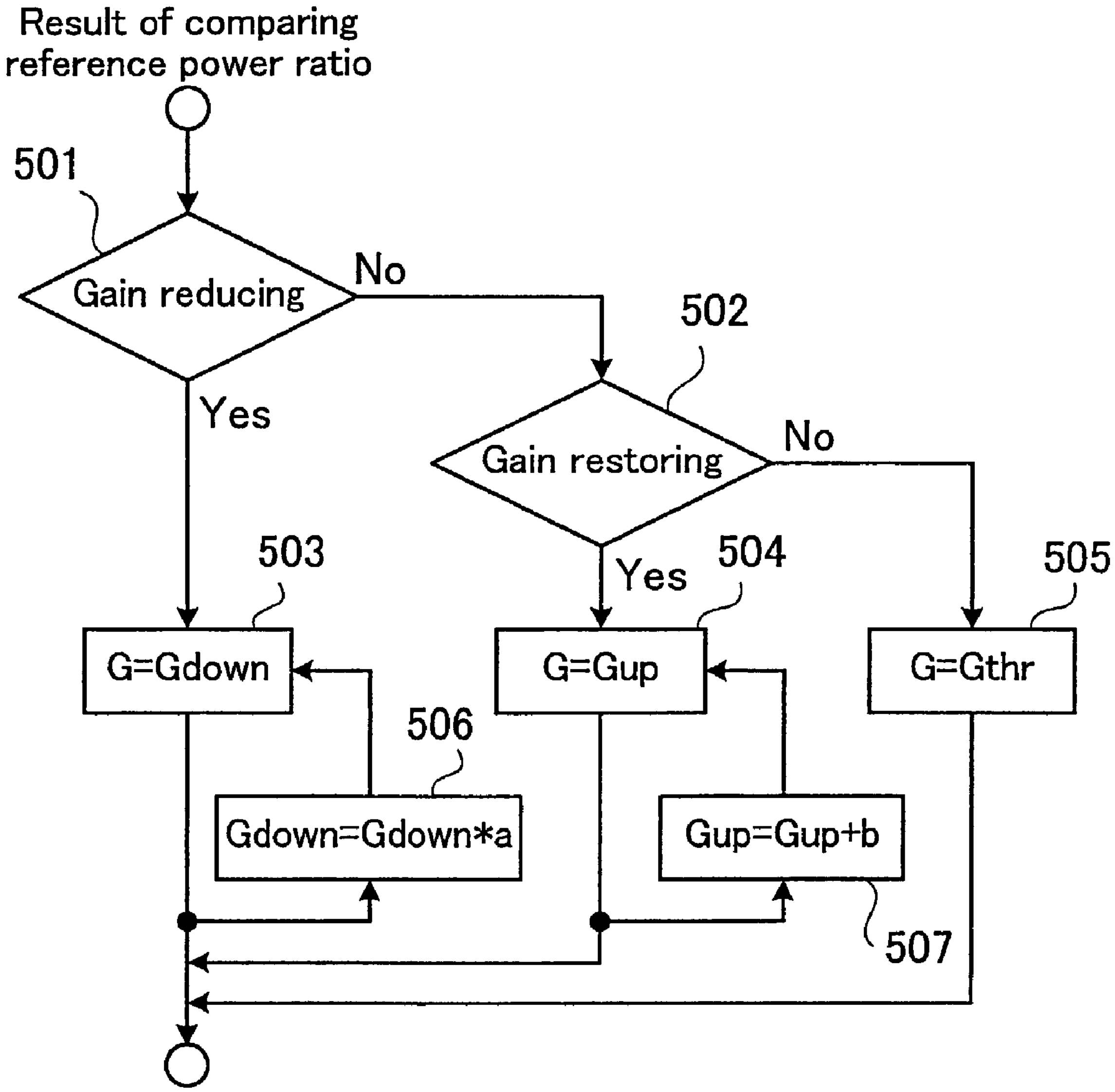
FIG. 5 is a flowchart showing a flow of a gain setting operation to be performed by a second preferred embodiment of the howling detecting and suppressing apparatus according to the present invention.

Referring then to FIGS. 3 and 5 of the drawings, a second preferred embodiment of the howling detecting and suppressing apparatus according to the present invention will be described hereinlater. The second embodiment of the howling detecting and suppressing apparatus is similar in construction to the first embodiment of the howling detecting and suppressing apparatus except for the fact that the reference power ratio comparing section 306 is provided with an adjusted gain value updating unit for updating the adjusted gain value. This means that the reference power ratio comparing section 306 of the second embodiment of the howling detecting and suppressing apparatus can update the adjusted gain value while, on the other hand, the reference power ratio comparing section 306 of the first embodiment of the howling detecting and suppressing apparatus uses a fixed value for an adjusted gain value. The adjusted gain value updating unit may include, for example but not limited to, a reduced gain value updating unit for updating a reduced gain value and an increased gain value updating unit for updating an increased gain value, which will be described later. The constitution elements of the second embodiment of the howling detecting and suppressing apparatus roughly the same as those of the first embodiment of the howling detecting and suppressing apparatus will not be described but bear the same reference numerals and legends as those of the first embodiment of the howling detecting and suppressing apparatus in FIGS. 1 to 3 to avoid tedious repetition.

The operation of the second embodiment of the howling detecting and suppressing apparatus similar to the first embodiment of the howling detecting and suppressing apparatus except for the gain setting operation. The description hereinlater will be directed to the gain setting operation performed by the second embodiment of the howling detecting and suppressing apparatus with reference to FIG. 3.

The reference power ratio comparing section 306 is operated to compare the reference power ratio with respect to the howling frequency segment generated by the reference power ratio calculating section 305 with a predetermined gain control threshold value to judge if the reference power ratio with respect to the howling frequency segment is to be processed in a plurality of gain reducing manners, a plurality of gain restoring manners, or a gain through manner on the basis of the result of a comparison. The frequency gain setting section 307 is operated to set a specified reduced gain value for the howling sound frequency signal segment when the reference power ratio comparing section 306 judges that the reference power ratio with respect to the howling frequency segment is to be processed in one of the gain reducing manners, the specified reduced gain value uniquely corresponding to the one of the gain reducing manners, set a specified increased gain value for the howling sound frequency signal segment when the reference power ratio comparing section 306 judges that the reference power ratio with respect to the howling frequency segment is to be processed in one of the gain restoring manners, the specified increased gain value uniquely corresponding to the one of the gain restoring manners, or set a gain through value for the howling sound frequency signal segment when the reference power ratio comparing section 306 judges that the reference power ratio with respect to the howling frequency segment is to be processed in the gain through manner.

The gain setting operation performed by the second embodiment of the howling detecting and suppressing apparatus will be described in detail with reference to FIG. 5.

In the step 501, the reference power ratio comparing section 306 is operated to compare the reference power ratio with respect to the howling frequency segment generated by the reference power ratio calculating section 305 with a predetermined gain control threshold value to judge if the reference power ratio with respect to the howling frequency segment is to be processed in a plurality of gain reducing manners or not.

If the reference power ratio comparing section 306 judges that the reference power ratio with respect to the howling frequency segment is to be processed in one of the gain reducing manners on the basis of the result of the comparison, the step 501 goes forward to the step 503, in which the frequency gain setting section 307 is operated to set a specified reduced gain value for the howling sound frequency signal segment. The step 503 goes forward to the step 506 in which the specified increased gain value uniquely corresponding to the one of the gain reducing manners is updated.

The description hereinlater will be directed to an example of the process to update a specified reduced gain value for the howling sound frequency signal segment performed by the frequency gain setting section 307 in the step 506.

The frequency gain setting section 307 is provided with a reduced gain value updating unit for updating the reduced gain value by multiplying the reduced gain value by a reduced gain updating coefficient. Preferably, the reduced gain updating coefficient shown as "a" in FIG. 5 should be in the range between 0 and 1.0. The frequency gain setting section 307 is operated to set a reduced gain value for the howling sound frequency signal segment and the reduced gain value updating unit is operated to update the reduced gain value by multiplying the reduced gain value by the reduced gain updating coefficient. The above processes in the step 501, the step 503 and the step 506 will be repeated and the reduced gain value will be updated until the reference power ratio comparing section 306 judges that the reference power ratio with respect to the howling frequency segment is to not be processed in one of the gain reducing manners in the step 501.

If the reference power ratio comparing section 306 judges that the reference power ratio with respect to the howling frequency segment is not to be processed in one of the gain reducing manners on the basis of the result of the comparison, the step 501, the step 501 goes forward to the step 502, in which the reference power ratio comparing section 306 is operated to compare the reference power ratio with respect to the howling frequency segment generated by the reference power ratio calculating section 305 with a predetermined gain control threshold value to judge if the reference power ratio with respect to the howling frequency segment is to be processed in a plurality of gain restoring manners or not.

If the reference power ratio comparing section 306 judges that the reference power ratio with respect to the howling frequency segment is to be processed in a plurality of gain restoring manners, the step 502 goes forward to the step 504, in which the frequency gain setting section 307 is operated to set a specified increased gain value for the howling sound frequency signal segment. The step 504 goes forward to the step 507, in which the specified increased gain value uniquely corresponding to the one of the gain restoring manners is updated.

The description hereinlater will be directed to an example of the process to update a specified increased gain value for the howling sound frequency signal segment performed by the frequency gain setting section 307 in the step 507.

The frequency gain setting section 307 is provided with an increased gain value updating unit for updating the increased gain value by adding an increased gain updating constant to the increased gain value. Preferably, the increased gain updating constant shown as "b" in FIG. 5 should be greater than 0. The frequency gain setting section 307 is operated to set an increased gain value for the howling sound frequency signal segment and the increased gain value updating unit is operated to update the increased gain value by adding the increased gain updating constant to the increased gain value. The above processes in the step 502, the step 504, and the step 507 will be repeated and the increased gain value will be updated until the reference power ratio comparing section 306 judges that the reference power ratio with respect to the howling frequency segment is not to be processed in a plurality of gain restoring manners, i.e., to be processed in the gain through manner in the step 502.

If the reference power ratio comparing section 306 judges that the reference power ratio with respect to the howling frequency segment is not to be processed in a plurality of gain restoring manners, this means, to be processed in a gain through manner, the step 502 goes forward to the step 505, in which the frequency gain setting section 307 is operated to set a gain through value for the howling sound frequency signal segment.

Alternatively, the reduced gain value updating unit may update the reduced gain value by subtracting a reduced gain updating constant "c" from the reduced gain value. Preferably, the reduced gain updating constant "c" should be greater than 0. The increased gain value updating unit may update the increased gain value by multiplying the reduced gain value by an increased gain updating coefficient d. Preferably, the reduced gain value by an increased gain updating coefficient d should be more than 1.0.

The second embodiment of the howling detecting and suppressing apparatus according to the present invention can update an adjusted gain value such as a reduced gain value and an increased gain value while, on the other hand, the first embodiment of the howling detecting and suppressing apparatus uses a fixed value for an adjusted gain value. The second embodiment of the howling detecting and suppressing apparatus thus constructed can suppress the howling sound components more promptly than the first embodiment of the howling detecting and suppressing apparatus especially when the frequency gain setting section 307 is equipped with a reduced gain value updating unit for updating the reduced gain value by multiplying the reduced gain value by a reduced gain updating coefficient.

From the foregoing description, it is to be understood that the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 6:
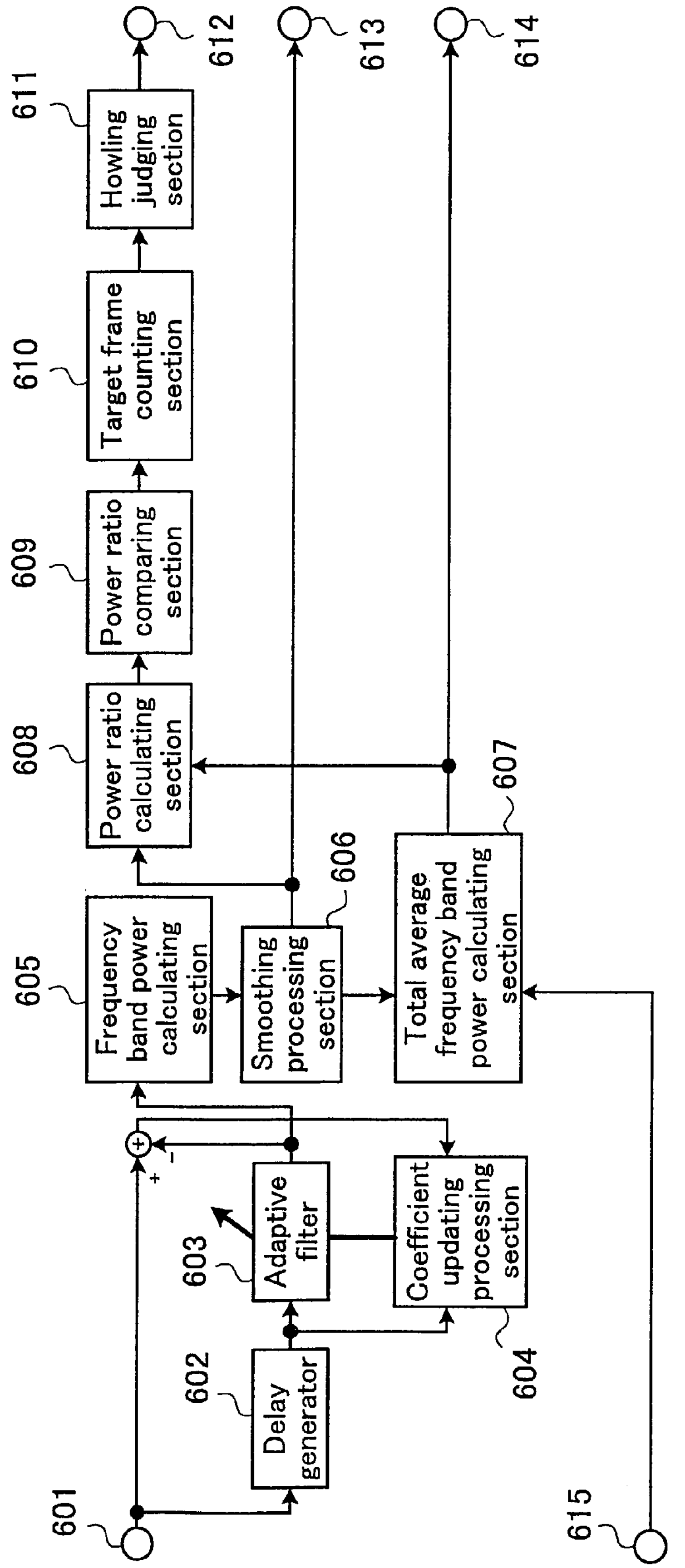
FIG. 6 is a block diagram of the howling detecting section forming part of a third preferred embodiment of the howling detecting and suppressing apparatus according to the present invention.
Figure 7:
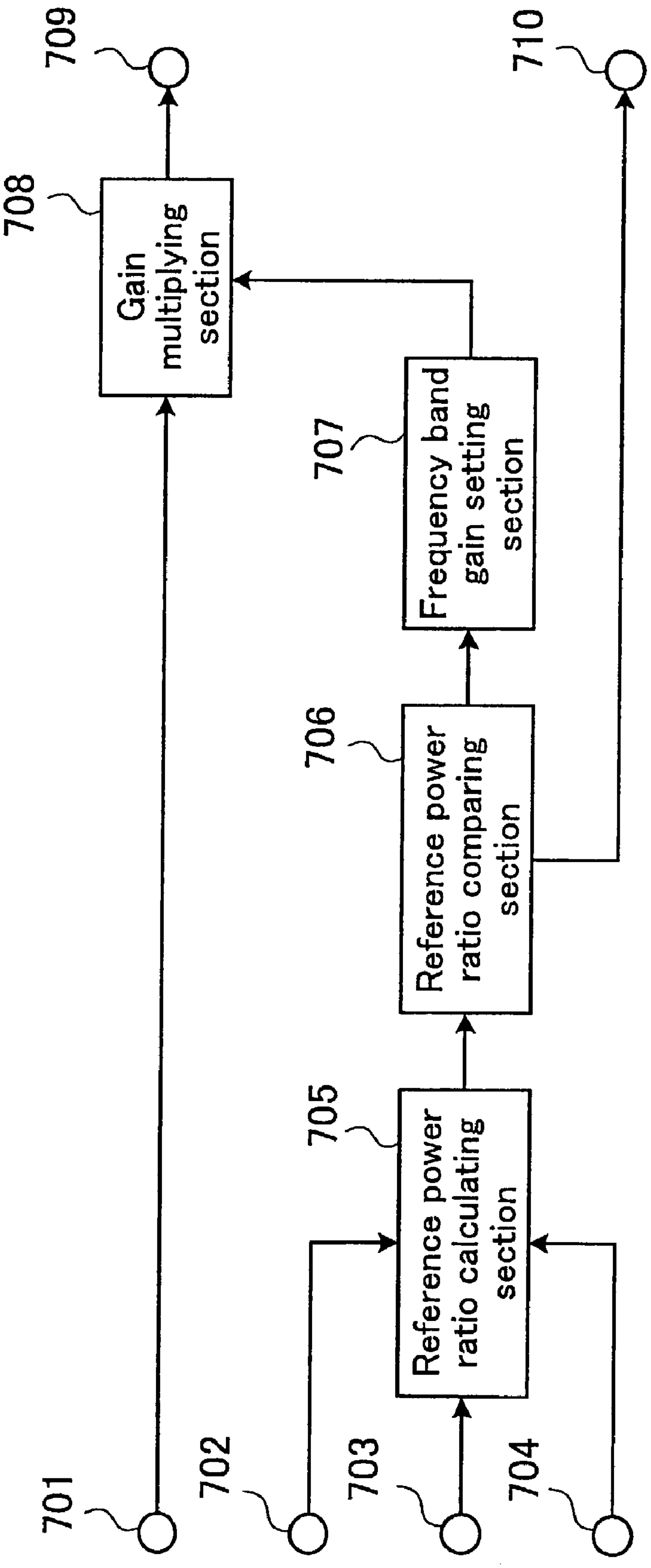
FIG. 7 is a block diagram of the howling suppressing section forming part of a third preferred embodiment of the howling detecting and suppressing apparatus.

Referring to FIGS. 1, 6 and 7 of the drawings, a third preferred embodiment of the howling detecting and suppressing apparatus according to the present invention will be described hereinlater. The third embodiment of the howling detecting and suppressing apparatus according to the present invention is entirely similar in function to the first embodiment of the howling detecting and suppressing apparatus according to the present invention except for the fact that the third embodiment of the howling detecting and suppressing apparatus detects and suppresses howling sound components with respect to frequency bands while, on the other hand, the first embodiment of the howling detecting and suppressing apparatus detects and suppresses the howling sound components with respect to frequency bands. The third embodiment of the howling detecting and suppressing apparatus according to the present invention comprises a delay generator 602, an adaptive filter 603, a coefficient updating calculating section 604, a frequency band power calculating section 605, a smoothing processing section 606, a total average frequency band power calculating section 607, a power ratio calculating section 608, a power ratio comparing section 609, a target frame counting section 610, a howling judging section 611, a reference power ratio calculating section 705, a reference power ratio comparing section 706, a frequency band gain setting section 707, and a gain multiplying section 708 in place of the delay generator 202, the adaptive filter 203, the coefficient updating calculating section 204, the frequency power calculating section 205, the smoothing processing section 206, the total average frequency power calculating section 207, the power ratio calculating section 208, the power ratio comparing section 209, the target frame counting section 620, the howling judging section 211, the reference power ratio calculating section 305, the reference power ratio comparing section 306, the frequency gain setting section 307, and the gain multiplying section 308. The constitution elements of the third embodiment of the howling detecting and suppressing apparatus roughly the same as those of the first embodiment of the howling detecting and suppressing apparatus will not be described but bear the same reference numerals and legends as those of the first embodiment of the howling detecting and suppressing apparatus in FIGS. 1 to 5 to avoid tedious repetition.

In the howling detecting section of the third embodiment of the howling detecting and suppressing apparatus according to the present invention, the howling detecting section 104 is shown in FIG. 6 as comprising an input terminals 601 and 615, a delay generator 602, an adaptive filter 603, a coefficient updating calculating section 604, a frequency band power calculating section 605, a smoothing processing section 606, a total average frequency band power calculating section 607, a power ratio calculating section 608, a power ratio comparing section 609, a target frame counting section 610, a howling judging section 611, and output terminals 612, 613, and 614.

The input terminal 601 is adapted to input the howling-suppressed sound frequency signal segments collectively forming a frame generated by the howling suppressing section 105 (see FIG. 1) therethrough. The input terminal 615 is adapted to input a control signal indicating the operation state of the howling suppressing section 105 from the howling suppressing section 105. The delay generator 602 is adapted to respectively delay the howling-suppressed sound frequency signal segments collectively forming a frame generated by the howling suppressing section 105 for a predetermined number of frames to be outputted as reference frequency signal segments collectively forming a frame. The adaptive filter 603 is adapted to respectively convolve the reference frequency signal segments outputted by the delay generator 602 with coefficients to generate adapted reference frequency signal segments collectively forming a frame.

The coefficient updating calculating section 604 is adapted to respectively update the coefficients on the basis of the sound howling-suppressed sound frequency signal segments generated by the howling suppressing section 105, the reference frequency signal segments outputted by the delay generator 602, and the adapted reference frequency signal segments generated by the adaptive filter 603.

The adapted reference frequency signal segments are divided into a number of frequency bands. The frequency band power calculating section 605 is adapted to respectively calculate frequency band powers of the frequency bands of the adapted reference frequency signal segments collectively forming a frame generated by the adaptive filter 603. More specifically, the adapted reference frequency signal segments respectively corresponding to frequency segments of, for example but not limited to 10 Hz, 20 Hz, 30 Hz, 40 Hz, 50 Hz, 60 Hz, 70 Hz, 80 Hz, 90 Hz, 100 Hz, 110 Hz, and 120 Hz may are divided into frequency bands of 10 to 40 Hz, 40 to 80 Hz, 80 to 120 Hz. This means that the frequency band powers corresponding to frequency bands of 10 to 40 Hz, 40 to 80 Hz, 80 to 120 Hz are respectively calculated on the basis of the frequency signal powers corresponding to, for example, frequency segments of 10 Hz to 40 Hz, frequency segments of 40 Hz to 80 Hz, and frequency segments of 80 Hz to 120 Hz. The fact that the frequency band power calculating section 605 respectively calculates frequency band powers of the frequency bands of the adapted reference frequency signal segments collectively forming a frame leads to the fact that the amount of calculating processed to be performed by the smoothing processing section 606, the total average frequency band power calculating section 607, the power ratio calculating section 608, the power ratio comparing section 609, the target frame counting section 610, and the howling judging section 611 will be significantly reduced. The frequency band power calculating section 605 may calculate the frequency band powers of the frequency bands of the adapted reference frequency signal segments collectively forming a frame, for example, by respectively calculating frequency signal powers of the adapted reference frequency signal segments collectively forming a frame generated by the adaptive filter 603, and respectively counting up the frequency signal powers of the adapted reference frequency signal segments thus calculated for the frequency bands.

The smoothing processing section 606 is adapted respectively smooth the frequency band powers of the frequency bands collectively forming a frame calculated by the frequency band power calculating section 605 to generate smoothed frequency band powers of the frequency bands collectively forming a frame. The total average frequency band power calculating section 607 is adapted to input the smoothed frequency band powers of the frequency bands collectively forming a frame generated by the smoothing processing section 606 to calculate a total average value of the smoothed frequency band powers of the frame. The total average frequency power calculating section 607 is adapted to input the control signal from the input terminal 615.

The power ratio calculating section 608 is adapted to input frequency band power ratios of the smoothed frequency band powers of the frequency bands collectively forming the frame generated by the smoothing processing section 606 to respectively calculate frequency band power ratios of the smoothed frequency band powers of the frequency bands thus inputted to the total average value of the frequency band powers of the frame calculated by the total average frequency band power calculating section 607 to respectively generate frequency band power ratios each corresponding to frequency bands in the frame. The power ratio comparing section 609 is adapted to respectively compare the frequency band power ratios in the frame calculated by the power ratio calculating section 608 with a predetermined first howling detecting threshold value to detect howling frequency band power ratios and howling frequency bands respectively corresponding to the howling frequency band power ratios in the frame each of which exceeds the first howling detecting threshold value from among the frequency band power ratios.

The target frame counting section 610 is adapted to respectively count the number of target frames in which the howling frequency band power ratios are detected by the power ratio comparing section 609 with respect to the howling frequency bands. The howling judging section 611 is adapted to judge whether a howling sound component is present or not for each of the howling frequency bands by comparing the number of target frames counted by the target frame counting section 610 with respect to each of the howling frequency bands detected by the power ratio comparing section 609 and a predetermined second howling detecting threshold value to detect howling sound frequency bands each in which it is judged that the howling sound component is present because of the fact that the number of target frames counted by the target frame counting section 610 with respect to the howling frequency band exceeds the second howling detecting threshold value and non-howling sound frequency bands each in which it is judged that the howling sound component is not present because of the fact that the number of target frames counted by the target frame counting section 610 with respect to the howling frequency band does not exceed the second howling detecting threshold value. The output terminal 612 is adapted to output the judging information to the howling suppressing section 105. The output terminal 613 is adapted to output the smoothed frequency band powers of the adapted reference frequency signal segments collectively forming a frame generated by the smoothing processing section 606 to the howling suppressing section 104. The output terminal 614 is adapted to output the total average value of the smoothed frequency band powers of the frame calculated by the total average frequency band power calculating section 607 to the howling suppressing apparatus.

The howling suppressing section 105 of the third embodiment of the howling detecting and suppressing apparatus according to the present invention will be described with reference to FIG. 7, hereinlater.

As described above, the howling detecting section 104 is operative to generate judging information indicating a howling frequency band, transfer the judging information and the total average value of the smoothed frequency band powers to the howling suppressing section 105, and stop operations of the total average frequency band power calculating section 607, the power ratio calculating section 608, the power ratio comparing section 609, the target frame counting section 610, and the howling judging section 611 with respect to the howling frequency band when the howling detecting section 104 detects the howling sound frequency band.

The howling suppressing section 105 of the third embodiment of the howling detecting and suppressing apparatus is shown in FIG. 7 as comprising input terminals 701, 702, 703, and 704, a reference power ratio calculating section 705, a reference power ratio comparing section 706, a frequency band gain setting section 707, a gain multiplying section 708, and output terminals 709 and 710.

The howling suppressing section 105 is operative to input judging information indicating a howling frequency band and the total average value of the smoothed frequency band powers generated when the howling detecting section 104 detects the howling sound frequency band.

The input terminal 701 is adapted to input the sound frequency signal segments converted by the frequency dividing processing section 103. The input terminal 702 is connected with the output terminal 612 of the howling detecting section 104 and adapted to input the judging information from the howling detecting section 104. The input terminal 703 is connected with the output terminal 613 of the howling detecting section 104 and adapted to input the smoothed frequency band powers of the adapted reference frequency signal segments collectively forming a frame from the howling detecting section 104. The input terminal 704 is connected with the output terminal 614 of the howling detecting section 104 and is adapted to input the total average value of the smoothed frequency band powers of a frame from the howling detecting section 104.

The reference power ratio calculating section 705 provided with a storage unit. The reference power ratio calculating section 705 is adapted to input the total average value of the smoothed frequency band powers generated when the howling detecting section 104 detects the howling sound frequency band through the input terminal 704. The storage unit of the reference power ratio calculating section 705 is adapted to store the total average value of the smoothed frequency band powers generated when the howling detecting section 104 detects the howling sound frequency band. The reference power ratio calculating section 705 is adapted to input the judging information indicating a howling sound frequency signal segment corresponding to a howling frequency band through the input terminal 702, and the smoothed frequency band powers of the adapted reference frequency signal segments collectively forming a frame through the input terminal 703 from the howling detecting section 104.

The reference power ratio calculating section 705 is adapted to calculate a reference power ratio by dividing a smoothed frequency band power of a frequency band with respect to the howling frequency band generated by the smoothing processing section 606 by the total average value of the smoothed frequency band powers stored in the storage unit to generate a reference power ratio with respect to the howling frequency band. The reference power ratio calculating section 705 can obtain the smoothed frequency band power of the adapted reference frequency signal band with respect to the howling frequency band through the input terminal 703 from the howling detecting section 104 regardless whether the howling detecting section 104 detects the howling sound frequency band or not.

The reference power ratio comparing section 706 is adapted to compare the reference power ratio with respect to the howling frequency band generated by the reference power ratio calculating section 705 with a predetermined gain control threshold value to judge if the reference power ratio with respect to the howling frequency band is to be processed in a gain adjusting manner on the basis of the result of the comparison.

The frequency band gain setting section 707 is adapted to set an adjusted gain value for the howling sound frequency band when it is judged by the reference power ratio comparing section 706 that the reference power ratio with respect to the howling frequency band is to be processed in a gain adjusting manner or setting a gain through value for the howling sound frequency band when it is judged by the reference power ratio comparing section 706 that the reference power ratio with respect to the howling frequency band is not to be processed in a gain adjusting manner to generate an adjusted gain value for the howling sound frequency band. Preferably, the adjusted gain value should be a fixed value.

The gain multiplying section 708 is adapted to respectively adjust gains for the sound frequency signal segments converted by the frequency dividing processing section 103 by multiplying the gains of the howling sound frequency bands detected by the howling detecting section 104 by the adjusted gain value generated by the frequency band gain setting section 707, and passing through the non-howling sound frequency bands detected by the howling detecting section 104 to generate howling-suppressed sound frequency signal segments. Here, the adjusted gain value is a gain through value in the default state. The gain through value is "1.0".

The output terminal 709 is adapted to output the howling-suppressed sound frequency signal segments thus generated by the gain multiplying section 708 to the frequency synthesizing processing 106.

Furthermore, the reference power ratio comparing section 706 is operative to generate a control signal indicating that the reference power ratio comparing section 706 is not operating with respect to a howling frequency band to the howling detecting section 104 when the reference power ratio comparing section 706 judges that the reference power ratio with respect to the howling frequency band is not to be processed in a gain adjusting manner, and the howling detecting section 104 is operative to resume operations of the total average frequency band power calculating section 607, the power ratio calculating section 608, the power ratio comparing section 609, the target frame counting section 610, and the howling judging section 611 with respect to the howling frequency band when the howling detecting section 104 receives the control signal indicating that the reference power ratio comparing section 706 is not operating with respect to the howling frequency band. The howling suppression section 105 of the third embodiment of the howling detecting and suppressing apparatus thus constructed can suppress howling sound components with respect to frequency bands in place of frequency segments, thereby remarkably reducing the calculating processes to be performed by the reference power ratio calculating section 705, the reference power ratio comparing section 706, the frequency band gain setting section 707, and the gain multiplying section 708.

The output terminal 710 is adapted to output the control signal to the input terminal 615 of the howling detecting section 104.

The operation of the third embodiment of the howling detecting and suppressing apparatus according to the present invention will be described hereinlater. The operations of the howling detecting section 104 and the howling suppressing section 105 of the third embodiment of the howling detecting and suppressing apparatus are performed in parallel and separately with respect to a plurality of frequency bands. The operations of the third embodiment of the howling detecting and suppressing apparatus entirely the same as those of the first embodiment of the howling detecting and suppressing apparatus will not be described to avoid tedious repetition.

The adapted reference frequency signal segments are divided into a number of frequency bands. The frequency band power calculating section 605 is operated to respectively calculate frequency band powers of the frequency bands of the adapted reference frequency signal segments collectively forming a frame generated by the adaptive filter 603. Preferably, the frequency band power calculating section 605 may calculate the frequency band powers of the frequency bands of the adapted reference frequency signal segments collectively forming a frame, for example, by respectively calculating frequency signal powers of the adapted reference frequency signal segments collectively forming a frame generated by the adaptive filter 603, and respectively counting up the frequency signal powers of the adapted reference frequency signal segments thus calculated for the frequency bands.

The smoothing processing section 606 is operated respectively smooth the frequency band powers of the frequency bands collectively forming a frame calculated by the frequency band power calculating section 605 to generate smoothed frequency band powers of the frequency bands collectively forming a frame. The total average frequency band power calculating section 607 is operated to input the smoothed frequency band powers of the frequency bands collectively forming a frame generated by the smoothing processing section 606 to calculate a total average value of the smoothed frequency band powers of the frame. The total average frequency band power calculating section 607 is operated to input the control signal from the input terminal 615.

The power ratio calculating section 608 is operated to input frequency band power ratios of the smoothed frequency band powers of the frequency bands collectively forming the frame generated by the smoothing processing section 606 to respectively calculate frequency band power ratios of the smoothed frequency band powers of the frequency bands thus inputted to the total average value of the frequency band powers of the frame calculated by the total average frequency band power calculating section 607 to respectively generate frequency band power ratios each corresponding to frequency bands in the frame. The power ratio comparing section 609 is operated to respectively compare the frequency band power ratios in the frame calculated by the power ratio calculating section 608 with a predetermined first howling detecting threshold value to detect howling frequency band power ratios and howling frequency bands respectively corresponding to the howling frequency band power ratios in the frame each of which exceeds the first howling detecting threshold value from among the frequency band power ratios.

The target frame counting section 610 is operated to respectively count the number of target frames in which the howling frequency band power ratios are detected by the power ratio comparing section 609 with respect to the howling frequency bands. The howling judging section 611 is operated to judge whether a howling sound component is present or not for each of the howling frequency bands by comparing the number of target frames counted by the target frame counting section 610 with respect to each of the howling frequency bands detected by the power ratio comparing section 609 and a predetermined second howling detecting threshold value to detect howling sound frequency bands each in which it is judged that the howling sound component is present because of the fact that the number of target frames counted by the target frame counting section 610 with respect to the howling frequency band exceeds the second howling detecting threshold value and non-howling sound frequency bands each in which it is judged that the howling sound component is not present because of the fact that the number of target frames counted by the target frame counting section 610 with respect to the howling frequency band does not exceed the second howling detecting threshold value. The output terminal 612 is operated to output the judging information to the howling suppressing section 105. The output terminal 613 is operated to output the smoothed frequency band powers of the adapted reference frequency signal segments collectively forming a frame generated by the smoothing processing section 606 to the howling suppressing section 104. The output terminal 614 is operated to output the total average value of the smoothed frequency band powers of the frame calculated by the total average frequency band power calculating section 607 to the howling suppressing apparatus.

The howling detecting section 104 is operative to generate judging information indicating a howling frequency band, transfer the judging information and the total average value of the smoothed frequency band powers to the howling suppressing section 105 through the output terminal 612, and stop operations of the total average frequency band power calculating section 607, the power ratio calculating section 608, the power ratio comparing section 609, the target frame counting section 610, and the howling judging section 611 with respect to the howling frequency band when the howling detecting section 104 detects the howling sound frequency band.

The howling suppressing section 105 is then operated to input judging information indicating a howling frequency band and the total average value of the smoothed frequency band powers generated when the howling detecting section 104 detects the howling sound frequency band.

The input terminal 701 is operated to input the sound frequency signal segments converted by the frequency dividing processing section 103. The input terminal 702 is operated to input the judging information from the howling detecting section 104. The input terminal 703 is operated to input the smoothed frequency band powers of the adapted reference frequency signal segments collectively forming a frame from the howling detecting section 104. The input terminal 704 is operated to input the total average value of the smoothed frequency band powers of a frame from the howling detecting section 104.

The reference power ratio calculating section 705 is operated to input the total average value of the smoothed frequency band powers generated when the howling detecting section 104 detects the howling sound frequency band through the input terminal 704. The storage unit of the reference power ratio calculating section 705 is operated to store the total average value of the smoothed frequency band powers generated when the howling detecting section 104 detects the howling sound frequency band. The reference power ratio calculating section 705 is operated to input the judging information indicating a howling sound frequency signal segment corresponding to a howling frequency band through the input terminal 702, and the smoothed frequency band powers of the adapted reference frequency signal segments collectively forming a frame through the input terminal 703 from the howling detecting section 104.

The reference power ratio calculating section 705 is operated to calculate a reference power ratio by dividing a smoothed frequency band power of a frequency band with respect to the howling frequency band generated by the smoothing processing section 606 by the total average value of the smoothed frequency band powers stored in the storage unit to generate a reference power ratio with respect to the howling frequency band. The reference power ratio calculating section 705 can obtain the smoothed frequency band power of the adapted reference frequency signal band with respect to the howling frequency band through the input terminal 703 from the howling detecting section 104 regardless whether the howling detecting section 104 detects the howling sound frequency band or not.

The reference power ratio comparing section 706 is operated to compare the reference power ratio with respect to the howling frequency band generated by the reference power ratio calculating section 705 with a predetermined gain control threshold value to judge if the reference power ratio with respect to the howling frequency band is to be processed in a gain adjusting manner on the basis of the result of the comparison.

The frequency band gain setting section 707 is operated to set an adjusted gain value for the howling sound frequency band when it is judged by the reference power ratio comparing section 706 that the reference power ratio with respect to the howling frequency band is to be processed in a gain adjusting manner or setting a gain through value for the howling sound frequency band when it is judged by the reference power ratio comparing section 706 that the reference power ratio with respect to the howling frequency band is not to be processed in a gain adjusting manner to generate an adjusted gain value for the howling sound frequency band. Preferably, the adjusted gain value should be a fixed value.

The howling suppressing section 105 may suppress the howling frequency segment in two manners consisting of a gain reducing manner performed when the howling frequency segment is detected and a gain restoring manner performed after the howling frequency segment is suppressed to a certain degree in order to avoid the degradation of sounds. This means that the reference power ratio comparing section 706 may judge if the reference power ratio with respect to a howling frequency band is to be processed in a gain reducing manner, a gain restoring manner, or a gain through manner, and the frequency band gain setting section 707 may set a reduced gain value, an in creased gain value, or a gain through value for the howling sound frequency signal segment with respect to the howling frequency band in accordance with the result of judgment made by the frequency band gain setting section 707.

The operation to suppress the howling frequency band in two manners consisting of a gain reducing manner and a gain restoring manner performed by the reference power ratio comparing section 706 and the frequency band gain setting section 707 will be described in detail.

The reference power ratio comparing section 706 is operative to compare the reference power ratio with respect to the howling frequency band generated by the reference power ratio calculating section 705 with a predetermined gain control threshold value to judge if the reference power ratio with respect to the howling frequency band is to be processed in a gain reducing manner, a gain restoring manner, or a gain through manner on the basis of the result of the comparison.

More specifically, the reference power ratio comparing section 706 is operative to judge if the reference power ratio with respect to the howling frequency band generated by the reference power ratio calculating section 705 is greater than a first gain control threshold value to determine that the reference power ratio with respect to the howling frequency band is to be processed in a gain reducing manner when it is judged that the reference power ratio with respect to the howling frequency band is greater than the first gain control threshold value. The reference power ratio comparing section 706, otherwise, is operative to judge if the reference power ratio with respect to the howling frequency band generated by the reference power ratio calculating section 705 is less than a second gain control threshold value to determine that the reference power ratio with respect to the howling frequency band is to be processed in a gain restoring manner when it is judged that the reference power ratio with respect to the howling frequency band is less than the second gain control threshold value, or determine that the reference power ratio with respect to the howling frequency band is to be processed in a gain through manner when it is judged that the reference power ratio with respect to the howling frequency band is not less than the second gain control threshold value.

The frequency band gain setting section 707 is operative to set a reduced gain value for the howling sound frequency band as long as the reference power ratio comparing section 706 determines that the reference power ratio with respect to the howling frequency band is to be processed in the gain reducing manner, wherein the reduced gain value should be, preferably, within the range of 0 and 1.0. The frequency band gain setting section 707 is operative to set an increased gain value for the howling sound frequency band as long as the reference power ratio comparing section 706 determines that the reference power ratio with respect to the howling frequency band is to be processed in the gain restoring manner, wherein the increased gain value should be, preferably, more than 1.0. The frequency band gain setting section 707 is operative to set a gain through value for the howling sound frequency band when the reference power ratio comparing section 706 determines that the reference power ratio with respect to the howling frequency band is to be processed in the gain through manner, wherein the gain through value should be, preferably, equal to 1.0.

The reference power ratio comparing section 706 is operative to generate a control signal indicating that the reference power ratio comparing section 706 is not operating with respect to the howling frequency band to the howling detecting section 104 when the reference power ratio comparing section 706 judges that the reference power ratio with respect to the howling frequency band is to be processed in a gain through manner. The howling detecting section 104 is operative to resume operations of the total average frequency band power calculating section 607, the power ratio calculating section 608, the power ratio comparing section 609, the target frame counting section 610, and the howling judging section 611 with respect to the howling frequency band when the howling detecting section 104 receives the control signal with respect to the howling frequency band.

The gain multiplying section 708 is operated to respectively adjust gains for the sound frequency signal segments converted by the frequency dividing processing section 103 by multiplying the gains of the howling sound frequency bands detected by the howling detecting section 104 by the adjusted gain value generated by the frequency band gain setting section 707, and passing through the non-howling sound frequency bands detected by the howling detecting section 104 to generate howling-suppressed sound frequency signal segments. Here, the adjusted gain value is a gain through value in the default state.

The output terminal 709 is operated to output the howling-suppressed sound frequency signal segments thus generated by the gain multiplying section 708 to the frequency synthesizing processing 106.

Furthermore, the reference power ratio comparing section 706 is operative to generate a control signal indicating that the reference power ratio comparing section 706 is not operating with respect to a howling frequency band to the howling detecting section 104 when the reference power ratio comparing section 706 judges that the reference power ratio with respect to the howling frequency band is not to be processed in a gain adjusting manner, and the howling detecting section 104 is operative to resume operations of the total average frequency band power calculating section 607, the power ratio calculating section 608, the power ratio comparing section 609, the target frame counting section 610, and the howling judging section 611 with respect to the howling frequency band when the howling detecting section 104 receives the control signal indicating that the reference power ratio comparing section 706 is not operating with respect to the howling frequency band.

The output terminal 710 is operated to output the control signal to the input terminal 615 of the howling detecting section 104.

The third embodiment of the howling detecting and suppressing apparatus according to the present invention, in which the frequency band power calculating section 605 respectively calculates frequency band powers of the frequency bands of the adapted reference frequency signal segments collectively forming a frame leads to the fact that the amount of calculating processes to be performed by the smoothing processing section 606, the total average frequency band power calculating section 607, the power ratio calculating section 608, the power ratio comparing section 609, the target frame counting section 610, and the howling judging section 611 will be significantly reduced, makes it possible to detect howling sound components with less amount of the calculating processes. Furthermore, third embodiment of the howling detecting and suppressing apparatus according to the present invention can suppress howling sound components with respect to frequency bands in place of frequency segments, thereby remarkably reducing the calculating processes to be performed by the reference power ratio calculating section 705, the reference power ratio comparing section 706, the frequency band gain setting section 707, and the gain multiplying section 708.

Frequency bands, for example, in which howling sound components are expected to occur, are already known; the howling detecting and suppressing apparatus according to the present invention can effectively detect and suppress the howling frequency bands having howling sound components. This means that the operations of the power ratio calculating section 608, the power ratio comparing section 609, the target frame counting section 610, and the howling judging section 611 of the howling detecting section 104 and the howling suppressing section 105 may be limited to one or more frequency segments, each in which howling sound components are likely expected to occur.

The third embodiment of the howling detecting and suppressing apparatus according to the present invention, in which the howling detecting section 104 judges whether a howling sound component is present or not only for each of sound frequency signal segments corresponding to specified one or more frequency bands, each in which howling sound components are expected to occur, and the howling suppressing section 105 changes the gains of the howling sound frequency bands respectively corresponding to specified one or more frequency bands detected by the howling detecting section 104 and passing through the non-howling sound frequency bands detected by the howling detecting section 104, can eliminate unnecessary calculation operations and prevent the degradation of the sound quality caused by the gain setting operation.

In the howling detecting and suppressing apparatus according to the present invention, the total average frequency band power calculating section 607 may input the smoothed frequency band powers of the frequency bands collectively forming a frame generated by the smoothing processing section 606, detect maximum and quasi-maximum smoothed frequency band powers of maximum and quasi-maximum frequency bands from among the smoothed frequency band powers of the frequency bands collectively forming a frame thus inputted. Here, the maximum and quasi-maximum frequency bands are intended to mean frequency bands having the maximum and quasi-maximum frequency bands, respectively. The total average frequency band power calculating section 607 may then judge if any one or more of the maximum and quasi-maximum frequency bands correspond to specified one or more frequency bands, and calculate a total average value of the smoothed frequency band powers of the frame excluding one or more of the maximum and quasi-maximum frequency bands corresponding to the specified one or more frequency bands when it is judged that the one or more of the maximum and quasi-maximum frequency bands correspond to the specified one or more frequency bands. Here, the specified one or more frequency bands are intended to mean frequency bands, in which howling sound components are least expected to occur. The howling detecting and suppressing apparatus, in which the power ratio calculating section 608 can calculate frequency band power ratios of the smoothed frequency band powers of the frame excluding one or more of the maximum and quasi-maximum frequency bands corresponding to the specified one or more frequency bands in which, for example, howling sound components are least expected to occur, enabling the power ratio comparing section 609, the target frame counting section 610, and the howling judging section 611, to accurately detect howling frequency bands, can reliably detect howling sound components.

In the third embodiment of the howling detecting and suppressing apparatus according to the present invention, the reference power ratio comparing section 706 may compare the reference power ratio with respect to the howling frequency band generated by the reference power ratio calculating section 705 with a predetermined gain control threshold value to judge if the reference power ratio with respect to the howling frequency band is to be processed in a plurality of gain reducing manners, a plurality of gain restoring manners, or a gain through manner on the basis of the result of the comparison. The frequency band gain setting section 707 may set a specified reduced gain value for the howling sound frequency band when the reference power ratio comparing section 706 judges that the reference power ratio with respect to the howling frequency band is to be processed in one of the gain reducing manners. There may be provided a plurality of specified reduced gain values and each of the gain reducing manners may uniquely correspond to one of the specified reduced gain values. The frequency band gain setting section 707 may also set a specified increased gain value for the howling sound frequency band when the reference power ratio comparing section 706 judges that the reference power ratio with respect to the howling frequency band is to be processed in one of the gain restoring manners. There may be provided a plurality of specified increased gain values and each of the gain restoring manners may uniquely correspond to one of the specified increased gain values. The frequency band gain setting section 707 may set a gain through value for the howling sound frequency band when the reference power ratio comparing section 706 judges that the reference power ratio with respect to the howling frequency band is to be processed in the gain through manner. The second embodiment of the howling detecting and suppressing apparatus thus constructed can prevent the degradation of sound quality caused by the gain setting operation.

From the foregoing description, it is to be understood that the howling detecting and suppressing apparatus according to the present invention can eliminate the needs of the plurality of notch filters, thereby being simple in construction, and reliably, accurately, and promptly detect and suppress a howling sound component to enhance the sound quality.

The description hereinlater will be directed to a fourth preferred embodiment of the howling detecting and suppressing apparatus according to the howling detecting and suppressing apparatus. The fourth embodiment of the howling detecting and suppressing apparatus is similar in function to the second embodiment of the howling detecting and suppressing apparatus except for the fact that the fourth embodiment of the howling detecting and suppressing apparatus according to the present invention detects and suppresses howling sound components with respect to frequency bands while, on the other hand, the second embodiment of the howling detecting and suppressing apparatus detects and suppresses the howling sound components with respect to frequency bands. The reference power ratio comparing section 707 is provided with an adjusting gain value updating unit for updating the adjusted gain value. This means that the reference power ratio comparing section 707 of the fourth embodiment of the howling detecting and suppressing apparatus can update the adjusted gain value while, on the other hand, the third embodiment of the howling detecting and suppressing apparatus uses a fixed value for an adjusted gain value. The adjusted gain value updating unit may include, for example but not limited to, a reduced gain updating unit for updating a reduced gain value updating unit for updating a reduced gain value and an increased gain value updating unit for updating an increased gain value, which will be described later. The constitution elements of the fourth embodiment of the howling detecting and suppressing apparatus roughly the same as those of the third embodiment of the howling detecting and suppressing apparatus will not be described but bear the same reference numerals and legends as those of the third embodiment of the howling detecting and suppressing apparatus in FIGS. 1, 6, and 7 to avoid tedious repetition.

The operation of the fourth embodiment of the howling detecting and suppressing apparatus similar to the third embodiment of the howling detecting and suppressing apparatus except for the gain setting operation. The description hereinlater will be directed to the gain setting operation performed by the fourth embodiment of the howling detecting and suppressing apparatus.

The reference power ratio comparing section 706 is operated to compare the reference power ratio with respect to the howling frequency band generated by the reference power ratio calculating section 705 with a predetermined gain control threshold value to judge if the reference power ratio with respect to the howling frequency band is to be processed in a plurality of gain reducing manners, a plurality of gain restoring manners, or a gain through manner on the basis of the result of a comparison. The reference band gain setting section 707 is operated to set a specified reduced gain value for the howling sound frequency signal segment when the reference power ratio comparing section 706 judges that the reference power ratio with respect to the howling frequency band is to be processed in one of the gain reducing manners, the specified reduced gain value uniquely corresponding to the one of the gain reducing manners, set a specified increased gain value for the howling sound frequency signal segment when the reference power ratio comparing section 706 judges that the reference power ratio with respect to the howling frequency band is to be processed in one of the gain restoring manners, the specified increased gain value uniquely corresponding to the one of the gain restoring manners, or set a gain through value for the howling sound frequency signal segment when the reference power ratio comparing section 706 judges that the reference power ratio with respect to the howling frequency band is to be processed in the gain through manner.

The frequency band gain setting section 707, for example, may be provided with an adjusted gain value updating unit for updating the adjusted gain value by subtracting an adjusted gain updating constant from the adjusted gain value. The frequency band gain setting section 707 may set an adjusted gain value for the howling sound frequency band and then, the adjusted gain value updating unit may update the adjusted gain value by subtracting the adjusted gain updating constant from the adjusted gain value when it is judged by the reference power ratio comparing section 706 that the reference power ratio with respect to the howling frequency band is to be processed in a gain adjusting manner.

The frequency band gain setting section 707 may also be provided with an adjusted gain value updating unit for updating the adjusted gain value by adding an adjusted gain updating constant to the adjusted gain value. The adjusted gain value updating constant may include, for example, a positive value and a negative value. The frequency band gain setting section 707 may set an adjusted gain value for the howling sound frequency band and then, the adjusted gain value updating unit may update the adjusted gain value by adding the adjusted gain updating constant to the adjusted gain value when it is judged by the reference power ratio comparing section 706 that the reference power ratio with respect to the howling frequency band is to be processed in a gain adjusting manner.

Furthermore, the frequency band gain setting section 707 may be provided with an adjusted gain value updating unit for updating the adjusted gain value by multiplying the adjusted gain value with a adjusted gain updating coefficient. The frequency band gain setting section 707 may set an adjusted gain value for the howling sound frequency band and then, the adjusted gain value updating unit may update the adjusted gain value by multiplying the adjusted gain value with the adjusted gain updating coefficient when it is judged by the reference power ratio comparing section 706 that the reference power ratio with respect to the howling frequency band is to be processed in a gain adjusting manner.

The gain setting operation performed by the fourth embodiment of the howling detecting and suppressing apparatus is similar to the gain setting operation performed by the second embodiment of the howling detecting and suppressing apparatus described in detail with reference to FIG. 5. Detailed description will be therefore omitted to avoid tedious repetition.

The fourth embodiment of the howling detecting and suppressing apparatus according to the present invention can update an adjusted gain value such as a reduced gain value and an increased gain value while, on the other hand, the third embodiment of the howling detecting and suppressing apparatus uses a fixed value for an adjusted gain value. The fourth embodiment of the howling detecting and suppressing apparatus thus constructed can suppress the howling sound components more promptly than the third embodiment of the howling detecting and suppressing apparatus especially when the frequency band gain setting section 707 is equipped with a reduced gain value updating unit for updating the reduced gain value by multiplying the reduced gain value by a reduced gain updating coefficient.

From the foregoing description, it is to be understood that the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 8:
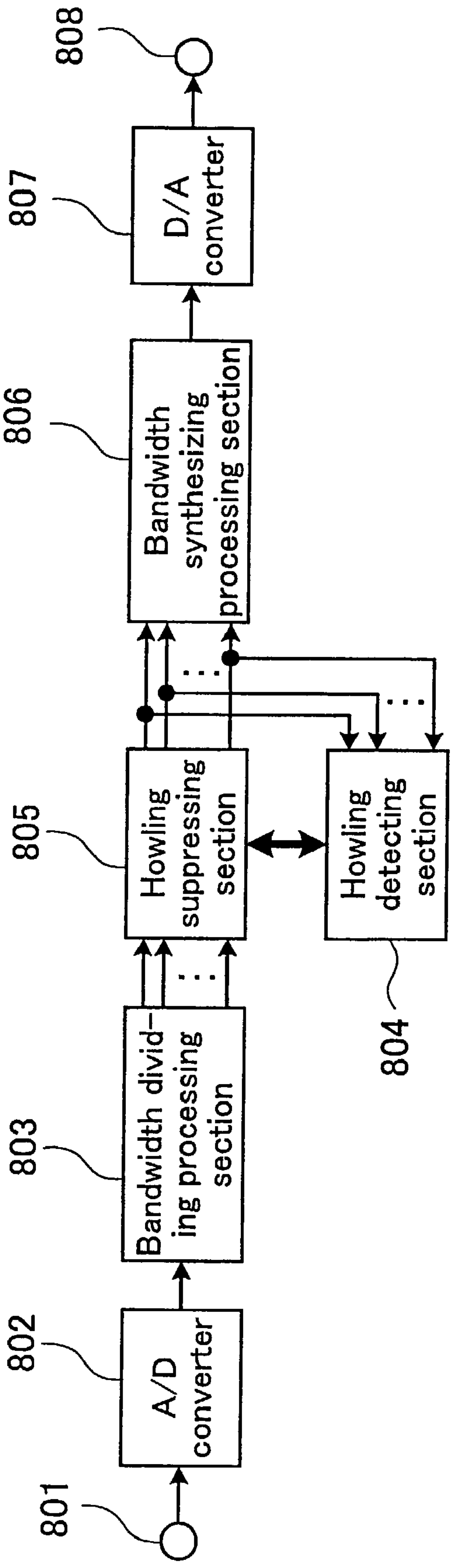
FIG. 8 is a block diagram of a fifth embodiment of the howling detecting and suppressing apparatus according to the present invention.
Figure 9:
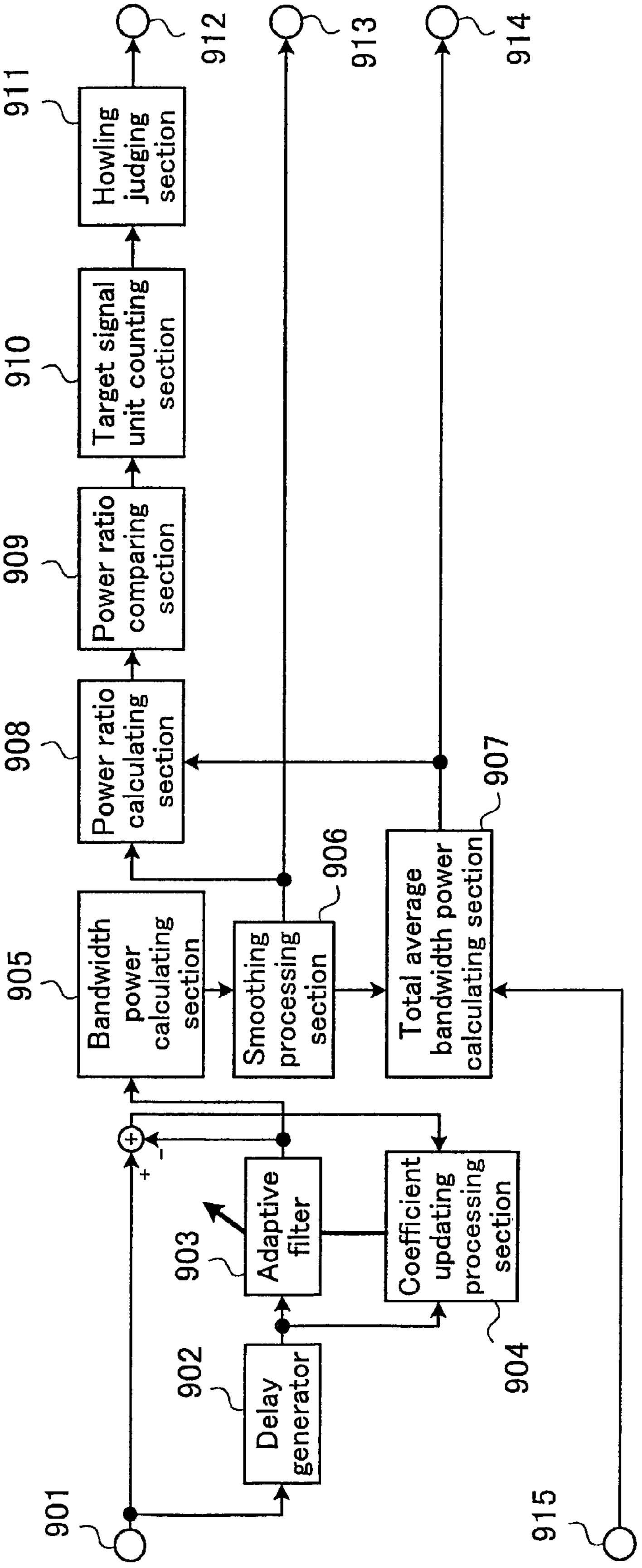
FIG. 9 is a block diagram of the howling detecting section forming part of the howling detecting and suppressing apparatus shown in FIG. 8.
Figure 10:
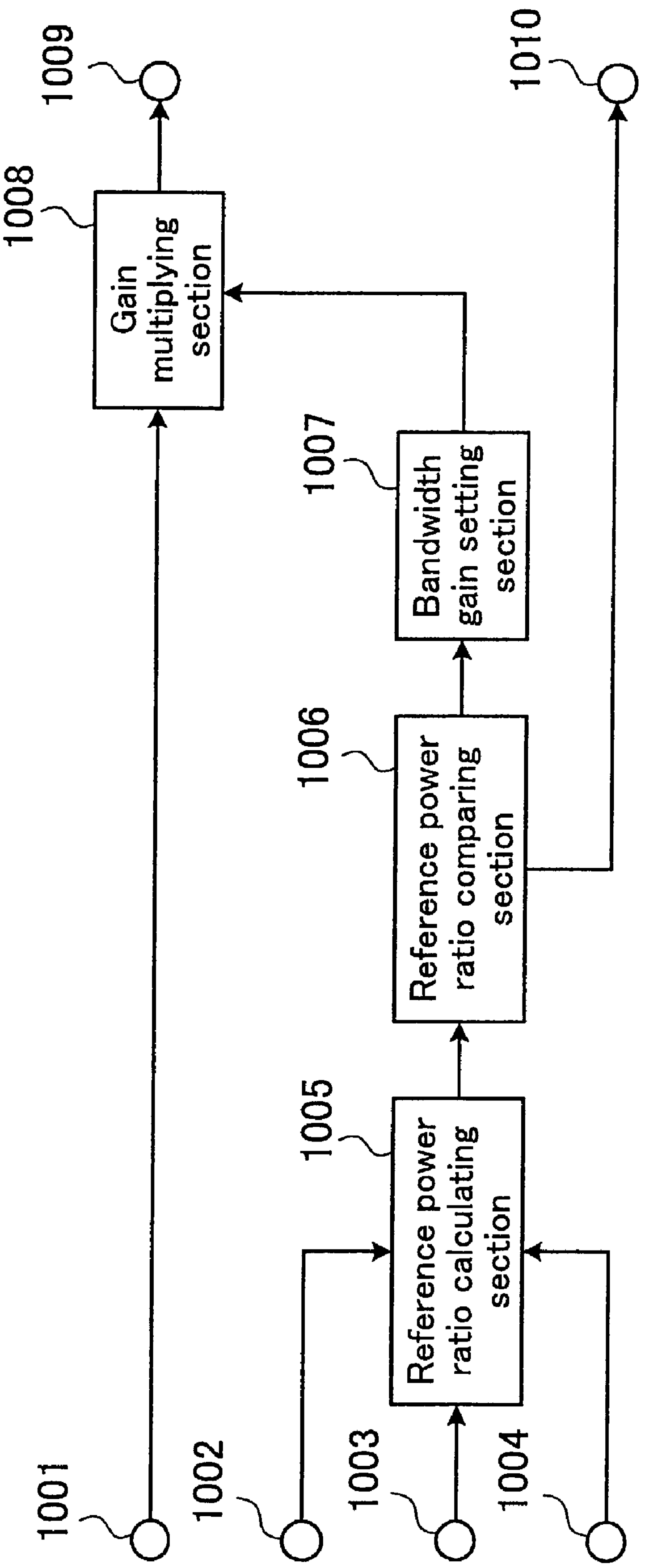
FIG. 10 is a block diagram of the howling suppressing section forming part of the howling detecting and suppressing apparatus shown in FIG. 8.

Referring to FIGS. 8, 9, and 10 of the drawings, a fifth preferred embodiment of the howling detecting and suppressing apparatus according to the present invention will be described hereinlater. The fifth embodiment of the howling detecting and suppressing apparatus according to the present invention is entirely similar in function to the first embodiment of the howling detecting and suppressing apparatus according to the present invention except for the fact that the fifth embodiment of the howling detecting and suppressing apparatus detects and suppresses howling sound components with respect to frequency bandwidths while, on the other hand, the first embodiment of the howling detecting and suppressing apparatus detects and suppresses the howling sound components with respect to frequency bandwidths. The fifth embodiment of the howling detecting and suppressing apparatus according to the present invention comprises an input terminal 801, an A/D converter 802, a bandwidth dividing processing section 803, a howling detecting section 804, a howling suppressing section 805, a bandwidth synthesizing processing section 806, a D/A converter 807, and an output terminal 808.

In the fifth embodiment of the howling and suppressing apparatus, the input terminal 801 is connected with, for example but not limited to, a microphone, not shown. The input terminal 801 is adapted to input an analog sound signal therethrough. The A/D converter 802 is adapted to convert the analog sound signal inputted through by the input terminal 801 into a digital sound signal including a plurality of sound time signal segments. Each of the sound time signal segments corresponds to a time segment. The bandwidth dividing processing section 803 is adapted to convert a plurality of sound time signal segments each corresponding to a time segment into a plurality of sound frequency signal bandwidths each corresponding to a frequency bandwidth. The bandwidth dividing processing section 803 may include, for example but not limited to, a plurality of bandpass filters, each of which is adapted to pass through the corresponding one of the frequency signal bandwidths. More specifically, a "sound frequency signal bandwidth" herein used is intended to mean a time sound signal segment corresponding to a frequency bandwidth.

The howling suppressing section 805 is adapted to respectively adjust gains for the sound frequency signal bandwidths converted by the bandwidth dividing processing section 803 to generate howling-suppressed sound frequency signal bandwidths. The howling detecting section 804 is adapted to judge whether a howling sound component is present or not for each of the howling-suppressed sound frequency signal bandwidths generated by the howling suppressing section 805 to detect howling sound frequency signal bandwidths each in which it is judged that the howling sound component is present and non-howling sound frequency signal bandwidths each in which it is judged that the howling sound component is not present. The frequency synthesizing processing section 806 is adapted to synthesize the howling-suppressed sound frequency signal bandwidths suppressed by the howling suppressing section 805 to generate howling-suppressed sound time signal segments. The D/A converter 807 is adapted to convert the howling-suppressed sound time signal bandwidths collectively forming a howling-suppressed digital sound signal generated by the frequency synthesizing processing section 806 into a howling-suppressed analog sound signal. The output terminal 808 connected with, for example but not limited to, a speaker, not shown, is adapted to output the howling-suppressed analog sound signal converted by the D/A converter 807 therethrough.

More specifically, the howling suppressing section 805 is operative to respectively adjust gains for the sound frequency signal bandwidths converted by the bandwidth dividing processing section 803 by changing the gains of the howling sound frequency signal bandwidths detected by the howling detecting section 804 and passing through the non-howling sound frequency signal bandwidths detected by the howling detecting section 804. The howling detecting and suppressing apparatus thus constructed can automatically detect and suppress howling sound components occurred as a result of acoustic coupling, for example, between a speaker and a microphone.

The howling detecting section 804 of the fifth embodiment of the howling detecting and suppressing apparatus according to the present invention will be described in detail with reference to FIG. 9, hereinlater.

The howling detecting section 804 of the fifth embodiment of the howling detecting and suppressing apparatus is shown in FIG. 9 as comprising an input terminal 901, an input terminal 915, a delay generator 902, an adaptive filter 903, a coefficient updating calculating section 904, a bandwidth power calculating section 905, a smoothing processing section 906, a total average bandwidth power calculating section 907, a power ratio calculating section 908, a power ratio comparing section 909, a target signal unit counting section 910, a howling judging section 911, an output terminal 912, an output terminal 913, and an output terminal 914.

The bandwidth dividing processing section 803 is operative to convert a plurality of sound time signal segments collected for a predetermined number of sample periods into a plurality of sound frequency signal bandwidths collectively forming one signal unit. The bandwidth dividing processing section 803 may include, for example but not limited to, a plurality of bandpass filters, each of which is adapted to pass through the corresponding one of the frequency signal bandwidths. The bandpass filters may include, for example but not limited to, FIR (Finite Impulse Response) type bandpass filters, and IIR (Infinite Impulse Response) type bandpass filters. Alternatively, the bandwidth dividing processing section 803 may convert a plurality of sound time signal segments collected for a predetermined number of sample periods into a plurality of sound frequency signal bandwidths collectively forming one signal unit by means of sub-band signal processing, which enables to reduce operations. The signal unit is intended to mean a unit of sound frequency signal bandwidths converted by the bandwidth dividing processing section 803, and may be, for example but not limited to a predetermined number of frames or the number of sound frequency signal bandwidths converted in a predetermined number of sample periods.

The input terminal 901 is adapted to input the howling-suppressed sound frequency signal bandwidths collectively forming a signal unit generated by the howling suppressing section 805 therethrough. The input terminal 915 is adapted to input a control signal indicating the operation state of the howling suppressing section 805, which will be described later, from the howling suppressing section 805. The total average bandwidth power calculating section 907 is adapted to input the control signal from the input terminal 915.

The delay generator 902 is adapted to respectively delay the howling-suppressed sound frequency signal bandwidths collectively forming a signal unit generated by the howling suppressing section 805 for a predetermined number of signal units to be outputted as reference frequency signal bandwidths collectively forming a signal unit. The adaptive filter 903 is adapted to respectively convolve the reference frequency signal bandwidths outputted by the delay generator 902 with coefficients to generate adapted reference frequency signal bandwidths collectively forming a signal unit.

The coefficient updating calculating section 904 is adapted to respectively update the coefficients on the basis of the sound howling-suppressed sound frequency signal bandwidths generated by the howling suppressing section 805, the reference frequency signal bandwidths outputted by the delay generator 902, and the adapted reference frequency signal bandwidths generated by the adaptive filter 903.

The bandwidth power calculating section 905 is adapted to respectively calculate bandwidth powers of the adapted reference frequency signal bandwidths collectively forming a signal unit generated by the adaptive filter 903. The smoothing processing section 906 is adapted to respectively smooth the bandwidth powers of the adapted reference frequency signal bandwidths collectively forming a signal unit calculated by the bandwidth power calculating section 905 to generate smoothed bandwidth powers of the adapted reference frequency signal bandwidths collectively forming a signal unit. The output terminal 913 is adapted to output the smoothed bandwidth powers of the adapted reference frequency signal bandwidths collectively forming a signal unit generated by the smoothing processing section 906 to the howling suppressing section 805.

The total average bandwidth power calculating section 907 is adapted to input the smoothed bandwidth powers of the adapted reference frequency signal bandwidths collectively forming a signal unit generated by the smoothing processing section 906 to calculate a total average value of the smoothed bandwidth powers of the signal unit. The output terminal 914 is adapted to output the total average value of the smoothed bandwidth powers of the signal unit calculated by the total average bandwidth power calculating section 907 to the howling suppressing section 805.

The power ratio calculating section 908 is adapted to input bandwidth power ratios of the smoothed bandwidth powers of the adapted reference frequency signal bandwidths collectively forming the signal unit generated by the smoothing processing section 906 to respectively calculate bandwidth power ratios of the smoothed bandwidth powers of the adapted reference frequency signal bandwidths thus inputted to the total average value of the bandwidth powers of the signal unit calculated by the total average bandwidth power calculating section 907 to respectively generate bandwidth power ratios each corresponding to frequency bandwidths in the signal unit.

The power ratio comparing section 909 is adapted to respectively compare the bandwidth power ratios in the signal unit calculated by the power ratio calculating section 908 with a predetermined first howling detecting threshold value to detect howling bandwidth power ratios and howling frequency bandwidths respectively corresponding to the howling bandwidth power ratios in the signal unit each of which exceeds the first howling detecting threshold value from among the bandwidth power ratios.

The target signal unit counting section 910 is adapted to respectively count the number of target signal units in which the howling bandwidth power ratios are detected by the power ratio comparing section 909 with respect to the howling frequency bandwidths. The howling judging section 911 is adapted to judge whether a howling sound component is present or not for each of the howling frequency bandwidths by comparing the number of target signal units counted by the target signal unit counting section 910 with respect to each of the howling frequency bandwidths detected by the power ratio comparing section 909 and a predetermined second howling detecting threshold value to detect howling sound frequency signal bandwidths each in which it is judged that the howling sound component is present because of the fact that the number of target signal units counted by the target signal unit counting section 910 with respect to the howling frequency bandwidth exceeds the second howling detecting threshold value and non-howling sound frequency signal bandwidths each in which it is judged that the howling sound component is not present because of the fact that the number of target signal units counted by the target signal unit counting section 910 with respect to the howling frequency bandwidth does not exceed the second howling detecting threshold value.

The howling judging section 911 is adapted to generate judging information indicating howling frequency signal bandwidths respectively corresponding to howling frequency bandwidths, which will be described later, when howling sound frequency bandwidths are detected. The output terminal 912 is adapted to output the judging information to the howling suppressing section 805. Furthermore, the howling detecting section 804 is operative to stop the operations of the total average bandwidth power calculating section 907, the power ratio calculating section 908, the power ratio comparing section 909, the target signal unit counting section 910, and the howling judging section 911 with respect to the howling frequency bandwidth when the howling judging section 211 detects the howling sound frequency signal bandwidth.

The howling suppressing section 805 of the fifth embodiment of the howling detecting and suppressing apparatus according to the present invention will be described in detail with reference to FIG. 10, hereinlater.

As described earlier, the howling detecting section 804 is operative to generate judging information indicating a howling sound frequency signal bandwidth corresponding to a howling frequency bandwidth, transfer the judging information and the total average value of the smoothed bandwidth powers to the howling suppressing section 805, and stop operations of the total average bandwidth power calculating section 907, the power ratio calculating section 908, the power ratio comparing section 909, the target signal unit counting section 910, and the howling judging section 911 with respect to the howling frequency bandwidth when the howling detecting section 804 detects the howling sound frequency signal bandwidth.

The howling suppressing section 805 of the fifth embodiment of the howling detecting and suppressing apparatus is shown in FIG. 10 as comprising input terminals 1001, 1002, 1003, and 1004, a reference power ratio calculating section 1005, a reference power ratio comparing section 1006, a bandwidth gain setting section 1007, a gain multiplying section 1008, and output terminals 1009, and 1010.

The howling suppressing section 805 is operative to input judging information indicating a howling sound frequency signal bandwidth corresponding to a howling frequency bandwidth and the total average value of the smoothed bandwidth powers generated when the howling detecting section 804 detects the howling sound frequency signal bandwidth.

The input terminal 1001 is adapted to input the sound frequency signal bandwidths converted by the bandwidth dividing processing section 803. The input terminal 1002 is connected with the output terminal 912 of the howling detecting section 804 and adapted to input the judging information from the howling detecting section 804. The input terminal 1003 is connected with the output terminal 913 of the howling detecting section 804 and adapted to input the smoothed bandwidth powers of the adapted reference frequency signal bandwidths collectively forming a signal unit from the howling detecting section 804. The input terminal 1004 is connected with the output terminal 914 of the howling detecting section 804 and is adapted to input the total average value of the smoothed bandwidth power of the signal unit from the howling detecting section 804.

The reference power ratio calculating section 1005 provided with a storage unit. The reference power ratio calculating section 1005 is adapted to input the total average value of the smoothed bandwidth powers of the signal unit when the howling detecting section 804 detects the howling sound frequency signal bandwidth through the input terminal 1004. The storage unit of the reference power ratio calculating section 1005 is adapted to store the total average value of the smoothed bandwidth powers of the signal unit generated when the howling detecting section 804 detects the howling sound frequency signal bandwidth. The reference power ratio calculating section 1005 is adapted to input the judging information indicating howling frequency signal bandwidths respectively corresponding to howling frequency bandwidths through the input terminal 1002, and the smoothed bandwidth powers of the adapted reference frequency signal bandwidths collectively forming a signal unit through the input terminal 1003 from the howling detecting section 804.

The reference power ratio calculating section 1005 is adapted to calculate a reference power ratio by dividing a smoothed bandwidth power of an adapted reference frequency signal bandwidth with respect to the howling frequency bandwidth generated by the smoothing processing section 906 by the total average value of the smoothed bandwidth powers stored in the storage unit to generate a reference power ratio with respect to the howling frequency bandwidth. The reference power ratio calculating section 1005 can still obtain the smoothed bandwidth power of an adapted reference frequency signal bandwidth with respect to the howling frequency bandwidth through the input terminal 1003 from the howling detecting section 804 regardless of whether the howling detecting section 804 detects the howling sound frequency signal bandwidth or not.

The reference power ratio comparing section 1006 is adapted to compare the reference power ratio with respect to the howling frequency bandwidth generated by the reference power ratio calculating section 1005 with a predetermined gain control threshold value to judge if the reference power ratio with respect to the howling frequency bandwidth is to be processed in a gain adjusting manner on the basis of the result of the comparison.

The bandwidth gain setting section 1007 is adapted to set an adjusted gain value for the howling sound frequency signal bandwidth when it is judged by the reference power ratio comparing section 1006 that the reference power ratio with respect to the howling frequency bandwidth is to be processed in a gain adjusting manner or setting a gain through value for the howling sound frequency signal bandwidth when it is judged by the reference power ratio comparing section 1006 that the reference power ratio with respect to the howling frequency bandwidth is not to be processed in a gain adjusting manner to generate an adjusted gain value for the howling sound frequency signal bandwidth. Preferably, the adjusted gain value should be a fixed value.

The gain multiplying section 1008 is adapted to respectively adjust gains for the sound frequency signal bandwidths converted by the bandwidth dividing processing section 803 by multiplying the gains of the howling sound frequency signal bandwidths detected by the howling detecting section 804 by the adjusted gain value generated by the bandwidth gain setting section 1007, and passing through the non-howling sound frequency signal bandwidths detected by the howling detecting section 804 to generate howling-suppressed sound frequency signal bandwidths. Here, the adjusted gain value is a gain through value in the default state. Preferably, the gain through value should be "1.0".

The output terminal 1009 is adapted to output the howling-suppressed sound frequency signal bandwidths thus generated by the gain multiplying section 1008 to the frequency synthesizing processing section 806.

Furthermore, the reference power ratio comparing section 1006 is operative to generate a control signal indicating that the reference power ratio comparing section 1006 is not operating with respect to the howling frequency bandwidth to the howling detecting section 804 when the reference power ratio comparing section 1006 judges that the reference power ratio with respect to the howling frequency bandwidth is not to be processed in a gain adjusting manner, and the howling detecting section 804 is operative to resume operations of the total average bandwidth power calculating section 907, the power ratio calculating section 908, the power ratio comparing section 909, the target signal unit counting section 910, and the howling judging section 911 with respect to the howling frequency bandwidth when the howling detecting section 804 receives the control signal with respect to the howling frequency bandwidth.

The output terminal 1010 is adapted to output the control signal to the input terminal 915 of the howling detecting section 804.

The operation of the fifth embodiment of the howling detecting and suppressing apparatus is similar to that of the first embodiment of the howling detecting and suppressing apparatus except for the fact that the fifth embodiment of the howling detecting and suppressing apparatus according to the present invention detects and suppress howling sound components with respect to the frequency bandwidths while, on the other hand, the first embodiment of the howling detecting and suppressing apparatus detects and suppresses the howling detecting and suppressing apparatus detects and suppresses the howling sound components with respect to frequency bands. Detailed description will be therefore omitted to avoid tedious repetition.

The howling suppressing section 805 may suppress the howling frequency bandwidth in tow manners consisting of a gain reducing manner performed when the howling frequency bandwidth is detected and a gain restoring manner performed after the howling frequency bandwidth is suppressed to a certain degree in order to avoid the degradation of sounds. This means that the reference power ratio comparing section 1006 may judge if the reference power ratio with respect to a howling frequency bandwidth is to be processed in a gain reducing manner, a gain restoring manner, or a gain through manner, and the bandwidth gain setting section 1007 may set a reduced gain value, an in creased gain value, or a gain through value for the howling sound frequency signal bandwidth with respect to the howling frequency bandwidth in accordance with the result of judgment made by the bandwidth gain setting section 1007.

The operation to suppress the howling frequency bandwidth in two manners consisting of a gain reducing manner and a gain restoring manner performed by the reference power ratio comparing section 1006 and the bandwidth gain setting section 1007 will be described.

The reference power ratio comparing section 1006 is operative to compare the reference power ratio with respect to the howling frequency bandwidth generated by the reference power ratio calculating section 1005 with a predetermined gain control threshold value to judge if the reference power ratio with respect to the howling frequency bandwidth is to be processed in a gain reducing manner, a gain restoring manner, or a gain through manner on the basis of the result of the comparison. The operation performed by the reference power ratio comparing section 1006 similar to the operation performed by the reference power ratio comparing section 306 will be omitted to avoid tedious repetition.

The bandwidth gain setting section 1007 is operative to set a reduced gain value for the howling sound frequency signal bandwidth as long as the reference power ratio comparing section 1006 determines that the reference power ratio with respect to the howling frequency bandwidth is to be processed in the gain reducing manner, wherein the reduced gain value should be, preferably, within the range of 0 and 1.0. The bandwidth gain setting section 1007 is operative to set an increased gain value for the howling sound frequency signal bandwidth as long as the reference power ratio comparing section 1006 judges that the reference power ratio with respect to the howling frequency bandwidth is to be processed in the gain restoring manner, wherein the increased gain value should be, preferably, more than 1.0. The bandwidth gain setting section 1007 is operative to set a gain through value for the howling sound frequency signal bandwidth when the reference power ratio comparing section 1006 judges that the reference power ratio with respect to the howling frequency bandwidth is to be processed in the gain through manner, wherein the gain through value should be, preferably, equal to 1.0.

The reference power ratio comparing section 1006 is operative to generate a control signal indicating that the reference power ratio comparing section 1006 is not operating with respect to the howling frequency bandwidth to the howling detecting section 804 when the reference power ratio comparing section 1006 judges that the reference power ratio with respect to the howling frequency bandwidth is to be processed in a gain through manner.

The reference power ratio comparing section 1006 is operative to generate a control signal indicating that the reference power ratio comparing section 1006 is not operating with respect to the howling frequency bandwidth to the howling detecting section 804 when the reference power ratio comparing section 1006 judges that the howling frequency bandwidth is to be processed in a gain through manner. The howling detecting section 804 is operative to resume operations of the total average bandwidth power calculating section 907, the power ratio calculating section 908, the power ratio comparing section 909, the target signal unit counting section 910, and the howling judging section 911 with respect to the howling frequency bandwidth when the howling detecting section 804 receives the control signal with respect to the howling frequency bandwidth.

Frequency bandwidths, for example, in which howling sound components are expected to occur, are already known, the howling detecting and suppressing apparatus according to the present invention can effectively detect and suppress the howling frequency bandwidths having howling sound components. This means that the operations of the power ratio calculating section 908, the power ratio comparing section 909, the signal unit counting section 910, and the howling judging section 911 of the howling detecting section 804 and the howling suppressing section 805 may be limited to one or more frequency bandwidths, each in which howling sound components are likely expected to occur. The fifth embodiment of the howling detecting and suppressing apparatus according to the present invention, in which the howling detecting section 804 judges whether a howling sound component is present or not only for each of sound frequency signal bandwidths corresponding to specified one or more frequency bandwidths, each in which howling sound components are expected to occur, and the howling suppressing section 805 changes the gains of the howling sound frequency signal bandwidths respectively corresponding to the specified one or more frequency bandwidths detected by the howling detecting section 804 and passing through the non-howling sound frequency signal bandwidths detected by the howling detecting section 804, can eliminate unnecessary calculation operations and prevent the degradation of sound quality caused by the gain setting operation.

In the fifth embodiment of the howling detecting and suppressing apparatus according to the present invention, the total average bandwidth power calculating section 907 may input the smoothed bandwidth powers of the adapted reference frequency signal bandwidths collectively forming a signal unit generated by the smoothing processing section 906, detect maximum and quasi-maximum smoothed bandwidth powers of maximum and quasi-maximum adapted reference frequency signal bandwidths from among the smoothed bandwidth powers of the adapted reference frequency signal bandwidths collectively forming a signal unit thus inputted. Here, the maximum and quasi-maximum adapted reference frequency signal bandwidths are intended to means adapted reference frequency signal bandwidths respectively having the maximum and quasi-maximum smoothed bandwidth powers. The total average bandwidth power calculating section 907 may then judge if any one or more of the maximum and quasi-maximum adapted reference frequency signal bandwidths correspond to specified one or more frequency bandwidths, and calculate a total average value of the smoothed bandwidth powers of the signal unit excluding one or more of the maximum and quasi-maximum adapted reference frequency signal bandwidths corresponding to the specified one or more frequency bandwidths when it is judged that the one or more of the maximum and quasi-maximum adapted reference frequency signal bandwidths correspond to the specified one or more frequency bandwidths. Preferably, the specified one or more frequency bandwidths may frequency bandwidth in which howling sound components are least expected to occur. The howling detecting and suppressing apparatus, in which the power ratio calculating section 908 can respectively calculate bandwidth power ratios of the smoothed bandwidth powers of the adapted reference frequency signal bandwidths excluding one or more one or more of the maximum and quasi-maximum adapted reference frequency signal bandwidths correspond to the specified one or more frequency bandwidths in which, for example, howling sound components are least expected to occur, enabling the power ratio comparing section 909, the signal unit counting section 910, and the howling judging section 911 to accurately detect howling frequency bandwidth, can reliably detect howling sound components.

The fifth embodiment of the howling detecting and suppressing apparatus according to the present invention thus constructed can detect and suppress howling sound components, eliminating the needs of a plurality of a plurality of notch filters, thereby being simple in construction.

In the fifth embodiment of the howling detecting and suppressing apparatus according to the present invention, the reference power ratio comparing section 1006 may compare the reference power ratio with respect to the howling frequency bandwidth generated by the reference power ratio calculating section 1005 with a predetermined gain control threshold value to judge if the reference power ratio with respect to the howling frequency bandwidth is to be processed in a plurality of gain reducing manners, a plurality of gain restoring manners, or a gain through manner on the basis of the result of the comparison. The bandwidth gain setting section 1007 may set a specified reduced gain value for the howling sound frequency signal bandwidth when the reference power ratio comparing section 1006 judges that the reference power ratio with respect to the howling frequency bandwidth is to be processed in one of the gain reducing manners. There may be provided a plurality of specified reduced gain values and each of the gain reducing manners may uniquely correspond to one of the specified reduced gain values. The bandwidth gain setting section 1007 may also set a specified increased gain value for the howling sound frequency signal bandwidth when the reference power ratio comparing section 1006 judges that the reference power ratio with respect to the howling frequency bandwidth is to be processed in one of the gain restoring manners. There may be provided a plurality of specified increased gain values and each of the gain restoring manners may uniquely correspond to one of the specified increased gain values. The bandwidth gain setting section 1007 may also set a gain through value for the howling sound frequency signal bandwidth when the reference power ratio comparing section 1006 judges that the reference power ratio with respect to the howling frequency bandwidth is to be processed in the gain through manner. The howling detecting and suppressing apparatus thus constructed can prevent the degradation of sound quality caused by the gain setting operation.

The description hereinlater will be directed to a modified fifth embodiment of the howling detecting and suppressing apparatus according to the present invention. The modified fifth embodiment of the howling detecting and suppressing apparatus is similar in function to the second embodiment of the howling detecting and suppressing apparatus except for the fact that the modified fifth embodiment of the howling detecting and suppressing apparatus can detect and suppress howling sound components with respect to frequency bandwidths while, on the other hand, the second embodiment of the howling detecting and suppressing apparatus detects and suppresses the howling sound components with respect to frequency segments. The bandwidth gain setting section 1007 of the modified fifth embodiment of the howling detecting and suppressing apparatus can update the adjusted gain value while, on the other hand, the fifth embodiment of the howling detecting and suppressing apparatus uses a fixed value for an adjusted fain value. The adjusted gain value updating unit may include, for example but not limited to, a reduced gain updating unit for updating a reduced gain value updating unit for updating a reduced gain value and an increased gain value updating unit for updating an increased gain value, which will be described later. The constitution elements of the modified fifth embodiment of the howling detecting and suppressing apparatus roughly the same as those of the fifth embodiment of the howling detecting and suppressing apparatus will not be described but bear the same reference numerals and legends as those of the third embodiment of the howling detecting and suppressing apparatus in FIGS. 8, 9, and 10 to avoid tedious repetition.

The operation of the modified fifth embodiment of the howling detecting and suppressing apparatus similar to the fifth embodiment of the howling detecting and suppressing apparatus except for the gain setting operation. The description hereinlater will be directed to the gain setting operation performed by the modified fifth embodiment of the howling detecting and suppressing apparatus.

The reference power ratio comparing section 1006 is operative to compare the reference power ratio with respect to the howling frequency bandwidth generated by the reference power ratio calculating section 1005 with a predetermined gain control threshold value to judge if the reference power ratio with respect to the howling frequency bandwidth is to be processed in a plurality of gain reducing manners, a plurality of gain restoring manners, or a gain through manner on the basis of the result of the comparison. The bandwidth gain setting section 1007 is operative to set a specified reduced gain value for the howling sound frequency signal bandwidth when the reference power ratio comparing section 1006 judges that the reference power ratio with respect to the howling frequency bandwidth is to be processed in one of the gain reducing manners, set a specified increased gain value for the howling sound frequency signal bandwidth when the reference power ratio comparing section 1006 judges that the reference power ratio with respect to the howling frequency bandwidth is to be processed in one of the gain restoring manners, or set a gain through value for the howling sound frequency signal bandwidth when the reference power ratio comparing section 1006 judges that the reference power ratio with respect to the howling frequency bandwidth is to be processed in the gain through manner.

The bandwidth gain setting section 1007, for example, may be provided with an adjusted gain value updating unit for updating the adjusted gain value by subtracting an adjusted gain updating constant from the adjusted gain value. The bandwidth gain setting section 1007 may set an adjusted gain value for the howling sound frequency signal bandwidth and the adjusted gain value updating unit may update the adjusted gain value by subtracting the adjusted gain updating constant from the adjusted gain value when it is judged by the reference power ratio comparing section 1006 that the reference power ratio with respect to the howling frequency bandwidth is to be processed in a gain adjusting manner.

The bandwidth gain setting section 1007 may also be provided with an adjusted gain value updating unit for updating the adjusted gain value by adding an adjusted gain updating constant to the adjusted gain value. The bandwidth gain setting section 1007 may set an adjusted gain value for the howling sound frequency signal bandwidth and the adjusted gain value updating unit may update the adjusted gain value by adding the adjusted gain updating constant to the adjusted gain value when it is judged by the reference power ratio comparing section 1006 that the reference power ratio with respect to the howling frequency bandwidth is to be processed in a gain adjusting manner.

Furthermore, the bandwidth gain setting section 1007 may be provided with an adjusted gain value updating unit for updating the adjusted gain value by multiplying the adjusted gain value with a adjusted gain updating coefficient. The bandwidth gain setting section 1007 may set an adjusted gain value for the howling sound frequency signal bandwidth and the adjusted gain value updating unit may update the adjusted gain value by multiplying the adjusted gain value with the adjusted gain updating coefficient when it is judged by the reference power ratio comparing section 1006 that the reference power ratio with respect to the howling frequency bandwidth is to be processed in a gain adjusting manner.

The gain setting operation performed by the modified fifth embodiment of the howling detecting and suppressing apparatus is similar to the gain setting operation performed by the second embodiment of the howling detecting and suppressing apparatus described in detail with reference to FIG. 5. Detailed description will be therefore omitted to avoid tedious repetition.

The modified fifth embodiment of the howling detecting and suppressing apparatus according to the present invention can update an adjusted gain value such as a reduced gain value and an increased gain value while, on the other hand, the fifth embodiment of the howling detecting and suppressing apparatus uses a fixed value for an adjusted gain value. The modified fifth embodiment of the howling detecting and suppressing apparatus thus constructed can suppress the howling sound components more promptly than the fifth embodiment of the howling detecting and suppressing apparatus especially when the frequency band gain setting section 707 is equipped with a reduced gain value updating unit for updating the reduced gain value by multiplying the reduced gain value by a reduced gain updating coefficient.

From the foregoing description, it is to be understood that the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 11:
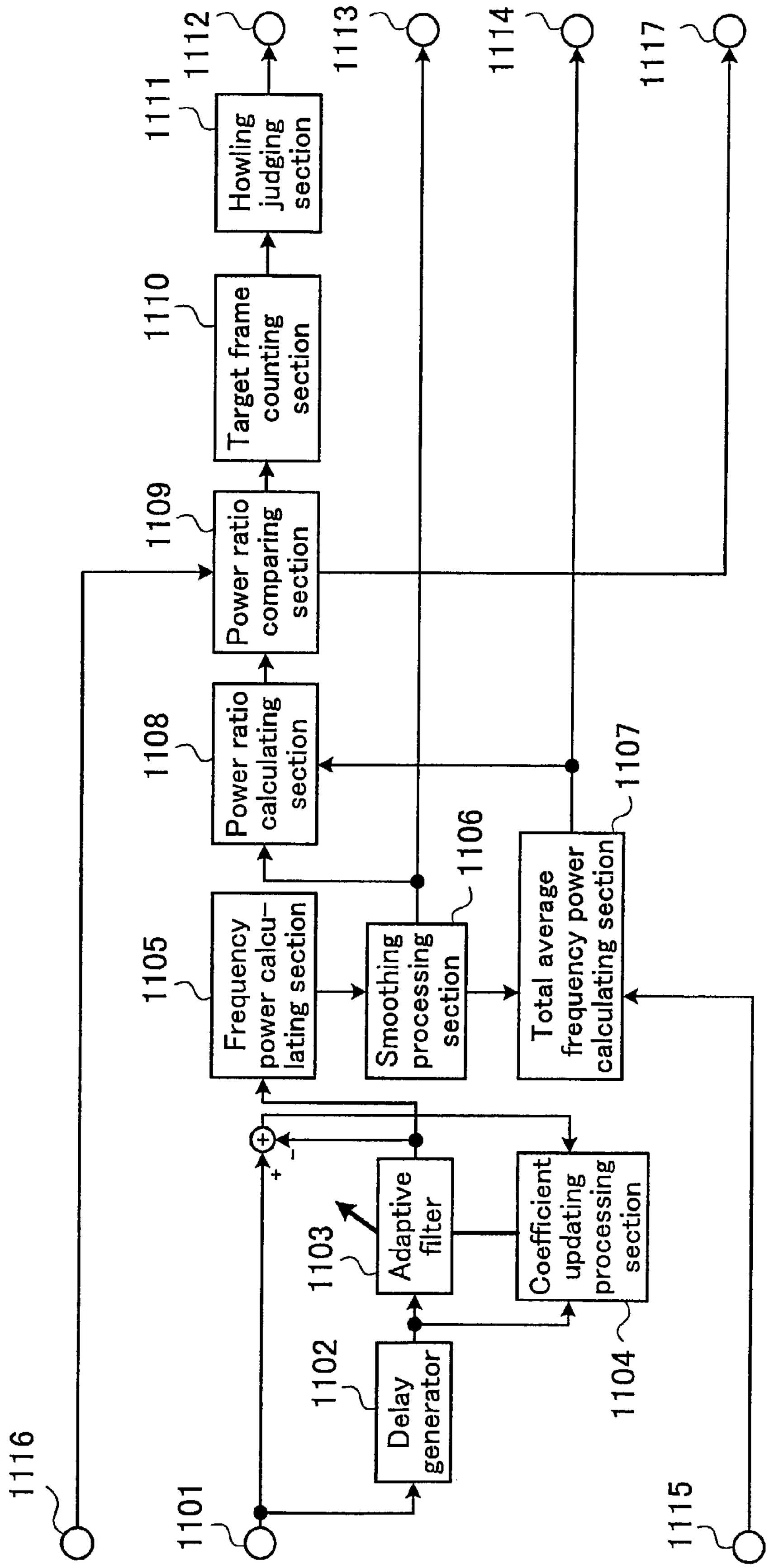
FIG. 11 is a block diagram of the howling detecting section forming part of a sixth preferred embodiment of the howling detecting and suppressing apparatus according to the present invention.
Figure 12:
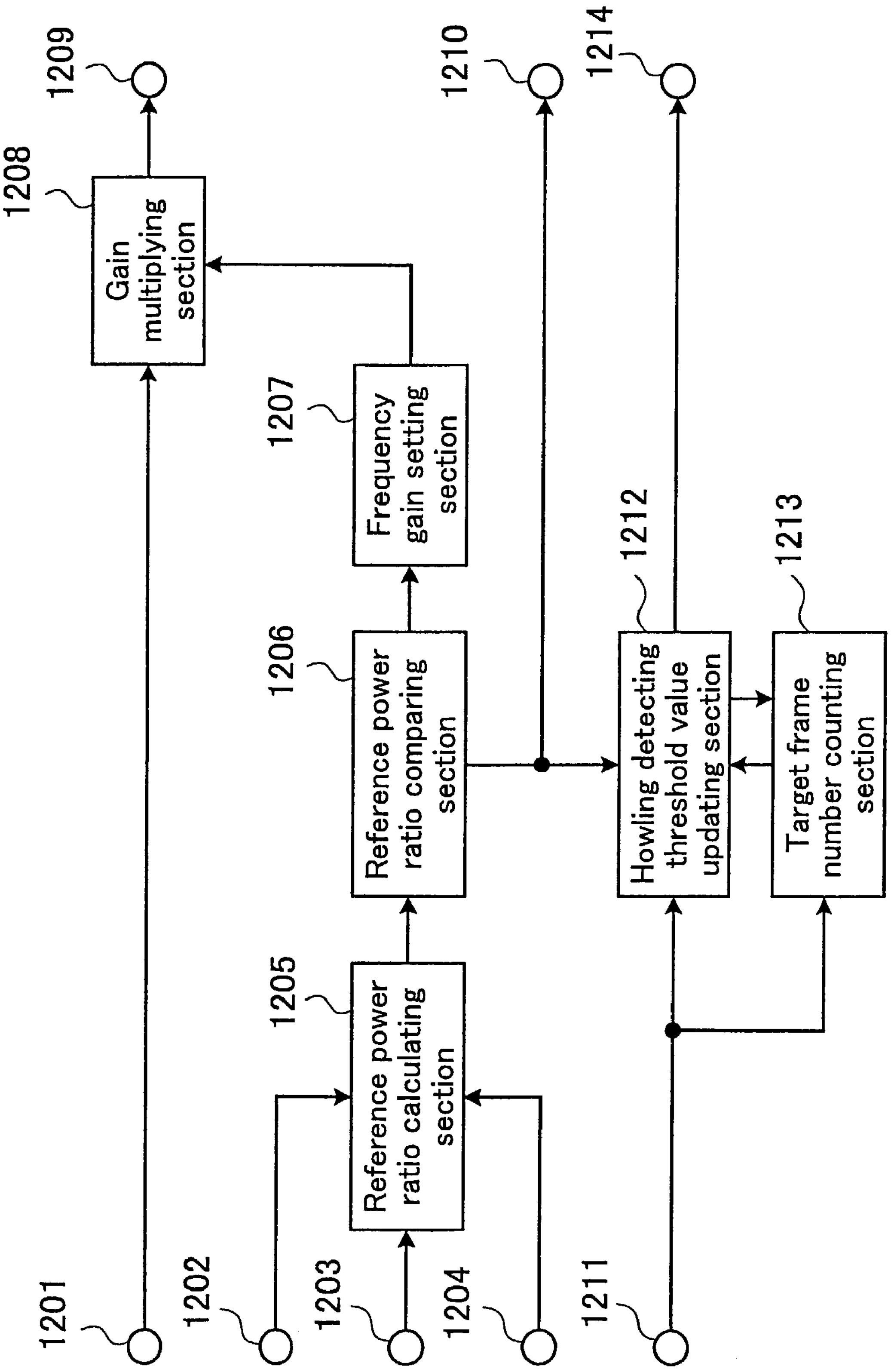
FIG. 12 is a block diagram of the howling suppressing section forming part of the howling detecting and suppressing apparatus shown in FIG. 11.

Referring to FIGS. 11 and 12 of the drawings there is shown a sixth preferred embodiment of the howling detecting and suppressing apparatus according to the present invention. The sixth preferred embodiment of the howling detecting and suppressing apparatus according to the present invention is roughly similar in construction to the first and second embodiments of the howling detecting and suppressing apparatus. The constitution elements of the sixth embodiment of the holing detecting and suppressing apparatus roughly the same as those of the first and second embodiments of the howling detecting and suppressing apparatus will not be described but bear the same reference numerals and legends as those of the first embodiment of the howling detecting and suppressing apparatus in FIG. 1.

The howling detecting section 104 of the sixth embodiment of the howling detecting and suppressing apparatus is shown in FIG. 11 as comprising input terminals 1101, 1115, 1116, a delay generator 1102, an adaptive filter 1103, a coefficient updating calculating section 1104, a frequency power calculating section 1105, a smoothing processing section 1106, a total average frequency power calculating section 1107, a power ratio calculating section 1108, a power ratio comparing section 1109, a target frame counting section 1110, a howling judging section 1111, output terminals 1112, 1113, 1114, and 1117.

The input terminal 1101 is adapted to input the howling-suppressed sound frequency signal segments collectively forming a frame generated by the suppressing section 105 therethrough. The input terminal 1115 is adapted to input a control signal indicating the operation state of the howling suppressing section 105. The total average frequency power calculating section 207 is adapted to input the control signal from the input terminal 215.

The delay generator 1102 is adapted to respectively delay the howling-suppressed sound frequency signal segments collectively forming a frame inputted by the input terminal 1101 for a predetermined number of frames to be outputted as reference frequency signal segments collectively forming a frame. The adaptive filter 1103 is adapted to respectively convolve the reference frequency signal segments outputted by the delay generator 1102 with coefficients to generate adapted reference frequency signal segments collectively forming a frame.

The coefficient updating calculating section 1104 is adapted to respectively update the coefficients on the basis of the sound howling-suppressed sound frequency signal segments generated by the howling suppressing section 105 inputted by the input terminal 1101, the reference frequency signal segments outputted by the delay generator 1102, and the adapted reference frequency signal segments generated by the adaptive filter 1103.

The frequency power calculating section 1105 is adapted to respectively calculate frequency signal powers of the adapted reference frequency signal segments collectively forming a frame generated by the adaptive filter 1103. The smoothing processing section 1106 is adapted to respectively smooth the frequency signal powers of the adapted reference frequency signal segments collectively forming a frame calculated by the frequency power calculating section 1105 to generate smoothed frequency signal powers of the adapted reference frequency signal segments collectively forming a frame. The output terminal 1113 is adapted to output the smoothed frequency signal powers of the adapted reference frequency signal segments collectively forming a frame generated by the smoothing processing section 1106 to the howling suppressing section 105.

The total average frequency power calculating section 1107 is adapted to input the smoothed frequency signal powers of the adapted reference frequency signal segments collectively forming a frame generated by the smoothing processing section 1106 to calculate a total average value of the smoothed frequency signal powers of the frame. The output terminal 1114 is adapted to output the total average value of the smoothed frequency signal powers of the frame calculated by the total average frequency power calculating section 1107 to the howling suppressing section 105.

The power ratio calculating section 1108 is adapted to input frequency signal power ratios of the smoothed frequency signal powers of the adapted reference frequency signal segments collectively forming the frame generated by the smoothing processing section 1106 to respectively calculate frequency signal power ratios of the smoothed frequency signal powers of the adapted reference frequency signal segments thus inputted to the total average value of the frequency signal powers of the frame calculated by the total average frequency power calculating section 1107 to respectively generate frequency signal power ratios each corresponding to frequency segments in the frame.

The power ratio comparing section 1109 is adapted to respectively compare the frequency signal power ratios in the frame calculated by the power ratio calculating section 1108 with a first howling detecting threshold value to detect howling frequency signal power ratios and howling frequency segments respectively corresponding to the howling frequency signal power ratios in the frame each of which exceeds the first howling detecting threshold value from among the frequency signal power ratios.

The target frame counting section 1110 is adapted to respectively count the number of target frames in which the howling frequency signal power ratios are detected by the power ratio comparing section 1109 with respect to the howling frequency segments. The howling judging section 1111 is adapted to judge whether a howling sound component is present or not for each of the howling frequency segments by comparing the number of target frames counted by the target frame counting section 1110 with respect to each of the howling frequency segments detected by the power ratio comparing section 1109 and a predetermined second howling detecting threshold value to detect howling sound frequency signal segments each in which it is judged that the howling sound component is present because of the fact that the number of target frames counted by the target frame counting section 1110 with respect to the howling frequency segment exceeds the second howling detecting threshold value and non-howling sound frequency signal segments each in which it is judged that the howling sound component is not present because of the fact that the number of target frames counted by the target frame counting section 1110 with respect to the howling frequency segment does not exceed the second howling detecting threshold value.

The howling judging section 1111 is adapted to generate judging information indicating howling frequency signal segments respectively corresponding to howling frequency segments, which will be described later, when howling sound frequency segments are detected. The output terminal 1112 is adapted to output the judging information to the howling suppressing section 105. Furthermore, the howling detecting section 104 is operative to stop the operations of the total average frequency power calculating section 1107, the power ratio calculating section 1108, the power ratio comparing section 1109, the target frame counting section 1110, and the howling judging section 1111 with respect to a howling frequency segment when the howling judging section 1111 detect a howling sound frequency segment with respect to the howling frequency segment. The input terminal 1116 is adapted to input the first howling detecting threshold value from the howling suppressing section 105. The output terminal 1118 is adapted to output the first howling detecting threshold value to the howling suppressing section 105. The power ratio comparing section 1109 is operative to input the first howling detecting threshold value from the howling suppressing section 105 through the input terminal 1116. The power ratio comparing section 1109 is operative to output the first howling detecting threshold value to the howling suppressing section through the output terminal 1117.

The howling suppressing section 105 of the first embodiment of the howling detecting and suppressing apparatus according to the present invention will be described with reference to FIG. 12, hereinlater.

As described earlier, the howling detecting section 104 is operative to generate judging information indicating a howling sound frequency signal segment corresponding to a howling frequency segment, transfer the judging information through the output terminals 1112 and the total average value of the smoothed frequency signal powers through the output terminal 1114 to the howling suppressing section 105 and stop operations of the total average frequency power calculating section 1107, the power ratio calculating section 1108, the power ratio comparing section 1109, the target frame counting section 1110, and the howling judging section 1111 with respect to the howling frequency segment when the howling detecting section 104 detects the howling sound frequency signal segment.

The howling suppressing section 105 of the first embodiment of the howling detecting and suppressing apparatus is shown in FIG. 12 as comprising input terminals 1201, 1202, 1203, 1204, and 1211, a reference power ratio calculating section 1205, a reference power ratio comparing section 1206, a frequency gain setting section 1207, a gain multiplying section 1208, a howling detecting threshold value updating section 1212, a target frame number counting section 1213, and output terminals 1209, 1210, and 1214.

The howling suppressing section 105 is operative to input judging information indicating a howling sound frequency signal segment corresponding to a howling frequency segment and the total average value of the smoothed frequency signal powers generated when the howling detecting section 104 detects the howling sound frequency signal segment.

The input terminal 1201 is adapted to input the sound frequency signal segments converted by the frequency dividing processing section 103. The input terminal 1202 is connected with the output terminal 1112 of the howling detecting section 104 and adapted to input the judging information from the howling detecting section 104. The input terminal 1203 is connected with the output terminal 1113 of the howling detecting section 104 and adapted to input the smoothed frequency signal powers of the adapted reference frequency signal segments collectively forming a frame from the howling detecting section 104. The input terminal 1204 is connected with the output terminal 1114 of the howling detecting section 104 and is adapted to input the total average value of the smoothed frequency signal powers of a frame from the howling detecting section 104.

The reference power ratio calculating section 1205 provided with a storage unit. The reference power ratio calculating section 1205 is adapted to input the total average value of the smoothed frequency signal powers of a frame when the howling detecting section 104 detects the howling sound frequency signal segment through the input terminal 1204 from the howling detecting section 104. The storage unit of the reference power ratio calculating section 1205 is adapted to store the total average value of the smoothed frequency signal powers of the frame generated when the howling detecting section 104 detects the howling sound frequency signal segment. The reference power ratio calculating section 1205 is adapted to input the judging information indicating a howling sound frequency signal segment corresponding to a howling frequency segment through the input terminal 1202, and the smoothed frequency signal powers of the adapted reference frequency signal segments collectively forming a frame through the input terminal 1203 from the howling detecting section 104.

The reference power ratio calculating section 1205 is adapted to calculate a reference power ratio by dividing a smoothed frequency signal power of an adapted reference frequency signal segment with respect to the howling frequency segment generated by the smoothing processing section 1106 by the total average value of the smoothed frequency signal powers stored in the storage unit to generate a reference power ratio with respect to the howling frequency segment. The reference power ratio calculating section 1205 can still obtain the smoothed frequency signal power of the adapted reference frequency signal segment with respect to the howling frequency segment through the input terminal 1203 from the howling detecting section 104 regardless of whether the howling detecting section 104 detects the howling sound frequency signal segment or not.

The reference power ratio comparing section 1206 is adapted to compare the reference power ratio with respect to the howling frequency segment generated by the reference power ratio calculating section 1205 with a predetermined gain control threshold value to judge if the reference power ratio with respect to the howling frequency segment is to be processed in a gain adjusting manner on the basis of the result of a comparison.

The frequency gain setting section 1207 is adapted to set an adjusted gain value for the howling sound frequency signal segment when it is judged by the reference power ratio comparing section 1206 that the reference power ratio with respect to the howling frequency segment is to be processed in a gain adjusting manner or setting a gain through value for the howling sound frequency signal segment when it is judged by the reference power ratio comparing section 1206 that the reference power ratio with respect to the howling frequency segment is not to be processed in a gain adjusting manner to generate an adjusted gain value for the howling sound frequency signal segment. Preferably, the adjusted gain value should be a fixed value.

The gain multiplying section 1208 is adapted to respectively adjust gains for the sound frequency signal segments converted by the frequency dividing processing section 103 inputted through the input terminal 1201 by multiplying the gains of the howling sound frequency signal segments detected by the howling detecting section 104 by the adjusted gain value set by the frequency gain setting section 1207, and passing through the non-howling sound frequency signal segments detected by the howling detecting section 104 to generate howling-suppressed sound frequency signal segments. Here, the adjusted gain value is a gain through value in the default state. Preferably, the gain through value should be “1.0”.

The output terminal 1209 is adapted to output the howling-suppressed sound frequency signal segments thus generated by the gain multiplying section 1208 to the frequency synthesizing processing section 106.

Furthermore, the reference power ratio comparing section 1206 is operative to generate a control signal indicating that the reference power ratio comparing section 1206 is operating or not with respect to a howling frequency segment to the howling detecting section 104 when the reference power ratio comparing section 1206 judges that the reference power ratio with respect to the howling frequency segment is not to be processed in a gain adjusting manner, and the howling detecting section 104 is operative to resume operations of the total average frequency power calculating section 1107, the power ratio calculating section 1108, the power ratio comparing section 1109, the target frame counting section 1110, and the howling judging section 1111 with respect to the howling frequency segment when the howling detecting section 104 receives the control signal indicating that the reference power ratio comparing section 1206 is not operating with respect to the howling frequency segment.

The output terminal 1210 is adapted to output the control signal to the input terminal 1115 of the howling detecting section 104. The input terminal 1211 is adapted to input the first howling detecting threshold value through the output terminal 1117 from the howling detecting section 104. The howling detecting threshold value updating section 1212 is adapted to input the control signal from the reference power ratio comparing section 1206 and the first howling detecting threshold value through the input terminal 1211.

The howling detecting threshold value updating section 1212 is adapted to judge whether the reference power ratio comparing section 1206 is operating or not on the basis of the control signal inputted from the reference power ratio comparing section 1206 to update the first howling detecting threshold value with respect to the howling frequency segment by decrementing the first howling detecting threshold value with respect to the howling frequency segment by a predetermined updating value to output the first howling detecting threshold value with respect to the howling frequency segment thus updated to the power ratio comparing section 1109 through the output terminal 1214 when it is judged that the reference power ratio comparing section 1206 is not operating with respect to the howling frequency segment on the basis of the control signal inputted from the reference power ratio comparing section 1206. The output terminal 1214 is connected with the input terminal 1116 of the howling detecting section 104 and adapted to output the first howling detecting threshold value with respect to the howling frequency segment thus updated to the power ratio comparing section 1109 of the howling detecting section 104.

The threshold value updating counting section 1213 is adapted to judge whether the first howling detecting threshold value with respect to the howling frequency segment updated by the howling detecting threshold value updating section 1212 is equal to the original first howling detecting threshold value with respect to the howling frequency segment or not. The original first howling detecting threshold value with respect to the frequency segment is intended to mean a predetermined first howling detecting threshold value which the power ratio comparing section 1109 uses in the default state. The threshold value updating counting section 1213 may be equipped with, for example, a storage portion for storing the original first howling detecting threshold value with respect to the frequency segment therein.

When it is judged that the first howling detecting threshold value with respect to the howling frequency segment is not equal to the original first howling detecting threshold value with respect to the howling frequency segment, the threshold value updating counting section 1213 is adapted to count the number of frames in which it is judged that the reference power ratio comparing section 1206 is not operating with respect to the howling frequency segment on the basis of the control signal inputted from the reference power ratio comparing section 1206.

When, on the other hand, it is judged that the first howling detecting threshold value with respect to the howling frequency segment is equal to the original first howling detecting threshold value with respect to the howling frequency segment, the threshold value updating counting section 1213 is adapted to output the first howling detecting threshold value with respect to the howling frequency segment updated by the howling detecting threshold value updating section 1212 to the howling detecting threshold value updating section 1212.

The threshold value updating counting section 1213 is adapted to judge whether the number of frames thus calculated with respect to the howling frequency segment is greater than a predetermined threshold value.

When it is judged that the number of frames thus calculated with respect to the howling frequency segment is greater than the threshold value, the threshold value updating counting section 1213 is adapted to update the first howling detecting threshold value with respect to the howling frequency segment by incrementing the first howling detecting threshold value with respect to the howling frequency segment by a predetermined increment value and output the first howling detecting threshold value with respect to the howling frequency segment thus updated to the howling detecting threshold value updating section 1212. The threshold value updating counting section 1213 is adapted to update the first howling detecting threshold value with respect to the howling frequency segment in the aforesaid manner until the first howling detecting threshold value with respect to the howling frequency segment becomes equal to the original first howling detecting threshold value with respect to the howling frequency segment.

When it is judged that the number of frames thus calculated with respect to the howling frequency segment is not greater than the threshold value, the threshold value updating counting section 1213, on the other hand, is adapted to output the first howling detecting threshold value with respect to the howling frequency segment updated by the howling detecting threshold value updating section 1212 to the howling detecting threshold value updating section 1212.

The howling detecting threshold value updating section 1212 is operative to output the first howling detecting threshold value with respect to the howling frequency segment thus outputted by the threshold value updating counting section 1213 to the power ratio comparing section 1109 when it is judged that the reference power ratio comparing section 1206 is operating with respect to the howling frequency segment on the basis of the control signal inputted from the reference power ratio comparing section 1206.

The power ratio comparing section 1109 is operative to respectively compare the frequency segment power ratios in the frame calculated by the power ratio calculating section 1108 with the first howling detecting threshold value outputted by the howling detecting threshold value updating section 1212 to detect howling frequency segment power ratios and howling frequency segments respectively corresponding to the howling frequency segment power ratios in the frame each of which exceeds the first howling detecting threshold value from among the frequency segment power ratios.

The operations of updating the threshold value performed by the howling detecting threshold value updating section 1212 and the target frame umber counting section 1213 of the sixth embodiment of the howling detecting and suppressing apparatus according to the present invention will be described hereinlater.

The howling detecting threshold value updating section 1212 is operated to input the control signal from the reference power ratio comparing section 1206 and the first howling detecting threshold value through the input terminal 1211.

The howling detecting threshold value updating section 1212 is operated to judge whether the reference power ratio comparing section 1206 is operating or not on the basis of the control signal inputted from the reference power ratio comparing section 1206. The howling detecting threshold value updating section 1212 is operated to update the first howling detecting threshold value with respect to the howling frequency segment by decrementing the first howling detecting threshold value with respect to the howling frequency segment by a predetermined updating value to output the first howling detecting threshold value with respect to the howling frequency segment thus updated to the power ratio comparing section 1109 through the output terminal 1214 when it is judged that the reference power ratio comparing section 1206 is not operating with respect to the howling frequency segment on the basis of the control signal inputted from the reference power ratio comparing section 1206. The output terminal 1214 is operated to output the first howling detecting threshold value with respect to the howling frequency segment thus updated to the power ratio comparing section 1109 of the howling detecting section 104.

The threshold value updating counting section 1213 is operated to judge whether the first howling detecting threshold value with respect to the howling frequency segment updated by the howling detecting threshold value updating section 1212 is equal to the original first howling detecting threshold value with respect to the howling frequency segment or not.

When it is judged that the first howling detecting threshold value with respect to the howling frequency segment is not equal to the original first howling detecting threshold value with respect to the howling frequency segment, the threshold value updating counting section 1213 is operated to count the number of frames in which it is judged that the reference power ratio comparing section 1206 is not operating with respect to the howling frequency segment on the basis of the control signal inputted from the reference power ratio comparing section 1206.

When, on the other hand, it is judged that the first howling detecting threshold value with respect to the howling frequency segment is equal to the original first howling detecting threshold value with respect to the howling frequency segment, the threshold value updating counting section 1213 is operated to output the first howling detecting threshold value with respect to the howling frequency segment updated by the howling detecting threshold value updating section 1212 to the howling detecting threshold value updating section 1212.

The threshold value updating counting section 1213 is operated to judge whether the number of frames thus calculated with respect to the howling frequency segment is greater than a predetermined threshold value.

When it is judged that the number of frames thus calculated with respect to the howling frequency segment is greater than the threshold value, the threshold value updating counting section 1213 is operated to update the first howling detecting threshold value with respect to the howling frequency segment by incrementing the first howling detecting threshold value with respect to the howling frequency segment by a predetermined increment value and output the first howling detecting threshold value with respect to the howling frequency segment thus updated to the howling detecting threshold value updating section 1212. The threshold value updating counting section 1213 is operated to update the first howling detecting threshold value with respect to the howling frequency segment in the aforesaid manner until the first howling detecting threshold value with respect to the howling frequency segment becomes equal to the original first howling detecting threshold value with respect to the howling frequency segment.

When it is judged that the number of frames thus calculated with respect to the howling frequency segment is not greater than the threshold value, the threshold value updating counting section 1213, on the other hand, is operated to output the first howling detecting threshold value with respect to the howling frequency segment updated by the howling detecting threshold value updating section 1212 to the howling detecting threshold value updating section 1212.

The howling detecting threshold value updating section 1212 is operative to output the first howling detecting threshold value with respect to the howling frequency segment thus outputted by the threshold value updating counting section 1213 to the power ratio comparing section 1109 when it is judged that the reference power ratio comparing section 1206 is operating with respect to the howling frequency segment on the basis of the control signal inputted from the reference power ratio comparing section 1206.

The power ratio comparing section 1109 is operative to respectively compare the frequency segment power ratios in the frame calculated by the power ratio calculating section 1108 with the first howling detecting threshold value outputted by the howling detecting threshold value updating section 1212 to detect howling frequency segment power ratios and howling frequency segments respectively corresponding to the howling frequency segment power ratios in the frame each of which exceeds the first howling detecting threshold value from among the frequency segment power ratios.

Howling sound components tend to recur in specified frequency segments even though they are once suppressed and eliminated. This tendency is not negligible especially when the gains applied in the system as a whole are large. The sixth embodiment of the howling detecting and suppressing apparatus according to the present invention, in which the howling detecting threshold value updating section 1212 updates the first howling detecting threshold valued by decrementing the first howling detecting threshold value by a predetermined increment value when that the reference power ratio comparing section 1206 is not operating and the threshold value updating counting section 1213 updates the first howling detecting threshold value by incrementing the first howling detecting threshold value by a predetermined increment value when the number of frames in which the howling sound components are not detected is greater than the threshold value, thereby making it easy to promptly detect suppress the howling sound components recurred in the frequency segments.

The process of updating the threshold value performed in the sixth embodiment of the howling detecting and suppressing apparatus may be applied to the third embodiment and fifth embodiment of the howling detecting and suppressing apparatus. Description will be omitted to avoid tedious repetition.

From the foregoing description, it is to be understood that the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 13:
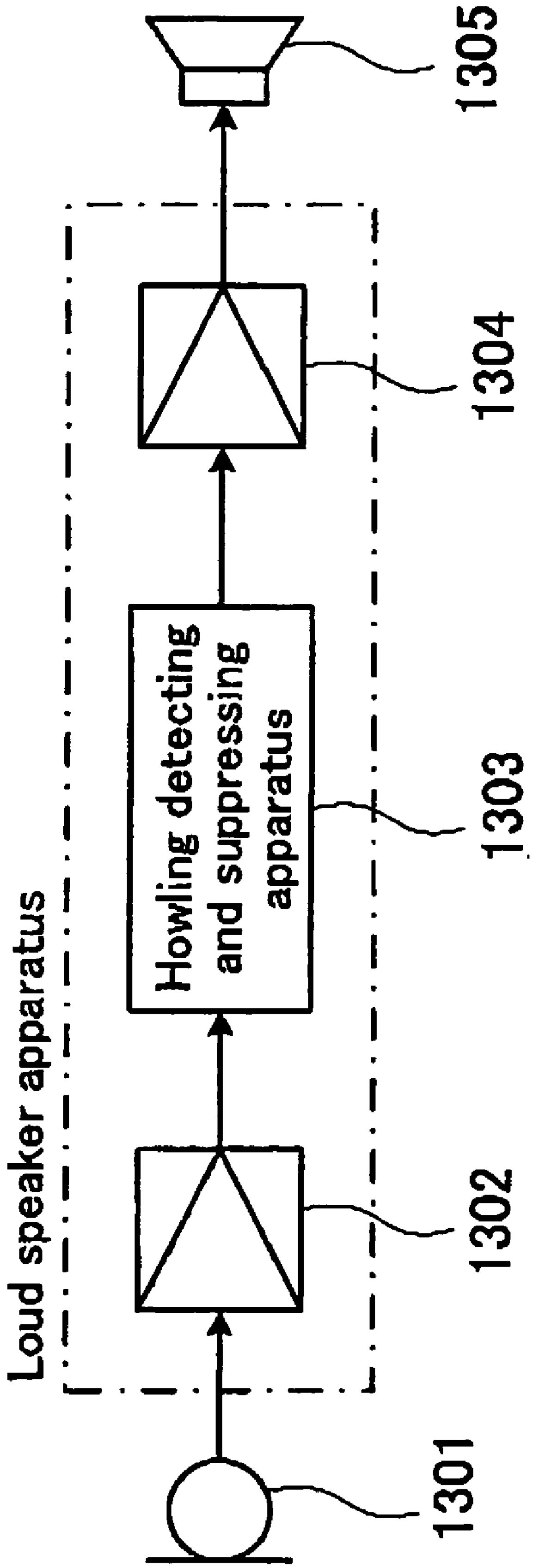
FIG. 13 is a block diagram of a speaker comprising a howling detecting and suppressing apparatus according to the present invention.

Referring to FIG. 13 of the drawings, there is shown a seventh preferred embodiment of a loud speaker apparatus comprising a howling detecting and suppressing apparatus according to the present invention. The howling detecting and suppressing apparatus may be any one of first to sixth embodiments of the howling detecting and suppressing apparatus.

The seventh embodiment of a loud speaker apparatus equipped with a howling detecting and suppressing apparatus is shown in FIG. 13 as comprising a microphone 1301, a micro-amplifier 1302, a howling detecting and suppressing apparatus 1303, power amplifier 1304, and a speaker 1305.

The microphone 1301 is adapted to input a sound to be converted into a sound signal. The micro-amplifier 1302 is adapted to amplify the sound signal converted by the microphone 1301. The howling detecting and suppressing apparatus 1303 is adapted to filter the sound signal amplified by the micro-amplifier 1302 to output a filtered sound signal. The howling detecting and suppressing apparatus 1303 may be any one of the first to sixth embodiments of the howling detecting and suppressing apparatus according to the present invention. The power amplifier 1304 is adapted to amplify the filtered sound signal outputted by the howling detecting and suppressing apparatus 1303. The speaker 1305 is adapted to convert the filtered sound signal amplified by the power amplifier 1304 into a sound to be audibly outputted therethrough.

The operation of the seventh embodiment of the loud speaker apparatus will be described hereinlater.

The microphone 1301 is operated to input a sound to be converted into a sound signal. The micro-amplifier 1302 is operated to amplify the sound signal converted by the microphone 1301. The howling detecting and suppressing apparatus 1303 is operated to filter the sound signal amplified by the micro-amplifier 1302 to output a filtered sound signal. The power amplifier 1304 is operated to amplify the filtered sound signal outputted by the howling detecting and suppressing apparatus 1303. The speaker 1305 is operated to convert the filtered sound signal amplified by the power amplifier 1304 into a sound to be audibly outputted therethrough.

In the seventh embodiment of the loud speaker apparatus thus constructed, the microphone 1301 may input a sound having a gain of not less than 1.0 outputted by, for example, the speaker 1305, the howling detecting and suppressing apparatus 1303 will automatically and promptly detect and suppress the howling sound components caused by the sound outputted by the speaker 1305 and inputted by the microphone 1301.

As described in the above, it is to be understood that the seventh embodiment of the loud speaker apparatus according to the present invention can reliably, accurately, and promptly detect and suppress the howling sound components, thereby enhancing the quality of sound to be audibly heard by a human ear. Furthermore, the maximum gain of the power amplifier 1304 so far been limited due to the occurrence of howling can be increased in the loud speaker apparatus according to the present invention, thereby further enhancing the quality of sound to be audibly heard by a human air.

From the foregoing description, it is to be understood that the sound apparatus comprising the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 14:
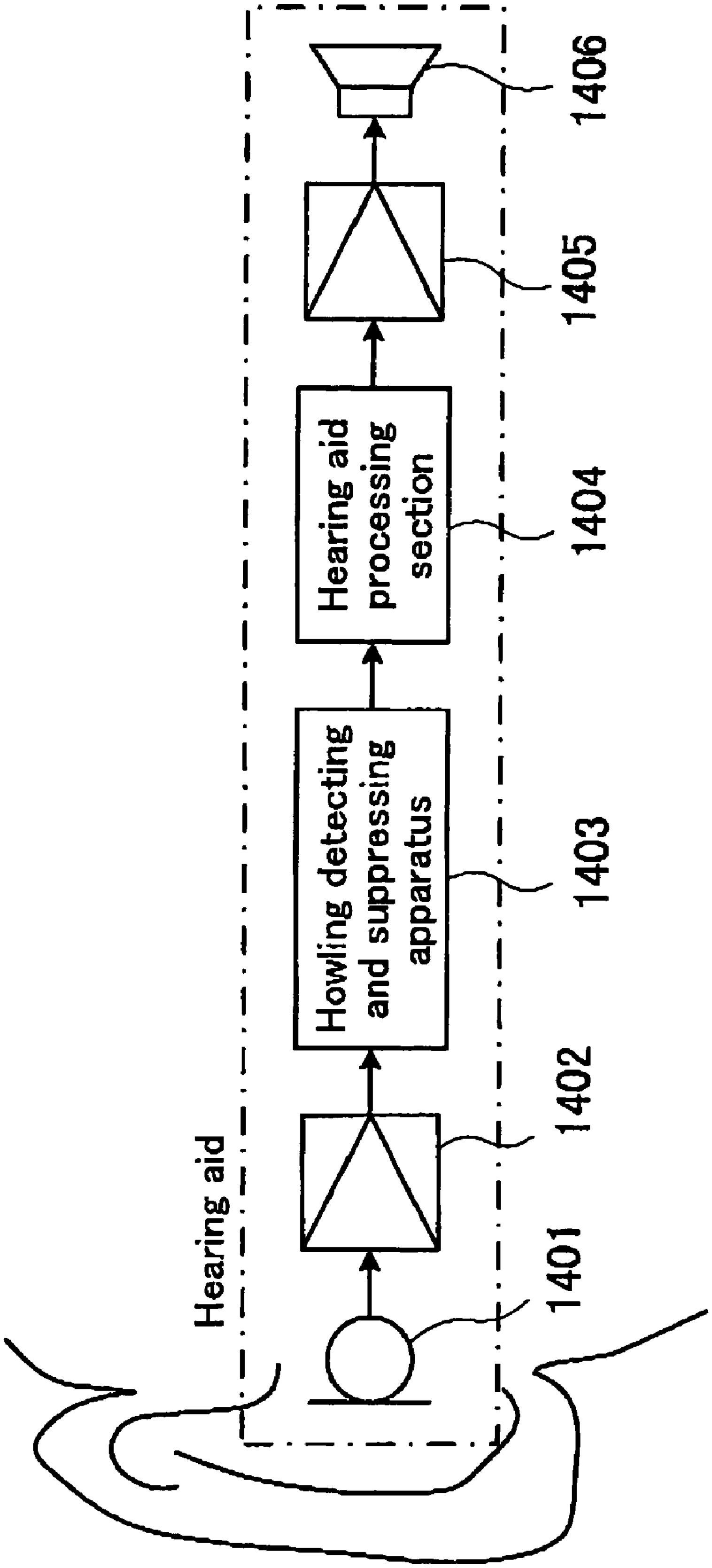
FIG. 14 is a block diagram of a hearing aid comprising a howling detecting and suppressing apparatus according to the present invention.

Referring to FIG. 14 of the drawings, there is shown an eighth preferred embodiment of a hearing aid equipped with a howling detecting and suppressing apparatus according to the present invention. The howling detecting and suppressing apparatus may be any one of first to sixth embodiments of the howling detecting and suppressing apparatus.

The eighth embodiment of a hearing aid equipped with a howling detecting and suppressing apparatus is shown in FIG. 14 as comprising a microphone 1401, a micro-amplifier 1402, a howling detecting and suppressing apparatus 1403, a hearing aid processing section 1404, a power amplifier 1405, and a speaker 1406.

The microphone 1401 is adapted to input a sound to be converted into a sound signal. The micro-amplifier 1402 is adapted to amplify the sound signal converted by the microphone 1401. The howling detecting and suppressing apparatus 1403 is adapted to filter the sound signal amplified by the micro-amplifier 1402 to output a filtered sound signal. The howling detecting and suppressing apparatus 1403 may be any one of the first to sixth embodiments of the howling detecting and suppressing apparatus according to the present invention. The hearing aid processing section 1404 is adapted to compensate the filtered sound signal outputted by the howling detecting and suppressing apparatus 1403 in terms of the gain in accordance with an ear of a user having a difficulty in hearing to output a compensated sound signal. The power amplifier 1405 is adapted to amplify the compensated sound signal compensated by the hearing aid processing section 1404. The speaker 1406 is adapted to convert the compensated sound signal amplified by the amplifier 1405 into a sound to be audibly outputted therethrough.

The operation of the eighth embodiment of the hearing aid will be described hereinlater.

The microphone 1401 is operated to input a sound to be converted into a sound signal. The micro-amplifier 1402 is operated to amplify the sound signal converted by the microphone 1401. The howling detecting and suppressing apparatus 1403 is operated to filter the sound signal amplified by the micro-amplifier 1402 to output a filtered sound signal. The hearing aid processing section 1404 is operated to compensate the filtered sound signal outputted by the howling detecting and suppressing apparatus 1403 in terms of the gain in accordance with an ear of a user having a difficulty in hearing to output a compensated sound signal. The power amplifier 1405 is operated to amplify the compensated sound signal compensated by the hearing aid processing section 1404. The speaker 1406 is operated to convert the compensated sound signal amplified by the amplifier 1405 into a sound to be audibly outputted therethrough.

In the eighth embodiment of the hearing aid thus constructed, the microphone 1401 may input a sound having a gain of not less than 1.0 outputted by, for example, the speaker 1406, the howling detecting and suppressing apparatus 1403 will automatically and promptly detect and suppress the howling sound components caused by the sound outputted by the speaker 1406 and inputted by the microphone 1401.

As described in the above, it is to be understood that the eighth embodiment of the hearing aid according to the present invention can reliably, accurately, and promptly detect and suppress the howling sound components, thereby enhancing the quality of sound to be audibly heard by an ear of a user having a difficulty in hearing. Furthermore, the maximum gain of the power amplifier 1405 so far been limited due to the occurrence of howling can be increased in the hearing aid according to the present invention, thereby further enhancing the quality of sound to be audibly heard by an ear of a user having a difficulty in hearing.

From the foregoing description, it is to be understood that the sound apparatus comprising the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 15:
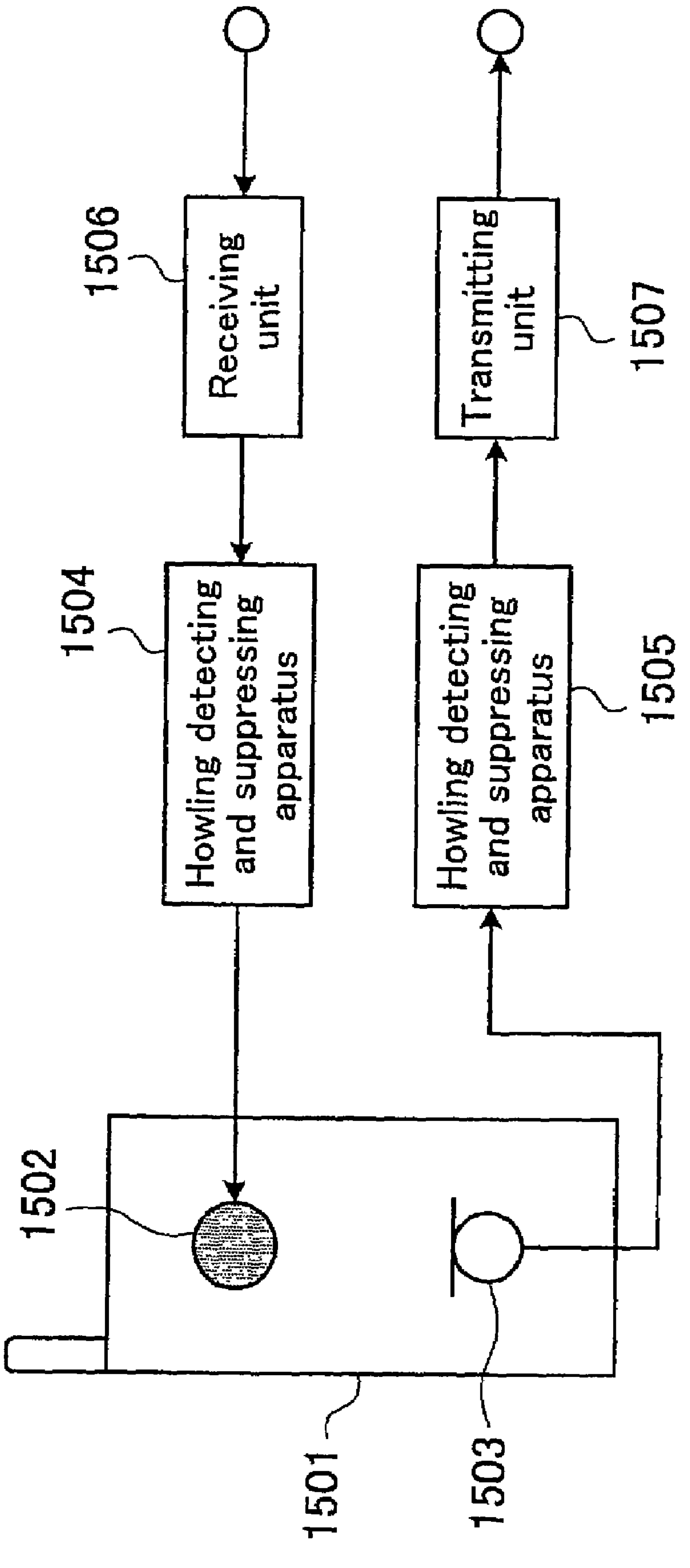
FIG. 15 is a block diagram of a sound communicating apparatus comprising a howling detecting and suppressing apparatus according to the present invention.

Referring to FIG. 15 of the drawings, there is shown a ninth embodiment of a sound communicating apparatus equipped with a howling detecting and suppressing apparatus according to the present invention. The howling detecting and suppressing apparatus may be any one of first to sixth embodiments of the howling detecting and suppressing apparatus.

The ninth embodiment of a sound communicating apparatus equipped with a howling detecting and suppressing apparatus is shown in FIG. 15 as comprising a communication terminal 1501 having a speaker 1502 and a microphone 1503, a howling detecting and suppressing apparatus 1504, a howling detecting and suppressing apparatus 1505, a receiving unit 1506, and a transmitting unit 1507. The sound communicating apparatus 1501 may be, for example but not limited to, a mobile terminal such as cellular telephone.

The receiving unit 1506 is adapted to receive a sound signal to be outputted to the howling detecting and suppressing apparatus 1504. The howling detecting and suppressing apparatus 1504 may be any one of the first to sixth embodiments of the howling detecting and suppressing apparatus according to the present invention. The howling detecting and suppressing apparatus 1504 is adapted to filter the sound signal received by the receiving unit 1506 to output a filtered sound signal. The speaker 1502 is adapted to convert the filtered sound signal filtered by the howling detecting and suppressing apparatus 104 into a sound to be and audibly outputted therethrough. The microphone 1503 is adapted to input a sound to be converted into a sound signal. The howling detecting and suppressing apparatus 1505 may be any one of the first to sixth embodiments of the howling detecting and suppressing apparatus according to the present invention. The howling detecting and suppressing apparatus 1505 is adapted to filter the sound signal converted by the microphone 1503 to output a filtered sound signal. The transmitting unit 1507 is adapted to send the filtered sound signal.

The operation of the sound communicating apparatus will be described hereinlater.

The receiving unit 1506 is operated to receive a sound signal to be outputted to the howling detecting and suppressing apparatus 1504. The howling detecting and suppressing apparatus 1504 may be any one of the first to sixth embodiments of the howling detecting and suppressing apparatus according to the present invention. The howling detecting and suppressing apparatus 1504 is operated to filter the sound signal received by the receiving unit 1506 to output a filtered sound signal. The speaker 1502 is operated to convert the filtered sound signal filtered by the howling detecting and suppressing apparatus 104 into a sound to be and audibly outputted therethrough. The microphone 1503 is operated to input a sound to be converted into a sound signal. The howling detecting and suppressing apparatus 1505 may be any one of the first to sixth embodiments of the howling detecting and suppressing apparatus according to the present invention. The howling detecting and suppressing apparatus 1505 is operated to filter the sound signal converted by the microphone 1503 to output a filtered sound signal. The transmitting unit 1507 is operated to send the filtered sound signal.

In the sound communicating apparatus thus constructed, the microphone 1503 may input a sound outputted by, for example, the speaker 1502 especially when a user operates the sound communicating apparatus in hand-free mode. Furthermore, a closed loop is created between two users of the sound communicating apparatuses. The gain of the closed loop reaches, for example, 1.0 or greater, causing an occurrence of howling. In the ninth embodiment of the sound communicating apparatus according to the present invention, the howling detecting and suppressing apparatus 1504 and the howling detecting and suppressing apparatus 1505 promptly detect and suppress the howling sound components caused by the sound outputted by the speaker 1502 and inputted by the microphone 1503.

Although there has been described in the above that the ninth embodiment of the sound communicating apparatus comprises two howling detecting and suppressing apparatuses 1504 and 1505, the ninth embodiment of the sound communicating apparatus according to the present invention, may comprise only one howling detecting and suppressing apparatus. The howling detecting and suppressing apparatus 1504, the howling detecting and suppressing apparatus 1505, the receiving unit 1506, and the transmitting unit 1507 may be placed outside of a housing, in which the speaker 1502 and the microphone 1503 are provided or may be accommodated in the same housing, in which the speaker 1502 and the microphone 1503 are provided.

The ninth embodiment of the sound communicating apparatus according to the present invention may communicate with other communicating apparatus by means of, for example, radio waves or fixed lines.

As described in the above, it is to be understood that the ninth embodiment of the sound communicating apparatus according to the present invention can reliably, accurately, and promptly detect and suppress the howling sound components, thereby enhancing the quality of sound to be audibly heard by a human ear.

From the foregoing description, it is to be understood that the sound apparatus comprising the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 16:
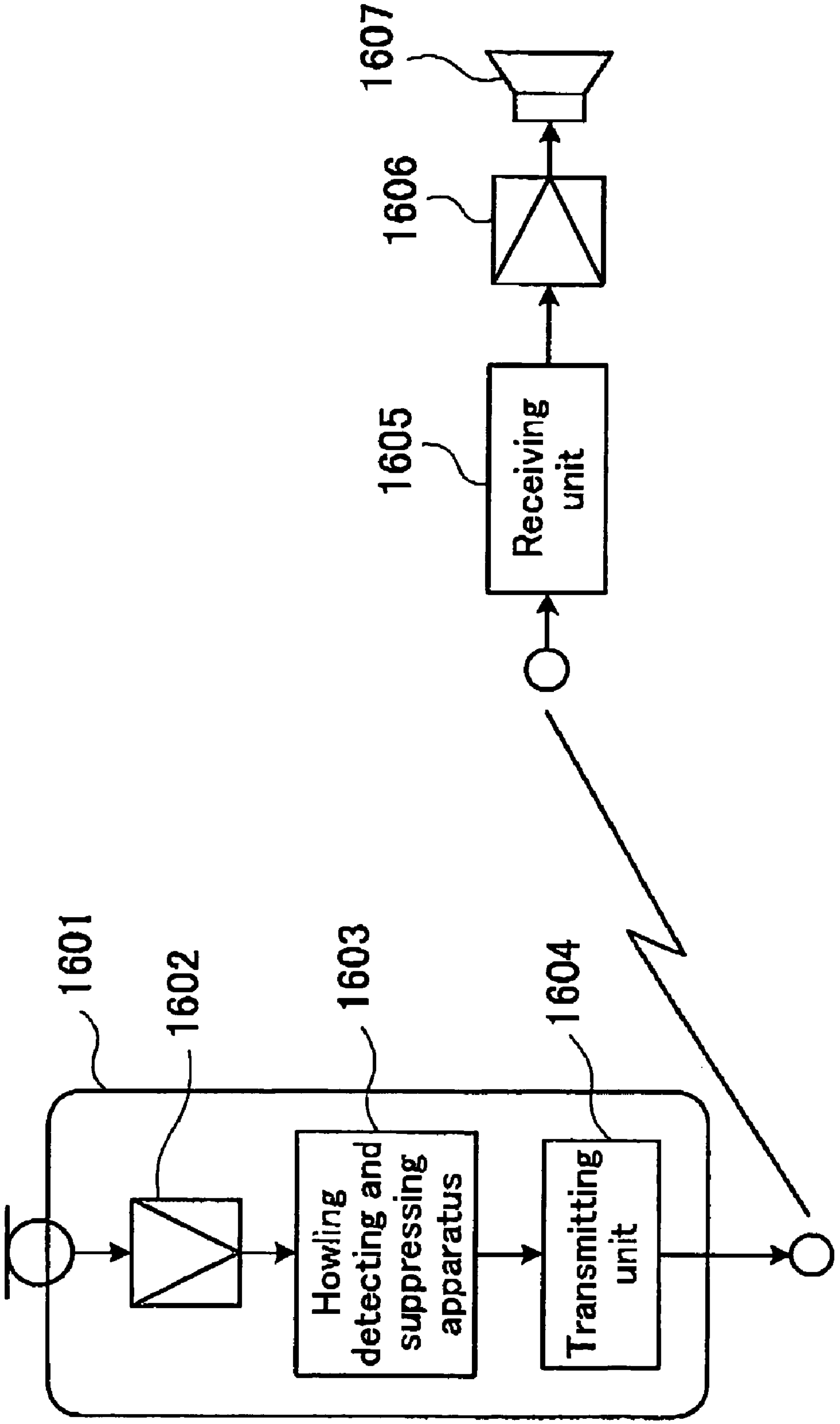
FIG. 16 is a block diagram of a speaker system comprising a howling detecting and suppressing apparatus according to the present invention.

Referring to FIG. 16 of the drawings, there is shown a speaker system comprising a tenth preferred embodiment of a microphone apparatus equipped with a howling detecting and suppressing apparatus according to the present invention. The howling detecting and suppressing apparatus may be one of first to sixth embodiments of the howling detecting and suppressing apparatus.

As shown in FIG. 16, the speaker system comprises a tenth embodiment of a microphone apparatus 1601 equipped with a howling detecting and suppressing apparatus 1603, a receiving unit 1605, a power amplifier 1606, and a speaker 16067.

The tenth embodiment of a microphone apparatus 1601 equipped with a howling detecting and suppressing apparatus 1603 is shown in FIG. 16 as comprising a microphone and micro-amplifier 1602, a howling detecting and suppressing apparatus 1603, and a transmitting unit 1604. The microphone and micro-amplifier 1602 is adapted to input a sound, convert the sound thus inputted into a sound signal, and amplify the sound signal thus converted. The howling detecting and suppressing apparatus 1603 is adapted to filter the sound signal thus converted and amplified to output a filtered sound signal. The transmitting unit 1604 is adapted to transmit the filtered sound signal outputted by the howling detecting and suppressing apparatus 1603.

The receiving unit 1605 is adapted to receive the filtered sound signal transmitted by the transmitting unit 1604. The power amplifier 1606 is adapted to amplify the filtered sound signal received by the receiving unit 1605. The speaker 1607 is adapted to convert the filtered sound signal amplified by the power amplifier 1606 into a sound to be audibly outputted therethrough.

The operation of the speaker system comprising a tenth preferred embodiment of a microphone apparatus equipped with a howling detecting and suppressing apparatus according to the present invention will be described hereinlater.

The microphone and micro-amplifier 1602 is operated to input a sound, convert the sound thus inputted into a sound signal, and amplify the sound signal thus converted. The howling detecting and suppressing apparatus 1603 is operated to filter the sound signal thus converted and amplified to output a filtered sound signal. The transmitting unit 1604 is operated to transmit the filtered sound signal outputted by the howling detecting and suppressing apparatus 1603.

The receiving unit 1605 is operated to receive the filtered sound signal transmitted by the transmitting unit 1604. The power amplifier 1606 is operated to amplify the filtered sound signal received by the receiving unit 1605. The speaker 1607 is operated to convert the filtered sound signal amplified by the power amplifier 1606 into a sound to be audibly outputted therethrough.

In the tenth embodiment of the speaker apparatus 1601 constructed, the microphone apparatus 1601 may input a sound having a gain of not less than 1.0 outputted by, for example, the speaker 1607, the howling detecting and suppressing apparatus 1603 will automatically and promptly detect and suppress the howling sound components caused by the sound outputted by the speaker 1607 and inputted by the microphone apparatus 1601.

As described in the above, it is to be understood that the tenth embodiment of the microphone apparatus according to the present invention can reliably, accurately, and promptly detect and suppress the howling sound components, thereby enhancing the quality of sound to be audibly heard by a human ear. Furthermore, the maximum gain of the power amplifier 1606 so far been limited due to the occurrence of howling can be increased in the microphone apparatus 1601 according to the present invention, thereby further enhancing the quality of sound to be audibly heard by a human ear of a user having a difficulty in hearing.

From the foregoing description, it is to be understood that the sound apparatus comprising the howling detecting and suppressing apparatus according to the present invention can eliminate the needs of the plurality of notch filters, thereby being simple in construction, and reliably, accurately, and promptly detect and suppress a howling sound component to enhance the sound quality.

Figure 17:
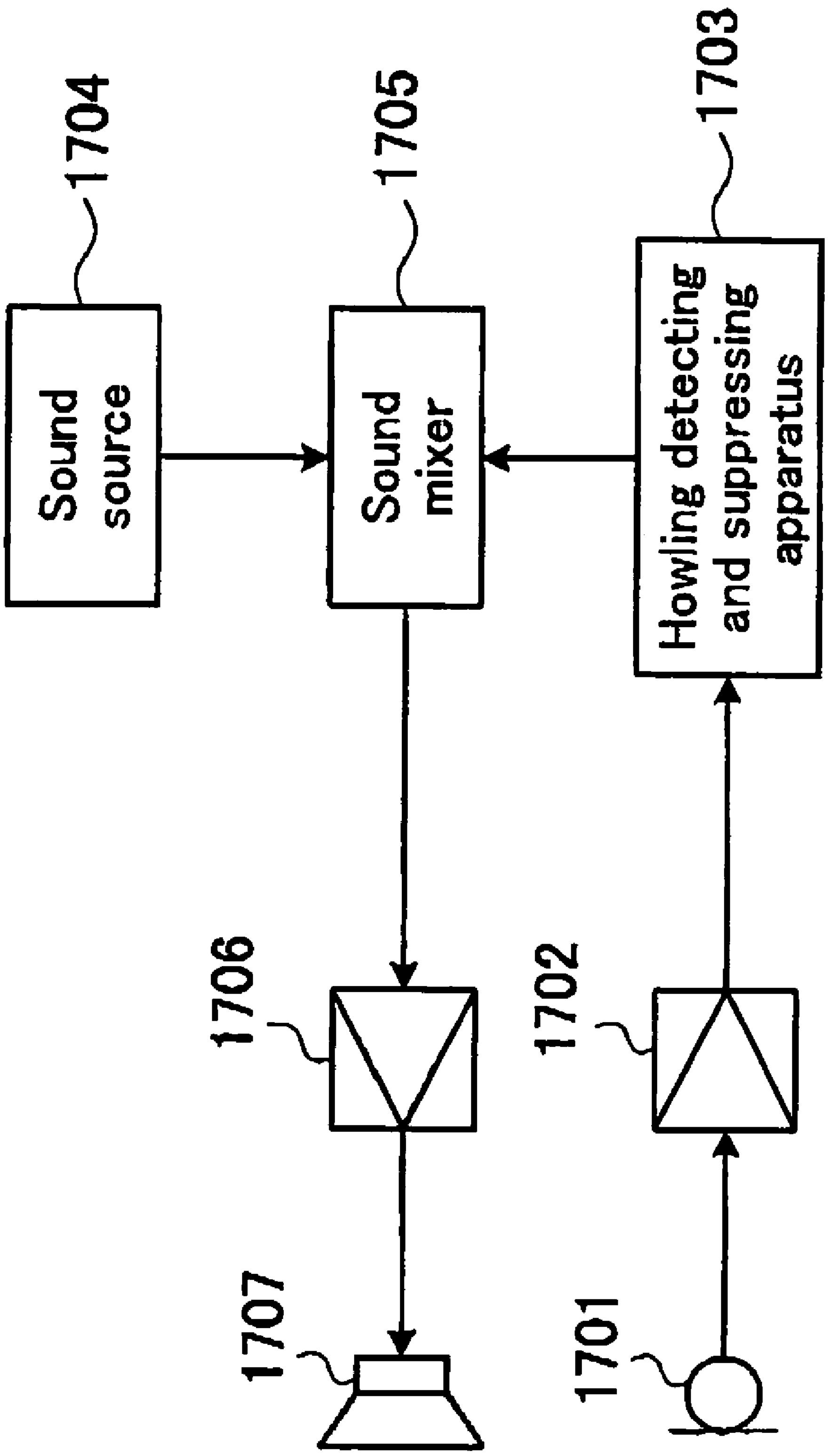
FIG. 17 is a block diagram of a Karaoke apparatus comprising a howling detecting and suppressing apparatus according to the present invention.

Referring to FIG. 17 of the drawings, there is shown an eleventh embodiment of a Karaoke apparatus equipped a howling detecting and suppressing apparatus according to the present invention. The howling detecting and suppressing apparatus may be any one of first to sixth embodiments of the howling detecting and suppressing apparatus.

The eleventh embodiment of a Karaoke apparatus is shown in FIG. 17 as comprising a microphone 1701, a micro-amplifier 1702, a howling detecting and suppressing apparatus 1703, a sound mixer 1705, a power amplifier 1706, and a speaker 1707.

The microphone 1701 is adapted to input a sound to be converted into a sound signal. The micro-amplifier 1702 is adapted to amplify the sound signal converted by the microphone 1701. The howling detecting and suppressing apparatus 1703 is adapted to filter the sound signal amplified by the micro-amplifier 1702 to output a filtered sound signal. The sound mixer 1705 is adapted to mix the filtered sound signal filtered by the howling detecting and suppressing apparatus 1703 and a sound source 1704 outputted by, for example, a sound source outputting device, not shown, to output a mixed sound signal. The power amplifier 1706 is adapted to amplify the mixed sound signal outputted by the sound mixer 1705. The speaker 1707 is adapted to convert the mixed sound signal amplified by the power amplifier 1706 into a sound to be audibly outputted therethrough.

The operation of the eleventh embodiment of the Karaoke apparatus according to the present invention will be described hereinlater.

The microphone 1701 is operated to input a sound to be converted into a sound signal. The micro-amplifier 1702 is operated to amplify the sound signal converted by the microphone 1701. The howling detecting and suppressing apparatus 1703 is operated to filter the sound signal amplified by the micro-amplifier 1702 to output a filtered sound signal. The sound mixer 1705 is operated to mix the filtered sound signal filtered by the howling detecting and suppressing apparatus 1703 and a sound source 1704 outputted by, for example, a sound source outputting device, not shown, to output a mixed sound signal. The power amplifier 1706 is operated to amplify the mixed sound signal outputted by the sound mixer 1705. The speaker 1707 is operated to convert the mixed sound signal amplified by the power amplifier 1706 into a sound to be audibly outputted therethrough.

In the eleventh embodiment of the Karaoke apparatus thus constructed, the microphone 1701 may input may input a sound having a gain of not less than 1.0 outputted by, for example, the speaker 1707, the howling detecting and suppressing apparatus 1703 will automatically and promptly detect and suppress the howling sound components caused by the sound outputted by the speaker 1707 and inputted by the microphone 1701.

As described in the above, it is to be understood that the eleventh embodiment of the Karaoke apparatus according to the present invention can reliably, accurately, and promptly detect and suppress the howling sound components, thereby enhancing the quality of sound to be audibly heard by a human ear. Furthermore, the maximum gain of the power amplifier 1706 so far been limited due to the occurrence of howling can be increased in the Karaoke apparatus according to the present invention, thereby further enhancing the quality of sound to be audibly heard by a human ear of a user having a difficulty in hearing.

From the foregoing description, it is to be understood that the sound apparatus comprising the howling detecting and suppressing apparatus according to the present invention can eliminate the needs of the plurality of notch filters, thereby being simple in construction, and reliably, accurately, and promptly detect and suppress a howling sound component to enhance the sound quality.

The above embodiments of the howling detecting and suppressing apparatus according to the present invention may be performed by executing a computer program recorded on a computer usable storage medium having computer readable code embodied therein for detecting and suppressing howling sound components. The computer may be a microcomputer, the other computer, a device comprising a microcomputer, or the like.

Figure 18:
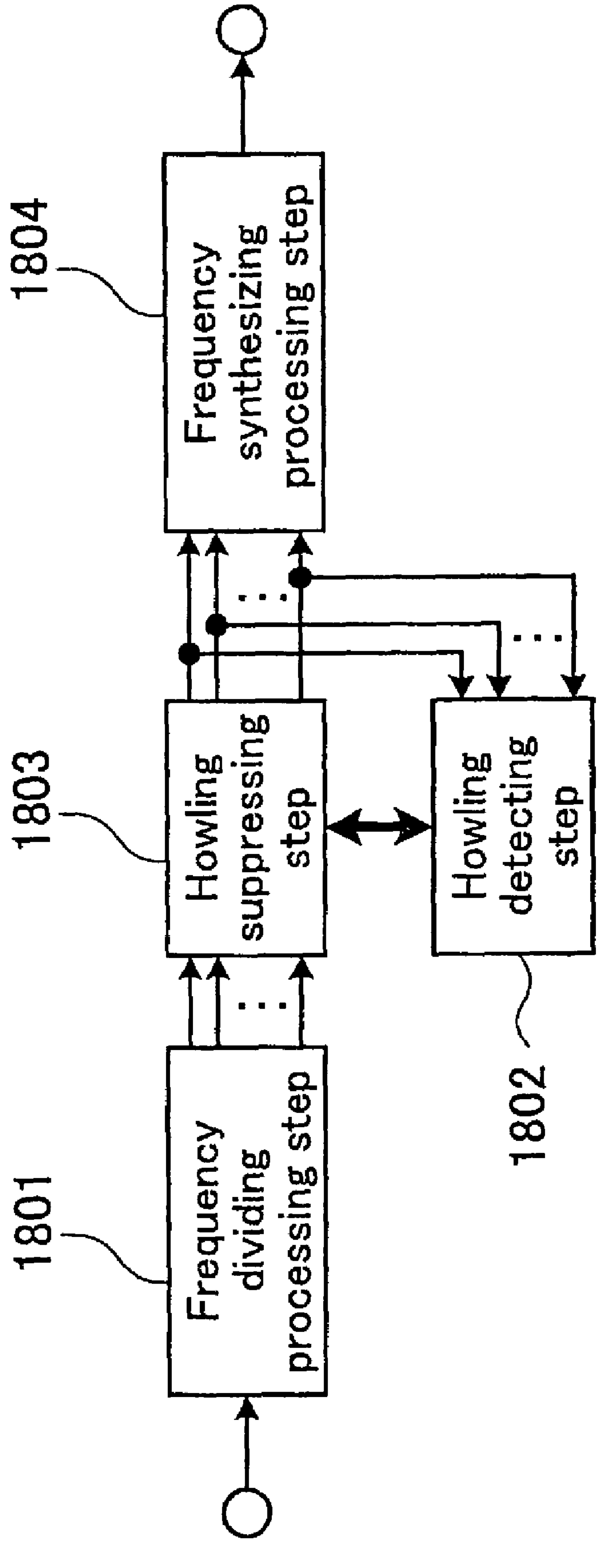
FIG. 18 is a block diagram showing a howling detecting and suppressing method according to the present invention.
Figure 19:
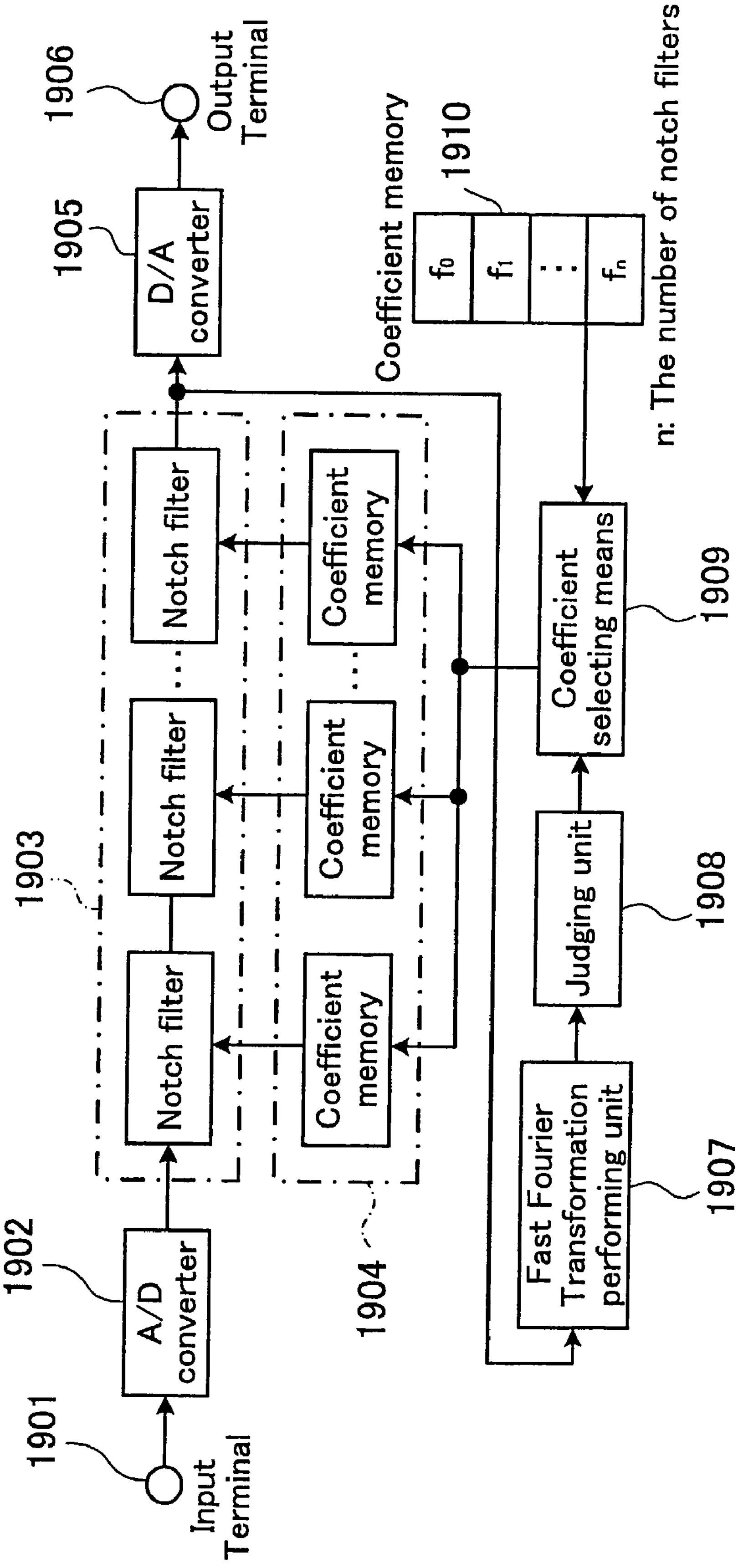
FIG.19 PRIOR ART
FIG. 19 is a block diagram of the conventional howling detecting and suppressing apparatus.

Referring to FIG. 18 of the drawings, there is shown a twelfth preferred embodiment of howling detecting and suppressing method of detecting and suppressing howling sound components.

The twelfth embodiment of the howling detecting and suppressing method according to the present invention is shown in FIG. 18 as comprising the steps of: a frequency dividing processing step 1801 of converting a plurality of sound time signal segments each corresponding to a time segment into a plurality of sound frequency signal segments each corresponding to a frequency segment; a howling suppressing step 1803 of respectively adjusting gains for the sound frequency signal segments converted by the frequency dividing processing step 1801 to generate howling-suppressed sound frequency signal segments; a howling detecting step 1802 for judging whether a howling sound component is present or not for each of the howling-suppressed sound frequency signal segments generated by the howling suppressing step 1803 to detect howling sound frequency signal segments each in which it is judged that the howling sound component is present and non-howling sound frequency signal segments each in which it is judged that the howling sound component is not present; and a frequency synthesizing processing step 1804 for synthesizing the howling-suppressed sound frequency signal segments suppressed by the howling suppressing step 1803 to generate howling-suppressed sound time signal segments, whereby the howling suppressing step 1803 has a step of respectively adjusting gains for the sound frequency signal segments converted by the frequency dividing processing step 1801 by changing the gains of the howling sound frequency signal segments detected by the howling detecting step 1802 and passing through the non-howling sound frequency signal segments detected by the howling detecting step 1802.

The operation performed by the twelfth embodiment of the howling detecting and suppressing method is the same as that of the first embodiment of the howling detecting and suppressing apparatus according to the present invention, which has been described in the above. Detailed description will be therefore omitted to avoid tedious repetition.

The twelfth embodiment of the howling detecting and suppressing method according to the present invention may be performed by executing a computer program recorded on a computer usable storage medium having computer readable code embodied therein for performing the twelfth embodiment of the howling detecting and suppressing method. The computer may be a microcomputer, the other computer, a device comprising a microcomputer, or the like.

The howling detecting and suppressing computer program product for performing the twelfth embodiment of the howling detecting and suppressing method will be described hereinlater.

The howling detecting and suppressing computer program for performing the twelfth embodiment of the howling detecting and suppressing method comprises a computer readable program code 1801 for converting a plurality of sound time signal segments each corresponding to a time segment into a plurality of sound frequency signal segments each corresponding to a frequency segment, a computer readable program code 1803 for respectively adjusting gains for the sound frequency signal segments converted by the computer readable program code 1801 to generate howling-suppressed sound frequency signal segments; a computer readable program code 1802 for judging whether a howling sound component is present or not for each of the howling-suppressed sound frequency signal segments generated by the computer readable program code 1803 to detect howling sound frequency signal segments each in which it is judged that the howling sound component is present and non-howling sound frequency signal segments each in which it is judged that the howling sound component is not present; and a computer readable program code 1804 for synthesizing the howling-suppressed sound frequency signal segments suppressed by the computer readable program code 1803 to generate howling-suppressed sound time signal segments. Whereby the computer readable program code 1803 has a computer readable program code 1803-1 for respectively adjusting gains for the sound frequency signal segments converted by the computer readable program code 1801 by changing the gains of the howling sound frequency signal segments detected by the computer readable program code 1802 and passing through the non-howling sound frequency signal segments detected by the computer readable program code 1802.

The howling detecting and suppressing methods for, and howling detecting and suppressing computer program products of detecting and suppressing howling sound components executing the operations the same as the first to sixth embodiments of the howling detecting and suppressing apparatus according to the present invention will be not described to avoid repetition.

From the foregoing description, it is to be understood that the howling detecting and suppressing apparatus, method and computer program product according to the present invention can eliminate the needs of the plurality of notch filters, thereby being simple in construction, and reliably, accurately, and promptly detect and suppress a howling sound component and enhance the sound quality.

It will be apparent to those skilled in the art and it is contemplated that variations and/or changes in the embodiments illustrated and described herein may be without departure from the present invention. Accordingly, it is intended that the foregoing description is illustrative only, not limiting, and that the true spirit and scope of the present invention will be determined by the appended claims

What is claimed is:

1. A howling detecting and suppressing apparatus for detecting and suppressing howling sound components comprising:

a frequency dividing processing section for converting a plurality of sound time signal segments each corresponding to a time segment into a plurality of sound frequency signal segments each corresponding to a frequency segment;

a howling suppressing section for respectively adjusting gains for said sound frequency signal segments converted by said frequency dividing processing section to generate howling-suppressed sound frequency signal segments;

a howling detecting section for judging whether a howling sound component is present or not for each of said howling-suppressed sound frequency signal segments generated by said howling suppressing section to detect howling sound frequency signal segments each in which it is judged that said howling sound component is present and non-howling sound frequency signal segments each in which it is judged that said howling sound component is not present; and a frequency synthesizing processing section for synthesizing said howling-suppressed sound frequency signal segments suppressed by said howling suppressing section to generate howling-suppressed sound time signal segments, and in which said howling suppressing section is operative to respectively adjust gains for said sound frequency signal segments converted by said frequency dividing processing section by changing the gains of said howling sound frequency signal segments detected by said howling detecting section and passing through said non-howling sound frequency signal segments detected by said howling detecting section said frequency dividing processing section is operative to convert a plurality of sound time signal segments collected for a predetermined number of sample periods into a plurality of sound frequency signal segments collectively forming one frame;

said howling detecting section includes:

a delay generator for respectively delaying said howling-suppressed sound frequency signal segments collectively forming a frame generated by said howling suppressing section for a predetermined number of frames to be outputted as reference frequency signal segments collectively forming a frame;

an adaptive filter for respectively convolving said reference frequency signal segments outputted by said delay generator with coefficients to generate adapted reference frequency signal segments collectively forming a frame;

a coefficient updating calculating section for respectively updating said coefficients on the basis of said sound howling-suppressed sound frequency signal segments generated by said howling suppressing section, said reference frequency signal segments outputted by said delay generator, and said adapted reference frequency signal segments generated by said adaptive filter;

a frequency power calculating section for respectively calculating frequency signal powers of said adapted reference frequency signal segments collectively forming a frame generated by said adaptive filter;

a smoothing processing section for respectively smoothing said frequency signal powers of said adapted reference frequency signal segments collectively forming a frame calculated by said frequency power calculating section to generate smoothed frequency signal powers of said adapted reference frequency signal segments collectively forming a frame;

a total average frequency power calculating section for inputting said smoothed frequency signal powers of said adapted reference frequency signal segments collectively forming a frame generated by said smoothing processing section to calculate a total average value of said smoothed frequency signal powers of said frame;

a power ratio calculating section for inputting frequency signal power ratios of said smoothed frequency signal powers of said adapted reference frequency signal segments collectively forming said frame generated by said smoothing processing section to respectively calculate frequency signal power ratios of said smoothed frequency signal powers of said adapted reference frequency signal segments thus inputted to said total average value of said frequency signal powers of said frame calculated by said total average frequency power calculating section to respectively generate frequency signal power ratios each corresponding to frequency segments in said frame;

a power ratio comparing section for respectively comparing said frequency signal power ratios in said frame calculated by said power ratio calculating section with a predetermined first howling detecting threshold value to detect howling frequency signal power ratios and howling frequency segments respectively corresponding to said howling frequency signal power ratios in said frame each of which exceeds said first howling detecting threshold value from among said frequency signal power ratios;

a target frame counting section for respectively counting the number of target frames in which said howling frequency signal power ratios are detected by said power ratio comparing section with respect to said howling frequency segments; and a howling judging section for judging whether a howling sound component is present or not for each of said howling frequency segments by comparing the number of target frames counted by said target frame counting section with respect to each of said howling frequency segments detected by said power ratio comparing section and a predetermined second howling detecting threshold value to detect howling sound frequency signal segments each in which it is judged that said howling sound component is present because of the fact that the number of target frames counted by said target frame counting section with respect to said howling frequency segment exceeds said second howling detecting threshold value and non-howling sound frequency signal segments each in which it is judged that said howling sound component is not present because of the fact that the number of target frames counted by said target frame counting section with respect to said howling frequency segment does not exceed said second howling detecting threshold value.

2. A howling detecting and suppressing apparatus as set forth in claim 1, in which said howling detecting section is operative to judge whether a howling sound component is present or not only for each of sound frequency signal segments corresponding to specified one or more frequency segments.

3. A howling detecting and suppressing apparatus as set forth in claim 1, in which said total average frequency power calculating section is operative to input said smoothed frequency signal powers of said adapted reference frequency signal segments collectively forming a frame generated by said smoothing processing section, detect maximum and quasi-maximum smoothed frequency signal powers of maximum and quasi-maximum adapted reference frequency signal segments from among said smoothed frequency signal powers of said adapted reference frequency signal segments collectively forming a frame thus inputted, judge if any one or more of said maximum and quasi-maximum adapted reference frequency signal segments correspond to specified one or more frequency segments, and calculate a total average value of said smoothed frequency signal powers of said frame excluding one or more of said maximum and quasi-maximum adapted reference frequency signal segments corresponding to said specified one or more frequency segments when it is judged that said one or more of said maximum and quasi-maximum adapted reference frequency signal segments correspond to said specified one or more frequency segments.

4. A howling detecting and suppressing apparatus as set forth in claim 1, in which said howling detecting section is operative to generate judging information indicating a howling sound frequency signal segment corresponding to a howling frequency segment, transfer said judging information and said total average value of said smoothed frequency signal powers to said howling suppressing section, and stop operations of said total average frequency power calculating section, said power ratio calculating section, said power ratio comparing section, said target frame counting section, and said howling judging section with respect to said howling frequency segment when said howling detecting section detects said howling sound frequency signal segment, and said howling suppressing section is operative to input judging information indicating a howling sound frequency signal segment corresponding to a howling frequency segment and said total average value of said smoothed frequency signal powers generated when said howling detecting section detects said howling sound frequency signal segment, said howling suppressing section includes:

a reference power ratio calculating section provided with a storage unit for storing said total average value of said smoothed frequency signal powers generated when said howling detecting section detects said howling sound frequency signal segment, for calculating a reference power ratio by dividing a smoothed frequency signal power of an adapted reference frequency signal segment with respect to said howling frequency segment generated by said smoothing processing section by said total average value of said smoothed frequency signal powers stored in said storage unit to generate a reference power ratio with respect to said howling frequency segment;

a reference power ratio comparing section for comparing said reference power ratio with respect to said howling frequency segment generated by said reference power ratio calculating section with a predetermined gain control threshold value to judge if said reference power ratio with respect to said howling frequency segment is to be processed in a gain adjusting manner on the basis of the result of the comparison;

a frequency gain setting section for setting an adjusted gain value for said howling sound frequency signal segment when it is judged by said reference power ratio comparing section that said reference power ratio with respect to said howling frequency segment is to be processed in a gain adjusting manner or setting a gain through value for said howling sound frequency signal segment when it is judged by said reference power ratio comparing section that said reference power ratio with respect to said howling frequency segment is not to be processed in a gain adjusting manner to generate an adjusted gain value for said howling sound frequency signal segment; and a gain multiplying section for respectively adjusting gains for said sound frequency signal segments converted by said frequency dividing processing section by multiplying the gains of said howling sound frequency signal segments detected by said howling detecting section by said adjusted gain value generated by said frequency gain setting section, and passing through said non-howling sound frequency signal segments detected by said howling detecting section, whereby said reference power ratio comparing section is operative to generate a control signal indicating that said reference power ratio comparing section is not operating with respect to said howling frequency segment when said reference power ratio comparing section judges that said reference power ratio with respect to said howling frequency segment is not to be processed in a gain adjusting manner, and said howling detecting section is operative to resume operations of said total average frequency power calculating section, said power ratio calculating section, said power ratio comparing section, said target frame counting section, and said howling judging section with respect to said howling frequency segment when said howling detecting section receives said control signal with respect to said howling frequency segment.

5. A howling detecting and suppressing apparatus as set forth in claim 2, in which said howling suppressing section is operative to change the gains of said howling sound frequency signal segments respectively corresponding to specified one or more frequency segments detected by said howling detecting section and pass through said non-howling sound frequency signal segments detected by said howling detecting section.

6. A howling detecting and suppressing apparatus as set forth in claim 4, in which said adjusted gain value is a fixed value.

7. A howling detecting and suppressing apparatus as set forth in claim 4, in which said frequency gain setting section is provided with an adjusted gain value updating unit for updating said adjusted gain value by subtracting an adjusted gain updating constant from said adjusted gain value, said frequency gain setting section is operative to set an adjusted gain value for said howling sound frequency signal segment and said adjusted gain value updating unit is operative to update said adjusted gain value by subtracting said adjusted gain updating constant from said adjusted gain value when it is judged by said reference power ratio comparing section that said reference power ratio with respect to said howling frequency segment is to be processed in a gain adjusting manner.

8. A howling detecting and suppressing apparatus as set forth in claim 4, in which said frequency gain setting section is provided with an adjusted gain value updating unit for updating said adjusted gain value by adding an adjusted gain updating constant to said adjusted gain value, said frequency gain setting section is operative to set an adjusted gain value for said howling sound frequency signal segment and said adjusted gain value updating unit is operative to update said adjusted gain value by adding said adjusted gain updating constant to said adjusted gain value when it is judged by said reference power ratio comparing section that said reference power ratio with respect to said howling frequency segment is to be processed in a gain adjusting manner.

9. A howling detecting and suppressing apparatus as set forth in claim 4, in which said frequency gain setting section is provided with an adjusted gain value updating unit for updating said adjusted gain value by multiplying said adjusted gain value with a adjusted gain updating coefficient, said frequency gain setting section is operative to set an adjusted gain value for said howling sound frequency signal segment and said adjusted gain value updating unit is operative to update said adjusted gain value by multiplying said adjusted gain value with said adjusted gain updating coefficient when it is judged by said reference power ratio comparing section that said reference power ratio with respect to said howling frequency segment is to be processed in a gain adjusting manner.

10. A howling detecting and suppressing apparatus as set forth in claim 4, in which said reference power ratio comparing section is operative to compare said reference power ratio with respect to said howling frequency segment generated by said reference power ratio calculating section with a predetermined gain control threshold value to judge if said reference power ratio with respect to said howling frequency segment is to be processed in a gain reducing manner, a gain restoring manner, or a gain through manner on the basis of the result of the comparison; and said frequency gain setting section is operative to set a reduced gain value for said howling sound frequency signal segment when said reference power ratio comparing section judges that said reference power ratio with respect to said howling frequency segment is to be processed in said gain reducing manner, set an increased gain value for said howling sound frequency signal segment when said reference power ratio comparing section judges that said reference power ratio with respect to said howling frequency segment is to be processed in said gain restoring manner, or set a gain through value for said howling sound frequency signal segment when said reference power ratio comparing section judges that said reference power ratio with respect to said howling frequency segment is to be processed in said gain through manner, whereby said reference power ratio comparing section is operative to generate a control signal indicating that said reference power ratio comparing section is not operating with respect to said howling frequency segment when said reference power ratio comparing section judges that said reference power ratio with respect to said howling frequency segment is to be processed in a gain through manner, and said howling detecting section is operative to resume operations of said total average frequency power calculating section, said power ratio calculating section, said power ratio comparing section, said target frame counting section, and said howling judging section with respect to said howling frequency segment when said howling detecting section receives said control signal with respect to said howling frequency segment.

11. A howling detecting and suppressing apparatus as set forth in claim 4, in which said reference power ratio comparing section is operative to compare said reference power ratio with respect to said howling frequency segment generated by said reference power ratio calculating section with a predetermined gain control threshold value to judge if said reference power ratio with respect to said howling frequency segment is to be processed in a plurality of gain reducing manners, a plurality of gain restoring manners, or a gain through manner on the basis of the result of the comparison; and said frequency gain setting section is operative to set a specified reduced gain value for said howling sound frequency signal segment when said reference power ratio comparing section judges that said reference power ratio with respect to said howling frequency segment is to be processed in one of said gain reducing manners, said specified reduced gain value uniquely corresponding to said one of said gain reducing manners, set a specified increased gain value for said howling sound frequency signal segment when said reference power ratio comparing section judges that said reference power ratio with respect to said howling frequency segment is to be processed in one of said gain restoring manners, said specified increased gain value uniquely corresponding to said one of said gain restoring manners, or set a gain through value for said howling sound frequency signal segment when said reference power ratio comparing section judges that said reference power ratio with respect to said howling frequency segment is to be processed in said gain through manner.

12. A howling detecting and suppressing apparatus as set forth in claim 4, in which said reference power ratio comparing section is operative to generate a control signal indicating that said reference power ratio comparing section is operating with respect to a howling frequency segment or said reference power ratio comparing section is not operating with respect to a howling frequency segment, said howling suppressing section further includes:

a howling detecting threshold value updating section for judging whether said reference power ratio comparing section is operating or not on the basis of said control signal inputted from said reference power ratio comparing section to update said first howling detecting threshold value with respect to said howling frequency segment by decrementing said first howling detecting threshold value with respect to said howling frequency segment by a predetermined updating value to output said first howling detecting threshold value with respect to said howling frequency segment thus updated to said power ratio comparing section when it is judged that said reference power ratio comparing section is not operating with respect to said howling frequency segment on the basis of said control signal inputted from said reference power ratio comparing section; and a threshold value updating counting section for judging whether said first howling detecting threshold value with respect to said howling frequency segment updated by said howling detecting threshold value updating section is equal to an original first howling detecting threshold value with respect to said howling frequency segment or not, counting the number of frames in which it is judged that said reference power ratio comparing section is not operating with respect to said howling frequency segment on the basis of said control signal inputted from said reference power ratio comparing section when it is judged that said first howling detecting threshold value with respect to said howling frequency segment is not equal to said original first howling detecting threshold value with respect to said howling frequency segment, and judging whether the number of frames thus calculated with respect to said howling frequency segment is greater than a predetermined threshold value to update said first howling detecting threshold value with respect to said howling frequency segment by incrementing said first howling detecting threshold value with respect to said howling frequency segment by a predetermined increment value and output said first howling detecting threshold value with respect to said howling frequency segment thus updated to said howling detecting threshold value updating section when it is judged that the number of frames thus calculated with respect to said howling frequency segment is greater than said threshold value until said first howling detecting threshold value with respect to said howling frequency segment becomes equal to said original first howling detecting threshold value with respect to said howling frequency segment or output said first howling detecting threshold value with respect to said howling frequency segment updated by said howling detecting threshold value updating section to said howling detecting threshold value updating section when it is judged that the number of frames thus calculated with respect to said howling frequency segment is not greater than said threshold value, said howling detecting threshold value updating section is operative to output said first howling detecting threshold value with respect to said howling frequency segment thus outputted by said threshold value updating counting section to said power ratio comparing section when it is judged that said reference power ratio comparing section is operating with respect to said howling frequency segment on the basis of said control signal inputted from said reference power ratio comparing section, and said power ratio comparing section is operative to respectively compare said frequency segment power ratios in said frame calculated by said power ratio calculating section with said first howling detecting threshold value outputted by said howling detecting threshold value updating section to detect howling frequency segment power ratios and howling frequency segments respectively corresponding to said howling frequency segment power ratios in said frame each of which exceeds said first howling detecting threshold value from among said frequency segment power ratios.

13. A loud speaker apparatus equipped with said howling detecting and suppressing apparatus as set forth in claim 1.

14. A hearing aid equipped with said howling detecting and suppressing apparatus as set forth in claim 1.

15. A sound communicating apparatus equipped with said howling detecting and suppressing apparatus as set forth in any one of claim 1.

16. A microphone apparatus equipped with said howling detecting and suppressing apparatus as set forth in claim 1.

17. A Karaoke apparatus equipped with said howling detecting and suppressing apparatus as set forth in claim 1.

18. A howling detecting and suppressing apparatus for detecting and suppressing howling sound components comprising:

a frequency dividing processing section for converting a plurality of sound time signal segments each corresponding to a time segment into a plurality of sound frequency signal segments each corresponding to a frequency segment;

a howling suppressing section for respectively adjusting gains for said sound frequency signal segments converted by said frequency dividing processing section to generate howling-suppressed sound frequency signal segments;

a howling detecting section for judging whether a howling sound component is present or not for each of said howling-suppressed sound frequency signal segments generated by said howling suppressing section to detect howling sound frequency signal segments each in which it is judged that said howling sound component is present and non-howling sound frequency signal segments each in which it is judged that said howling sound component is not present; and a frequency synthesizing processing section for synthesizing said howling-suppressed sound frequency signal segments suppressed by said howling suppressing section to generate howling-suppressed sound time signal segments, and in which said howling suppressing section is operative to respectively adjust gains for said sound frequency signal segments converted by said frequency dividing processing section by changing the gains of said howling sound frequency signal segments detected by said howling detecting section and passing through said non-howling sound frequency signal segments detected by said howling detecting section said frequency dividing processing section is operative to convert a plurality of sound time signal segments collected for a predetermined number of sample periods into a plurality of sound frequency signal segments collectively forming one frame;

said howling detecting section includes:

a delay generator for respectively delaying said howling-suppressed sound frequency signal segments collectively forming a frame generated by said howling suppressing section for a predetermined number of frames to be outputted as reference frequency signal segments collectively forming a frame;

an adaptive filter for respectively convolving said reference frequency signal segments outputted by said delay generator with coefficients to generate adapted reference frequency signal segments collectively forming a frame;

a coefficient updating calculating section for respectively updating said coefficients on the basis of said sound howling-suppressed sound frequency signal segments generated by said howling suppressing section, said reference frequency signal segments outputted by said delay generator, and said adapted reference frequency signal segments generated by said adaptive filter, said adapted reference frequency signal segments divided into a number of frequency bands;

a frequency band power calculating section for respectively calculating frequency band powers of said frequency bands of said adapted reference frequency signal segments collectively forming a frame generated by said adaptive filter;

a smoothing processing section for respectively smoothing said frequency band powers of said frequency bands collectively forming a frame calculated by said frequency band power calculating section to generate smoothed frequency band powers of said frequency bands collectively forming a frame;

a total average frequency band power calculating section for inputting said smoothed frequency band powers of said frequency bands collectively forming a frame generated by said smoothing processing section to calculate a total average value of said smoothed frequency band powers of said frame;

a power ratio calculating section for inputting frequency band power ratios of said smoothed frequency band powers of said frequency bands collectively forming said frame generated by said smoothing processing section to respectively calculate frequency band power ratios of said smoothed frequency band powers of said frequency bands thus inputted to said total average value of said frequency band powers of said frame calculated by said total average frequency band power calculating section to respectively generate frequency band power ratios each corresponding to frequency bands in said frame;

a power ratio comparing section for respectively comparing said frequency band power ratios in said frame calculated by said power ratio calculating section with a predetermined first howling detecting threshold value to detect howling frequency band power ratios and howling frequency bands respectively corresponding to said howling frequency band power ratios in said frame each of which exceeds said first howling detecting threshold value from among said frequency band power ratios;

a target frame counting section for respectively counting the number of target frames in which said howling frequency band power ratios are detected by said power ratio comparing section with respect to said howling frequency bands; and a howling judging section for judging whether a howling sound component is present or not for each of said howling frequency bands by comparing the number of target frames counted by said target frame counting section with respect to each of said howling frequency bands detected by said power ratio comparing section and a predetermined second howling detecting threshold value to detect howling sound frequency bands each in which it is judged that said howling sound component is present because of the fact that the number of target frames counted by said target frame counting section with respect to said howling frequency band exceeds said second howling detecting threshold value and non-howling sound frequency bands each in which it is judged that said howling sound component is not present because of the fact that the number of target frames counted by said target frame counting section with respect to said howling frequency band does not exceed said second howling detecting threshold value.

19. A howling detecting and suppressing apparatus as set forth in claim 18, in which said frequency band power calculating section is operative to respectively calculate frequency signal powers of said adapted reference frequency signal segments collectively forming a frame generated by said adaptive filter, and respectively calculate said frequency band powers of said frequency bands of said adapted reference frequency signal segments collectively forming a frame by respectively counting up said frequency signal powers of said adapted reference frequency signal segments thus calculated for said frequency bands.

20. A howling detecting and suppressing apparatus as set forth in claim 18, in which said howling detecting section is operative to judge whether a howling sound component is present or not only for each of sound frequency signal segments corresponding to specified one or more frequency bands.

21. A howling detecting and suppressing apparatus as set forth in claim 18, in which said total average frequency band power calculating section is operative to input said smoothed frequency band powers of said frequency bands collectively forming a frame generated by said smoothing processing section, detect maximum and quasi-maximum smoothed frequency band powers of maximum and quasi-maximum frequency bands from among said smoothed frequency band powers of said frequency bands collectively forming a frame thus inputted, judge if any one or more of said maximum and quasi-maximum frequency bands correspond to specified one or more frequency bands, and calculate a total average value of said smoothed frequency band powers of said frame excluding one or more of said maximum and quasi-maximum frequency bands corresponding to said specified one or more frequency bands when it is judged that said one or more of said maximum and quasi-maximum frequency bands correspond to said specified one or more frequency bands.

22. A howling detecting and suppressing apparatus as set forth in claim 18, in which said howling detecting section is operative to generate judging information indicating a howling frequency band, transfer said judging information and said total average value of said smoothed frequency band powers to said howling suppressing section, and stop operations of said total average frequency band power calculating section, said power ratio calculating section, said power ratio comparing section, said target frame counting section, and said howling judging section with respect to said howling frequency band when said howling detecting section detects said howling sound frequency band, and said howling suppressing section is operative to input judging information indicating a howling frequency band and said total average value of said smoothed frequency band powers generated when said howling detecting section detects said howling sound frequency band, said howling suppressing section includes:

a reference power ratio calculating section provided with a storage unit for storing said total average value of said smoothed frequency band powers generated when said howling detecting section detects said howling sound frequency band, for calculating a reference power ratio by dividing a smoothed frequency band power of a frequency band with respect to said howling frequency band generated by said smoothing processing section by said total average value of said smoothed frequency band powers stored in said storage unit to generate a reference power ratio with respect to said howling frequency band;

a reference power ratio comparing section for comparing said reference power ratio with respect to said howling frequency band generated by said reference power ratio calculating section with a predetermined gain control threshold value to judge if said reference power ratio with respect to said howling frequency band is to be processed in a gain adjusting manner on the basis of the result of the comparison;

a frequency band gain setting section for setting an adjusted gain value for said howling sound frequency band when it is judged by said reference power ratio comparing section that said reference power ratio with respect to said howling frequency band is to be processed in a gain adjusting manner or setting a gain through value for said howling sound frequency band when it is judged by said reference power ratio comparing section that said reference power ratio with respect to said howling frequency band is not to be processed in a gain adjusting manner to generate an adjusted gain value for said howling sound frequency band; and a gain multiplying section for respectively adjusting gains for said sound frequency signal segments converted by said frequency dividing processing section by multiplying the gains of said howling sound frequency bands detected by said howling detecting section by said adjusted gain value generated by said frequency band gain setting section, and passing through said non-howling sound frequency bands detected by said howling detecting section, whereby said reference power ratio comparing section is operative to generate a control signal indicating that said reference power ratio comparing section is not operating with respect to said howling frequency band when said reference power ratio comparing section judges that said reference power ratio with respect to said howling frequency band is not to be processed in a gain adjusting manner, and said howling detecting section is operative to resume operations of said total average frequency band power calculating section, said power ratio calculating section, said power ratio comparing section, said target frame counting section, and said howling judging section with respect to said howling frequency band when said howling detecting section receives said control signal with respect to said howling frequency band.

23. A howling detecting and suppressing apparatus as set forth in claim 20, in which said howling suppressing section is operative to change the gains of said howling sound frequency bands respectively corresponding to specified one or more frequency bands detected by said howling detecting section and pass through said non-howling sound frequency bands detected by said howling detecting section.

24. A howling detecting and suppressing apparatus as set forth in claim 22, in which said adjusted gain value is a fixed value.

25. A howling detecting and suppressing apparatus as set forth in claim 22, in which said frequency band gain setting section is provided with an adjusted gain value updating unit for updating said adjusted gain value by subtracting an adjusted gain updating constant from said adjusted gain value, said frequency band gain setting section is operative to set an adjusted gain value for said howling sound frequency band and said adjusted gain value updating unit is operative to update said adjusted gain value by subtracting said adjusted gain updating constant from said adjusted gain value when it is judged by said reference power ratio comparing section that said reference power ratio with respect to said howling frequency band is to be processed in a gain adjusting manner.

26. A howling detecting and suppressing apparatus as set forth in claim 22, in which said frequency band gain setting section is provided with an adjusted gain value updating unit for updating said adjusted gain value by adding an adjusted gain updating constant to said adjusted gain value, said frequency band gain setting section is operative to set an adjusted gain value for said howling sound frequency band and said adjusted gain value updating unit is operative to update said adjusted gain value by adding said adjusted gain updating constant to said adjusted gain value when it is judged by said reference power ratio comparing section that said reference power ratio with respect to said howling frequency band is to be processed in a gain adjusting manner.

27. A howling detecting and suppressing apparatus as set forth in claim 22, in which said frequency band gain setting section is provided with an adjusted gain value updating unit for updating said adjusted gain value by multiplying said adjusted gain value with a adjusted gain updating coefficient, said frequency band gain setting section is operative to set an adjusted gain value for said howling sound frequency band and said adjusted gain value updating unit is operative to update said adjusted gain value by multiplying said adjusted gain value with said adjusted gain updating coefficient when it is judged by said reference power ratio comparing section that said reference power ratio with respect to said howling frequency band is to be processed in a gain adjusting manner.

28. A howling detecting and suppressing apparatus as set forth in claim 22, in which said reference power ratio comparing section is operative to compare said reference power ratio with respect to said howling frequency band generated by said reference power ratio calculating section with a predetermined gain control threshold value to judge if said reference power ratio with respect to said howling frequency band is to be processed in a gain reducing manner, a gain restoring manner, or a gain through manner on the basis of the result of the comparison, and said frequency band gain setting section is operative to set a reduced gain value for said howling sound frequency band when said reference power ratio comparing section judges that said reference power ratio with respect to said howling frequency band is to be processed in said gain reducing manner, set an increased gain value for said howling sound frequency band when said reference power ratio comparing section judges that said reference power ratio with respect to said howling frequency band is to be processed in said gain restoring manner, or set a gain through value for said howling sound frequency band when said reference power ratio comparing section judges that said reference power ratio with respect to said howling frequency band is to be processed in said gain through manner, whereby said reference power ratio comparing section is operative to generate a control signal indicating that said reference power ratio comparing section is not operating with respect to said howling frequency band when said reference power ratio comparing section judges that said reference power ratio with respect to said howling frequency band is to be processed in a gain through manner, and said howling detecting section is operative to resume operations of said total average frequency band power calculating section, said power ratio calculating section, said power ratio comparing section, said target frame counting section, and said howling judging section with respect to said howling frequency band when said howling detecting section receives said control signal with respect to said howling frequency band.

29. A howling detecting and suppressing apparatus as set forth in claim 22, in which said reference power ratio comparing section is operative to compare said reference power ratio with respect to said howling frequency band generated by said reference power ratio calculating section with a predetermined gain control threshold value to judge if said reference power ratio with respect to said howling frequency band is to be processed in a plurality of gain reducing manners, a plurality of gain restoring manners, or a gain through manner on the basis of the result of the comparison; and said frequency band gain setting section is operative to set a specified reduced gain value for said howling sound frequency band when said reference power ratio comparing section judges that said reference power ratio with respect to said howling frequency band is to be processed in one of said gain reducing manners, said specified reduced gain value uniquely corresponding to said one of said gain reducing manners, set a specified increased gain value for said howling sound frequency band when said reference power ratio comparing section judges that said reference power ratio with respect to said howling frequency band is to be processed in one of said gain restoring manners, said specified increased gain value uniquely corresponding to said one of said gain restoring manners, or set a gain through value for said howling sound frequency band when said reference power ratio comparing section judges that said reference power ratio with respect to said howling frequency band is to be processed in said gain through manner.

30. A howling detecting and suppressing apparatus as set forth in claim 22, in which said reference power ratio comparing section is operative to generate a control signal indicating that said reference power ratio comparing section is operating with respect to a howling frequency band or said reference power ratio comparing section is not operating with respect to a howling frequency band, said howling suppressing section further includes:

a howling detecting threshold value updating section for judging whether said reference power ratio comparing section is operating or not on the basis of said control signal inputted from said reference power ratio comparing section to update said first howling detecting threshold value with respect to said howling frequency band by decrementing said first howling detecting threshold value with respect to said howling frequency band by a predetermined updating value to output said first howling detecting threshold value with respect to said howling frequency band thus updated to said power ratio comparing section when it is judged that said reference power ratio comparing section is not operating with respect to said howling frequency band on the basis of said control signal inputted from said reference power ratio comparing section; and a threshold value updating counting section for judging whether said first howling detecting threshold value with respect to said howling frequency band updated by said howling detecting threshold value updating section is equal to said original first howling detecting threshold value with respect to said howling frequency band or not, counting the number of frames in which it is judged that said reference power ratio comparing section is not operating with respect to said howling frequency band on the basis of said control signal inputted from said reference power ratio comparing section when it is judged that said first howling detecting threshold value with respect to said howling frequency band is not equal to said original first howling detecting threshold value with respect to said howling frequency band, and judging whether the number of frames thus calculated with respect to said howling frequency band is greater than a predetermined threshold value to update said first howling detecting threshold value with respect to said howling frequency band by incrementing said first howling detecting threshold value with respect to said howling frequency band by a predetermined increment value and output said first howling detecting threshold value with respect to said howling frequency band thus updated to said howling detecting threshold value updating section when it is judged that the number of frames thus calculated with respect to said howling frequency band with respect to said howling frequency band is greater than said threshold value until said first howling detecting threshold value with respect to said howling frequency band becomes equal to said original first howling detecting threshold value with respect to said howling frequency band or output said first howling detecting threshold value with respect to said howling frequency band updated by said howling detecting threshold value updating section to said howling detecting threshold value updating section when it is judged that the number of frames thus calculated with respect to said howling frequency band with respect to said howling frequency band is not greater than said threshold value, said howling detecting threshold value updating section is operative to output said first howling detecting threshold value with respect to said howling frequency band thus outputted by said threshold value updating counting section to said power ratio comparing section when it is judged that said reference power ratio comparing section is operating with respect to said howling frequency band on the basis of said control signal inputted from said reference power ratio comparing section, and said power ratio comparing section is operative to respectively compare said frequency band power ratios in said frame calculated by said power ratio calculating section with said first howling detecting threshold value outputted by said howling detecting threshold value updating section to detect howling frequency band power ratios and howling frequency bands respectively corresponding to said howling frequency band power ratios in said frame each of which exceeds said first howling detecting threshold value from among said frequency band power ratios.

31. A howling detecting and suppressing apparatus for detecting and suppressing howling sound components comprising:

a bandwidth dividing processing section for converting a plurality of sound time signal segments each corresponding to a time segment into a plurality of sound frequency signal bandwidths each corresponding to a frequency bandwidth;

a howling suppressing section for respectively adjusting gains for said sound frequency signal bandwidths converted by said bandwidth dividing processing section to generate howling-suppressed sound frequency signal bandwidths;

a howling detecting section for judging whether a howling sound component is present or not for each of said howling-suppressed sound frequency signal bandwidths generated by said howling suppressing section to detect howling sound frequency signal bandwidths each in which it is judged that said howling sound component is present and non-howling sound frequency signal bandwidths each in which it is judged that said howling sound component is not present; and a bandwidth synthesizing processing section for synthesizing said howling-suppressed sound frequency signal bandwidths suppressed by said howling suppressing section to generate howling-suppressed sound time signal segments, and in which said howling suppressing section is operative to respectively adjust gains for said sound frequency signal bandwidths converted by said bandwidth dividing processing section by changing the gains of said howling sound frequency signal bandwidths detected by said howling detecting section and pass through said non-howling sound frequency signal bandwidths detected by said howling detecting section, said bandwidth dividing processing section is operative to convert a plurality of sound time signal segments collected for a predetermined number of sample periods into a plurality of sound frequency signal bandwidths collectively forming one signal unit;

said howling detecting section includes:

a delay generator for respectively delaying said howling-suppressed sound frequency signal bandwidths collectively forming a signal unit generated by said howling suppressing section for a predetermined number of signal units to be outputted as reference frequency signal bandwidths collectively forming a signal unit;

an adaptive filter for respectively convolving said reference frequency signal bandwidths outputted by said delay generator with coefficients to generate adapted reference frequency signal bandwidths collectively forming a signal unit;

a coefficient updating calculating section for respectively updating said coefficients on the basis of said sound howling-suppressed sound frequency signal bandwidths generated by said howling suppressing section, said reference frequency signal bandwidths outputted by said delay generator, and said adapted reference frequency signal bandwidths generated by said adaptive filter;

a bandwidth power calculating section for respectively calculating bandwidth powers of said adapted reference frequency signal bandwidths collectively forming a signal unit generated by said adaptive filter;

a smoothing processing section for respectively smoothing said bandwidth powers of said adapted reference frequency signal bandwidths collectively forming a signal unit calculated by said bandwidth power calculating section to generate smoothed bandwidth powers of said adapted reference frequency signal bandwidths collectively forming a signal unit;

a total average frequency power calculating section for inputting said smoothed bandwidth powers of said adapted reference frequency signal bandwidths collectively forming a signal unit generated by said smoothing processing section to calculate a total average value of said smoothed bandwidth powers of said signal unit;

a power ratio calculating section for inputting bandwidth power ratios of said smoothed bandwidth powers of said adapted reference frequency signal bandwidths collectively forming said signal unit generated by said smoothing processing section to respectively calculate bandwidth power ratios of said smoothed bandwidth powers of said adapted reference frequency signal bandwidths thus inputted to said total average value of said bandwidth powers of said signal unit calculated by said total average frequency power calculating section to respectively generate bandwidth power ratios each corresponding to frequency bandwidths in said signal unit;

a power ratio comparing section for respectively comparing said bandwidth power ratios in said signal unit calculated by said power ratio calculating section with a predetermined first howling detecting threshold value to detect howling bandwidth power ratios and howling frequency bandwidths respectively corresponding to said howling bandwidth power ratios in said signal unit each of which exceeds said first howling detecting threshold value from among said bandwidth power ratios;

a target signal unit counting section for respectively counting the number of target signal units in which said howling bandwidth power ratios are detected by said power ratio comparing section with respect to said howling frequency bandwidths; and a howling judging section for judging whether a howling sound component is present or not for each of said howling frequency bandwidths by comparing the number of target signal units counted by said target signal unit counting section with respect to each of said howling frequency bandwidths detected by said power ratio comparing section and a predetermined second howling detecting threshold value to detect howling sound frequency signal bandwidths each in which it is judged that said howling sound component is present because of the fact that the number of target signal units counted by said target signal unit counting section with respect to said howling frequency bandwidth exceeds said second howling detecting threshold value and non-howling sound frequency signal bandwidths each in which it is judged that said howling sound component is not present because of the fact that the number of target signal units counted by said target signal unit counting section with respect to said howling frequency bandwidth does not exceed said second howling detecting threshold value.

32. A howling detecting and suppressing apparatus as set forth in claim 31, in which said howling detecting section is operative to judge whether a howling sound component is present or not only for each of sound frequency signal bandwidths corresponding to specified one or more frequency bandwidths.

33. A howling detecting and suppressing apparatus as set forth in claim 31, in which said total average frequency power calculating section is operative to input said smoothed bandwidth powers of said adapted reference frequency signal bandwidths collectively forming a signal unit generated by said smoothing processing section, detect maximum and quasi-maximum smoothed bandwidth powers of maximum and quasi-maximum adapted reference frequency signal bandwidths from among said smoothed bandwidth powers of said adapted reference frequency signal bandwidths collectively forming a signal unit thus inputted, judge if any one or more of said maximum and quasi-maximum adapted reference frequency signal bandwidths correspond to specified one or more frequency bandwidths, and calculate a total average value of said smoothed bandwidth powers of said signal unit excluding one or more of said maximum and quasi-maximum adapted reference frequency signal bandwidths corresponding to said specified one or more frequency bandwidths when it is judged that said one or more of said maximum and quasi-maximum adapted reference frequency signal bandwidths correspond to said specified one or more frequency bandwidths.

34. A howling detecting and suppressing apparatus as set forth in claim 28, in which said howling detecting section is operative to generate judging information indicating a howling sound frequency signal bandwidth corresponding to a howling frequency bandwidth, transfer said judging information and said total average value of said smoothed bandwidth powers to said howling suppressing section, and stop operations of said total average frequency power calculating section, said power ratio calculating section, said power ratio comparing section, said target signal unit counting section, and said howling judging section with respect to said howling frequency bandwidth when said howling detecting section detects said howling sound frequency signal bandwidth, and said howling suppressing section is operative to input judging information indicating a howling sound frequency signal bandwidth corresponding to a howling frequency bandwidth and said total average value of said smoothed bandwidth powers generated when said howling detecting section detects said howling sound frequency signal bandwidth, said howling suppressing section includes:

a reference power ratio calculating section provided with a storage unit for storing said total average value of said smoothed bandwidth powers generated when said howling detecting section detects said howling sound frequency signal bandwidth, for calculating a reference power ratio by dividing a smoothed bandwidth power of an adapted reference frequency signal bandwidth with respect to said howling frequency bandwidth generated by said smoothing processing section by said total average value of said smoothed bandwidth powers stored in said storage unit to generate a reference power ratio with respect to said howling frequency bandwidth;

a reference power ratio comparing section for comparing said reference power ratio with respect to said howling frequency bandwidth generated by said reference power ratio calculating section with a predetermined gain control threshold value to judge if said reference power ratio with respect to said howling frequency bandwidth is to be processed in a gain adjusting manner on the basis of the result of the comparison;

a bandwidth gain setting section for setting an adjusted gain value for said howling sound frequency signal bandwidth when it is judged by said reference power ratio comparing section that said reference power ratio with respect to said howling frequency bandwidth is to be processed in a gain adjusting manner or setting a gain through value for said howling sound frequency signal bandwidth when it is judged by said reference power ratio comparing section that said reference power ratio with respect to said howling frequency bandwidth is not to be processed in a gain adjusting manner to generate an adjusted gain value for said howling sound frequency signal bandwidth; and a gain multiplying section for respectively adjusting gains for said sound frequency signal bandwidths converted by said bandwidth dividing processing section by multiplying the gains of said howling sound frequency signal bandwidths detected by said howling detecting section by said adjusted gain value generated by said bandwidth gain setting section, and passing through said non-howling sound frequency signal bandwidths detected by said howling detecting section, whereby said reference power ratio comparing section is operative to generate a control signal indicating that said reference power ratio comparing section is not operating with respect to said howling frequency bandwidth when said reference power ratio comparing section judges that said reference power ratio with respect to said howling frequency bandwidth is not to be processed in a gain adjusting manner, and said howling detecting section is operative to resume operations of said total average frequency power calculating section, said power ratio calculating section, said power ratio comparing section, said target signal unit counting section, and said howling judging section with respect to said howling frequency bandwidth when said howling detecting section receives said control signal with respect to said howling frequency bandwidth.

35. A howling detecting and suppressing apparatus as set forth in claim 32, in which said howling suppressing section is operative to change the gains of said howling sound frequency signal bandwidths respectively corresponding to specified one or more frequency bandwidths detected by said howling detecting section and pass through said non-howling sound frequency signal bandwidths detected by said howling detecting section.

36. A howling detecting and suppressing apparatus as set forth in claim 34, in which said adjusted gain value is a fixed value.

37. A howling detecting and suppressing apparatus as set forth in claim 34, in which said bandwidth gain setting section is provided with an adjusted gain value updating unit for updating said adjusted gain value by subtracting an adjusted gain updating constant from said adjusted gain value, and said bandwidth gain setting section is operative to set an adjusted gain value for said howling sound frequency signal bandwidth and said adjusted gain value updating unit is operative to update said adjusted gain value by subtracting said adjusted gain updating constant from said adjusted gain value when it is judged by said reference power ratio comparing section that said reference power ratio with respect to said howling frequency bandwidth is to be processed in a gain adjusting manner.

38. A howling detecting and suppressing apparatus as set forth in claim 34, in which said bandwidth gain setting section is provided with an adjusted gain value updating unit for updating said adjusted gain value by adding an adjusted gain updating constant to said adjusted gain value, and said bandwidth gain setting section is operative to set an adjusted gain value for said howling sound frequency signal bandwidth and said adjusted gain value updating unit is operative to update said adjusted gain value by adding said adjusted gain updating constant to said adjusted gain value when it is judged by said reference power ratio comparing section that said reference power ratio with respect to said howling frequency bandwidth is to be processed in a gain adjusting manner.

39. A howling detecting and suppressing apparatus as set forth in claim 34, in which said bandwidth gain setting section is provided with an adjusted gain value updating unit for updating said adjusted gain value by multiplying said adjusted gain value with a adjusted gain updating coefficient, and said bandwidth gain setting section is operative to set an adjusted gain value for said howling sound frequency signal bandwidth and said adjusted gain value updating unit is operative to update said adjusted gain value by multiplying said adjusted gain value with said adjusted gain updating coefficient when it is judged by said reference power ratio comparing section that said reference power ratio with respect to said howling frequency bandwidth is to be processed in a gain adjusting manner.

40. A howling detecting and suppressing apparatus as set forth in claim 34, in which said reference power ratio comparing section is operative to compare said reference power ratio with respect to said howling frequency bandwidth generated by said reference power ratio calculating section with a predetermined gain control threshold value to judge if said reference power ratio with respect to said howling frequency bandwidth is to be processed in a gain reducing manner, a gain restoring manner, or a gain through manner on the basis of the result of the comparison; and said bandwidth gain setting section is operative to set a reduced gain value for said howling sound frequency signal bandwidth when said reference power ratio comparing section judges that said reference power ratio with respect to said howling frequency bandwidth is to be processed in said gain reducing manner, set an increased gain value for said howling sound frequency signal bandwidth when said reference power ratio comparing section judges that said reference power ratio with respect to said howling frequency bandwidth is to be processed in said gain restoring manner, or set a gain through value for said howling sound frequency signal bandwidth when said reference power ratio comparing section judges that said reference power ratio with respect to said howling frequency bandwidth is to be processed in said gain through manner, whereby said reference power ratio comparing section is operative to generate a control signal indicating that said reference power ratio comparing section is not operating with respect to said howling frequency bandwidth when said reference power ratio comparing section judges that said reference power ratio with respect to said howling frequency bandwidth is to be processed in a gain through manner, and said howling detecting section is operative to resume operations of said total average frequency power calculating section, said power ratio calculating section, said power ratio comparing section, said target signal unit counting section, and said howling judging section with respect to said howling frequency bandwidth when said howling detecting section receives said control signal with respect to said howling frequency bandwidth.

41. A howling detecting and suppressing apparatus as set forth in claim 34, in which said reference power ratio comparing section is operative to compare said reference power ratio with respect to said howling frequency bandwidth generated by said reference power ratio calculating section with a predetermined gain control threshold value to judge if said reference power ratio with respect to said howling frequency bandwidth is to be processed in a plurality of gain reducing manners, a plurality of gain restoring manners, or a gain through manner on the basis of the result of the comparison; and said bandwidth gain setting section is operative to set a specified reduced gain value for said howling sound frequency signal bandwidth when said reference power ratio comparing section judges that said reference power ratio with respect to said howling frequency bandwidth is to be processed in one of said gain reducing manners, said specified reduced gain value uniquely corresponding to said one of said gain reducing manners, set a specified increased gain value for said howling sound frequency signal bandwidth when said reference power ratio comparing section judges that said reference power ratio with respect to said howling frequency bandwidth is to be processed in one of said gain restoring manners, said specified increased gain value uniquely corresponding to said one of said gain restoring manners, or set a gain through value for said howling sound frequency signal bandwidth when said reference power ratio comparing section judges that said reference power ratio with respect to said howling frequency bandwidth is to be processed in said gain through manner.

42. A howling detecting and suppressing apparatus as set forth in claim 34, in which said reference power ratio comparing section is operative to generate a control signal indicating that said reference power ratio comparing section is operating with respect to a howling frequency bandwidth or said reference power ratio comparing section is not operating with respect to a howling frequency bandwidth, said howling suppressing section further includes:

a howling detecting threshold value updating section for judging whether said reference power ratio comparing section is operating or not on the basis of said control signal inputted from said reference power ratio comparing section to update said first howling detecting threshold value with respect to said howling frequency bandwidth by decrementing said first howling detecting threshold value with respect to said howling frequency bandwidth by a predetermined updating value to output said first howling detecting threshold value with respect to said howling frequency bandwidth thus updated to said power ratio comparing section when it is judged that said reference power ratio comparing section is not operating with respect to said howling frequency bandwidth on the basis of said control signal inputted from said reference power ratio comparing section; and a threshold value updating counting section for judging whether said first howling detecting threshold value with respect to said howling frequency bandwidth updated by said howling detecting threshold value updating section is equal to said original first howling detecting threshold value with respect to said howling frequency bandwidth or not, counting the number of signal units in which it is judged that said reference power ratio comparing section is not operating with respect to said howling frequency bandwidth on the basis of said control signal inputted from said reference power ratio comparing section when it is judged that said first howling detecting threshold value with respect to said howling frequency bandwidth is not equal to said original first howling detecting threshold value with respect to said howling frequency bandwidth, and judging whether the number of signal units thus calculated with respect to said howling frequency bandwidth is greater than a predetermined threshold value to update said first howling detecting threshold value with respect to said howling frequency bandwidth by incrementing said first howling detecting threshold value with respect to said howling frequency bandwidth by a predetermined increment value and output said first howling detecting threshold value with respect to said howling frequency bandwidth thus updated to said howling detecting threshold value updating section when it is judged that the number of signal units thus calculated with respect to said howling frequency bandwidth with respect to said howling frequency bandwidth is greater than said threshold value until said first howling detecting threshold value with respect to said howling frequency bandwidth becomes equal to said original first howling detecting threshold value with respect to said howling frequency bandwidth or output said first howling detecting threshold value with respect to said howling frequency bandwidth updated by said howling detecting threshold value updating section to said howling detecting threshold value updating section when it is judged that the number of signal units thus calculated with respect to said howling frequency bandwidth with respect to said howling frequency bandwidth is not greater than said threshold value, said howling detecting threshold value updating section is operative to output said first howling detecting threshold value with respect to said howling frequency bandwidth thus outputted by said threshold value updating counting section to said power ratio comparing section when it is judged that said reference power ratio comparing section is operating with respect to said howling frequency bandwidth on the basis of said control signal inputted from said reference power ratio comparing section, and said power ratio comparing section is operative to respectively compare said frequency bandwidth power ratios in said signal unit calculated by said power ratio calculating section with said first howling detecting threshold value outputted by said howling detecting threshold value updating section to detect howling frequency bandwidth power ratios and howling frequency bandwidths respectively corresponding to said howling frequency bandwidth power ratios in said signal unit each of which exceeds said first howling detecting threshold value from among said frequency bandwidth power ratios.

43. A howling detecting and suppressing method of detecting and suppressing howling sound components comprising the steps of:

(a) converting a plurality of sound time signal segments each corresponding to a time segment into a plurality of sound frequency signal segments each corresponding to a frequency segment;

(b) respectively adjusting gains for said sound frequency signal segments converted by said step (a) to generate howling-suppressed sound frequency signal segments;

(c) judging whether a howling sound component is present or not for each of said howling-suppressed sound frequency signal segments generated by said step (b) to detect howling sound frequency signal segments each in which it is judged that said howling sound component is present and non-howling sound frequency signal segments each in which it is judged that said howling sound component is not present; and (d) synthesizing said howling-suppressed sound frequency signal segments suppressed by said step (b) to generate howling-suppressed sound time signal segments, and in which said step (b) has a step of respectively adjusting gains for said sound frequency signal segments converted by said step (a) by changing the gains of said howling sound frequency signal segments detected by said step (c) and passing through said non-howling sound frequency signal segments detected by said step (c), said step (a) has a step of converting a plurality of sound time signal segments collected for a predetermined number of sample periods into a plurality of sound frequency signal segments collectively forming one frame;

said step (c) includes the steps of:

(c1) respectively delaying said howling-suppressed sound frequency signal segments collectively forming a frame generated by said step (b) for a predetermined number of frames to be outputted as reference frequency signal segments collectively forming a frame;

(c2) respectively convolving said reference frequency signal segments outputted by said step (c1) with coeffic1ents to generate adapted reference frequency signal segments collectively forming a frame;

(c3) respectively updating said coefficients on the basis of said sound howling-suppressed sound frequency signal segments generated by said step (b), said reference frequency signal segments outputted by said step (c1), and said adapted reference frequency signal segments generated by said step (c2);

(c4) respectively calculating frequency signal powers of said adapted reference frequency signal segments collectively forming a frame generated by said step (c2);

(c5) respectively smoothing said frequency signal powers of said adapted reference frequency signal segments collectively forming a frame calculated by said step (c4) to generate smoothed frequency signal powers of said adapted reference frequency signal segments collectively forming a frame;

(c6) inputting said smoothed frequency signal powers of said adapted reference frequency signal segments collectively forming a frame generated by said step (c5) to calculate a total average value of said smoothed frequency signal powers of said frame;

(c7) inputting frequency signal power ratios of said smoothed frequency signal powers of said adapted reference frequency signal segments collectively forming said frame generated by said step (c5) to respectively calculate frequency signal power ratios of said smoothed frequency signal powers of said adapted reference frequency signal segments thus inputted to said total average value of said frequency signal powers of said frame calculated by said step (c6) to respectively generate frequency signal power ratios each corresponding to frequency segments in said frame;

(c8) respectively comparing said frequency signal power ratios in said frame calculated by said step (c7) with a predetermined first howling detecting threshold value to detect howling frequency signal power ratios and howling frequency segments respectively corresponding to said howling frequency signal power ratios in said frame each of which exceeds said first howling detecting threshold value from among said frequency signal power ratios;

(c9) respectively counting the number of target frames in which said howling frequency signal power ratios are detected by said step (c8) with respect to said howling frequency segments; and (c10) judging whether a howling sound component is present or not for each of said howling frequency segments by comparing the number of target frames counted by said step (c9) with respect to each of said howling frequency segments detected by said step (c8) and a predetermined second howling detecting threshold value to detect howling sound frequency signal segments each in which it is judged that said howling sound component is present because of the fact that the number of target frames counted by said step (c9) with respect to said howling frequency segment exceeds said second howling detecting threshold value and non-howling sound frequency signal segments each in which it is judged that said howling sound component is not present because of the fact that the number of target frames counted by said step (c9) with respect to said howling frequency segment does not exceed said second howling detecting threshold value.

44. A howling detecting and suppressing method as set forth in claim 43, in which said step (c) has steps of generating judging information indicating a howling sound frequency signal segment corresponding to a howling frequency segment, transferring said judging information and said total average value of said smoothed frequency signal powers to said step (b), and stopping operations of said step (c6), said step (c7), said step (c8), said step (c9), and said step (c10) with respect to said howling frequency segment when said howling sound frequency signal segment is detected by said step (c), and said step (b) has a step of inputting judging information indicating a howling sound frequency signal segment corresponding to a howling frequency segment and said total average value of said smoothed frequency signal powers generated when said howling sound frequency signal segment is detected by said step (c), said step (b) includes the steps of:

(b1-1) storing said total average value of said smoothed frequency signal powers generated when said howling sound frequency signal segment is detected by said step (c);

(b1) calculating a reference power ratio by dividing a smoothed frequency signal power of an adapted reference frequency signal segment with respect to said howling frequency segment generated by said step (c5) in said total average value of said smoothed frequency signal powers stored by said step (b1-1) to generate a reference power ratio with respect to said howling frequency segment;

(b2) comparing said reference power ratio with respect to said howling frequency segment generated by said step (b1) with a predetermined gain control threshold value to judge if said reference power ratio with respect to said howling frequency segment is to be processed in a gain adjusting manner on the basis of the result of the comparison;

(b3) setting an adjusted gain value for said howling sound frequency signal segment when it is judged by said step (b2) that said reference power ratio with respect to said howling frequency segment is to be processed in a gain adjusting manner or setting a gain through value for said howling sound frequency signal segment when it is judged by said step (b2) that said reference power ratio with respect to said howling frequency segment is not to be processed in a gain adjusting manner to generate an adjusted gain value for said howling sound frequency signal segment; and (b4) respectively adjusting gains for said sound frequency signal segments converted by said step (a) by multiplying the gains of said howling sound frequency signal segments detected by said step (c) in said adjusted gain value generated by said step (b3), and passing through said non-howling sound frequency signal segments detected by said step (c), whereby said step (b2) has a step of generating a control signal indicating that said step (b2) is not operating with respect to said howling frequency segment when it is judged by said step (b2) that said reference power ratio with respect to said howling frequency segment is not to be processed in a gain adjusting manner, and said signal step (c) has a step of resuming operations of said step (c6), said step (c7), said step (c8), said step (c9), and said step (c10) with respect to said howling frequency segment when said control signal with respect to said howling frequency segment is received by said step (c).

45. A howling detecting and suppressing method of detecting and suppressing howling sound components comprising the steps of:

(a) converting a plurality of sound time signal segments each corresponding to a time segment into a plurality of sound frequency signal segments each corresponding to a frequency segment;

(b) respectively adjusting gains for said sound frequency signal segments converted by said step (a) to generate howling-suppressed sound frequency signal segments;

(c) judging whether a howling sound component is present or not for each of said howling-suppressed sound frequency signal segments generated by said step (b) to detect howling sound frequency signal segments each in which it is judged that said howling sound component is present and non-howling sound frequency signal segments each in which it is judged that said howling sound component is not present; and (d) synthesizing said howling-suppressed sound frequency signal segments suppressed by said step (b) to generate howling-suppressed sound time signal segments, and in which said step (b) has a step of respectively adjusting gains for said sound frequency signal segments converted by said step (a) by changing the gains of said howling sound frequency signal segments detected by said step (c) and passing through said non-howling sound frequency signal segments detected by said step (c), said step (a) has a step of converting a plurality of sound time signal segments collected for a predetermined number of sample periods into a plurality of sound frequency signal segments collectively forming one frame;

said step (c) includes the steps of:

(c31) respectively delaying said howling-suppressed sound frequency signal segments collectively forming a frame generated by said step (b) for a predetermined number of frames to be outputted as reference frequency signal segments collectively forming a frame;

(c32) respectively convolving said reference frequency signal segments outputted by said step (c31) with coefficients to generate adapted reference frequency signal segments collectively forming a frame;

(c33) respectively updating said coefficients on the basis of said sound howling-suppressed sound frequency signal segments generated by said step (b), said reference frequency signal segments outputted by said step (c31), and said adapted reference frequency signal segments generated by said step (c32), said adapted reference frequency signal segments divided into a number of frequency bands;

(c34) respectively calculating frequency band powers of said frequency bands of said adapted reference frequency signal segments collectively forming a frame generated by said step (c32);

(c35) respectively smoothing said frequency band powers of said frequency bands collectively forming a frame calculated by said step (c34) to generate smoothed frequency band powers of said frequency bands collectively forming a frame;

(c36) inputting said smoothed frequency band powers of said frequency bands collectively forming a frame generated by said step (c35) to calculate a total average value of said smoothed frequency band powers of said frame;

(c37) inputting frequency band power ratios of said smoothed frequency band powers of said frequency bands collectively forming said frame generated by said step (c35) to respectively calculate frequency band power ratios of said smoothed frequency band powers of said frequency bands thus inputted to said total average value of said frequency band powers of said frame calculated by said step (c36) to respectively generate frequency band power ratios each corresponding to frequency bands in said frame;

(c38) respectively comparing said frequency band power ratios in said frame calculated by said step (c37) with a predetermined first howling detecting threshold value to detect howling frequency band power ratios and howling frequency bands respectively corresponding to said howling frequency band power ratios in said frame each of which exceeds said first howling detecting threshold value from among said frequency band power ratios;

(c39) respectively counting the number of target frames in which said howling frequency band power ratios are detected by said step (c38) with respect to said howling frequency bands; and (c40) judging whether a howling sound component is present or not for each of said howling frequency bands by comparing the number of target frames counted by said step (c39) with respect to each of said howling frequency bands detected by said step (c38) and a predetermined second howling detecting threshold value to detect howling sound frequency bands each in which it is judged that said howling sound component is present because of the fact that the number of target frames counted by said step (c39) with respect to said howling frequency band exceeds said second howling detecting threshold value and non-howling sound frequency bands each in which it is judged that said howling sound component is not present because of the fact that the number of target frames counted by said step (c39) with respect to said howling frequency band does not exceed said second howling detecting threshold value.

46. A howling detecting and suppressing method as set forth in claim 45, in which said step (c) has steps of generating judging information indicating a howling frequency band, transferring said judging information and said total average value of said smoothed frequency band powers to said step (b), and stopping operations of said step (c36), said step (c37), said step (c38), said step (c39), and said step (c40) with respect to said howling frequency band when said howling sound frequency band is detected by said step (c), and said step (b) has a step of inputting judging information indicating a howling frequency band and said total average value of said smoothed frequency band powers generated when said howling sound frequency band is detected by said step (c), said step (b) includes the steps of:

(b31-1) storing said total average value of said smoothed frequency band powers generated when said howling sound frequency band is detected by said step (c);

(b31) calculating a reference power ratio by dividing a smoothed frequency band power of a frequency band with respect to said howling frequency band generated by said step (c35) by said total average value of said smoothed frequency band powers stored by said step (b31-1) to generate a reference power ratio with respect to said howling frequency band;

(b31) comparing said reference power ratio with respect to said howling frequency band generated by said step (b31) with a predetermined gain control threshold value to judge if said reference power ratio with respect to said howling frequency band is to be processed in a gain adjusting manner on the basis of the result of the comparison;

(b33) setting an adjusted gain value for said howling sound frequency band when it is judged by said step (b32) that said reference power ratio with respect to said howling frequency band is to be processed in a gain adjusting manner or setting a gain through value for said howling sound frequency band when it is judged by said step (b32) that said reference power ratio with respect to said howling frequency band is not to be processed in a gain adjusting manner to generate an adjusted gain value for said howling sound frequency band; and (b34) respectively adjusting gains for said sound frequency signal segments converted by said step (a) by multiplying the gains of said howling sound frequency bands detected by said step (c) by said adjusted gain value generated by said step (b33), and passing through said non-howling sound frequency bands detected by said step (c), whereby said step (b32) has a step of generating a control signal indicating that said step (b32) is not operating with respect to said howling frequency band when it is judged by said step (b32) that said reference power ratio with respect to said howling frequency band is not to be processed in a gain adjusting manner, and said signal step (c) has a step of resuming operations of said step (c36), said step (c37), said step (c38), said step (c39), and said step (c40) with respect to said howling frequency band when said control signal is received by said step (c) with respect to said howling frequency band.

47. A howling detecting and suppressing method of detecting and suppressing howling sound components comprising the steps of:

(e) converting a plurality of sound time signal segments each corresponding to a time segment into a plurality of sound frequency signal bandwidths each corresponding to a frequency bandwidth;

(f) respectively adjusting gains for said sound frequency signal bandwidths converted by said step (e) to generate howling-suppressed sound frequency signal bandwidths;

(g) judging whether a howling sound component is present or not for each of said howling-suppressed sound frequency signal bandwidths generated by said step (f) to detect howling sound frequency signal bandwidths each in which it is judged that said howling sound component is present and non-howling sound frequency signal bandwidths each in which it is judged that said howling sound component is not present; and (h) synthesizing said howling-suppressed sound frequency signal bandwidths suppressed by said step (f) to generate howling-suppressed sound time signal segments, and in which said step (f) has a step of respectively adjusting gains for said sound frequency signal bandwidths converted by said step (e) by changing the gains of said howling sound frequency signal bandwidths detected by said step (g) and passing through said non-howling sound frequency signal bandwidths detected by said step (g), said step (e) has a step of converting a plurality of sound time signal segments collected for a predetermined number of sample periods into a plurality of sound frequency signal bandwidths collectively forming one signal unit;

said step (g) includes the steps of:

(g1) respectively delaying said howling-suppressed sound frequency signal bandwidths collectively forming a signal unit generated by said step (f) for a predetermined number of signal units to be outputted as reference frequency signal bandwidths collectively forming a signal unit;

(g2) respectively convolving said reference frequency signal bandwidths outputted by said step (g1) with coefficients to generate adapted reference frequency signal bandwidths collectively forming a signal unit;

(g3) respectively updating said coefficients on the basis of said sound howling-suppressed sound frequency signal bandwidths generated by said step (f), said reference frequency signal bandwidths outputted by said step (g1), and said adapted reference frequency signal bandwidths generated by said step (g2);

(g4) respectively calculating bandwidth powers of said adapted reference frequency signal bandwidths collectively forming a signal unit generated by said step (g2);

(g5) respectively smoothing said bandwidth powers of said adapted reference frequency signal bandwidths collectively forming a signal unit calculated by said step (g4) to generate smoothed bandwidth powers of said adapted reference frequency signal bandwidths collectively forming a signal unit;

(g6) inputting said smoothed bandwidth powers of said adapted reference frequency signal bandwidths collectively forming a signal unit generated by said step (g5) to calculate a total average value of said smoothed bandwidth powers of said signal unit;

(g7) inputting bandwidth power ratios of said smoothed bandwidth powers of said adapted reference frequency signal bandwidths collectively forming said signal unit generated by said step (g5) to respectively calculate bandwidth power ratios of said smoothed bandwidth powers of said adapted reference frequency signal bandwidths thus inputted to said total average value of said bandwidth powers of said signal unit calculated by said step (g6) to respectively generate bandwidth power ratios each corresponding to frequency bandwidths in said signal unit;

(g8) respectively comparing said bandwidth power ratios in said signal unit calculated by said step (g7) with a predetermined first howling detecting threshold value to detect howling bandwidth power ratios and howling frequency bandwidths respectively corresponding to said howling bandwidth power ratios in said signal unit each of which exceeds said first howling detecting threshold value from among said bandwidth power ratios;

(g9) respectively counting the number of target signal units in which said howling bandwidth power ratios are detected by said step (g8) with respect to said howling frequency bandwidths; and (g10) judging whether a howling sound component is present or not for each of said howling frequency bandwidths by comparing the number of target signal units counted by said step (g9) with respect to each of said howling frequency bandwidths detected by said step (g8) and a predetermined second howling detecting threshold value to detect howling sound frequency signal bandwidths each in which it is judged that said howling sound component is present because of the fact that the number of target signal units counted by said step (g9) with respect to said howling frequency bandwidth exceeds said second howling detecting threshold value and non-howling sound frequency signal bandwidths each in which it is judged that said howling sound component is not present because of the fact that the number of target signal units counted by said step (g9) with respect to said howling frequency bandwidth does not exceed said second howling detecting threshold value.

48. A howling detecting and suppressing method as set forth in claim 47, in which said step (g) has a step of generating judging information indicating a howling sound frequency signal bandwidth corresponding to a howling frequency bandwidth, transferring said judging information and said total average value of said smoothed bandwidth powers to said step (f), and stopping operations of said step (g6), said step (g7), said step (g8), said step (g9), and said step (g10) with respect to said howling frequency bandwidth when said howling sound frequency signal bandwidth is detected by said step (g), and said step (f) has a step of inputting judging information indicating a howling sound frequency signal bandwidth corresponding to a howling frequency bandwidth and said total average value of said smoothed bandwidth powers generated when said howling sound frequency signal bandwidth is detected by said step (g), said step (f) includes the steps of:

(f1-1) storing said total average value of said smoothed bandwidth powers generated when said howling sound frequency signal bandwidth is detected by said step (g);

(f1) calculating a reference power ratio by dividing a smoothed bandwidth power of an adapted reference frequency signal bandwidth with respect to said howling frequency bandwidth generated by said step (g5) by said total average value of said smoothed bandwidth powers stored by said step (f1-1) to generate a reference power ratio with respect to said howling frequency bandwidth;

(f2) comparing said reference power ratio with respect to said howling frequency bandwidth generated by said step (f1) with a predetermined gain control threshold value to judge if said reference power ratio with respect to said howling frequency bandwidth is to be processed in a gain adjusting manner on the basis of the result of the comparison;

(f3) setting an adjusted gain value for said howling sound frequency signal bandwidth when it is judged by said step (f2) that said reference power ratio with respect to said howling frequency bandwidth is to be processed in a gain adjusting manner or setting a gain through value for said howling sound frequency signal bandwidth when it is judged by said step (f2) that said reference power ratio with respect to said howling frequency bandwidth is not to be processed in a gain adjusting manner to generate an adjusted gain value for said howling sound frequency signal bandwidth; and (f4) respectively adjusting gains for said sound frequency signal bandwidths converted by said step (e) by multiplying the gains of said howling sound frequency signal bandwidths detected by said step (g) by said adjusted gain value generated by said step (f3), and passing through said non-howling sound frequency signal bandwidths detected by said step (g), whereby said step (f2) has a step of generating a control signal indicating that said step (f2) is not operating with respect to said howling frequency bandwidth when it is judged by said step (f2) that said reference power ratio with respect to said howling frequency bandwidth is not to be processed in a gain adjusting manner, and said signal step (g) has a step of resuming operations of said step (g6), said step (g7), said step (g8), said step (g9), and said step (g10) with respect to said howling frequency bandwidth when said control signal with respect to said howling frequency bandwidth is received by said step (g).

49. A computer program product comprising a computer usable storage medium having computer readable code embodied therein for detecting and suppressing howling sound components, said computer readable code comprising:

a computer readable program code (a) for converting a plurality of sound time signal segments each corresponding to a time segment into a plurality of sound frequency signal segments each corresponding to a frequency segment;

a computer readable program code (b) for respectively adjusting gains for said sound frequency signal segments converted by said computer readable program code (a) to generate howling-suppressed sound frequency signal segments;

a computer readable program code (c) for judging whether a howling sound component is present or not for each of said howling-suppressed sound frequency signal segments generated by said computer readable program code (b) to detect howling sound frequency signal segments each in which it is judged that said howling sound component is present and non-howling sound frequency signal segments each in which it is judged that said howling sound component is not present; and a computer readable program code (d) for synthesizing said howling-suppressed sound frequency signal segments suppressed by said computer readable program code (b) to generate howling-suppressed sound time signal segments, and in which said computer readable program code (b) has a computer readable program code for respectively adjusting gains for said sound frequency signal segments converted by said computer readable program code (a) by changing the gains of said howling sound frequency signal segments detected by said computer readable program code (c) and passing through said non-howling sound frequency signal segments detected by said computer readable program code (c), said computer readable program code (a) has a computer readable program code for converting a plurality of sound time signal segments collected for a predetermined number of sample periods into a plurality of sound frequency signal segments collectively forming one frame;

said computer readable program code (c) includes:

a computer readable program code (c1) for respectively delaying said howling-suppressed sound frequency signal segments collectively forming a frame generated by said computer readable program code (b) for a predetermined number of frames to be outputted as reference frequency signal segments collectively forming a frame;

a computer readable program code (c2) for respectively convolving said reference frequency signal segments outputted by said computer readable program code (c1) with coefficients to generate adapted reference frequency signal segments collectively forming a frame;

a computer readable program code (c3) for respectively updating said coefficients on the basis of said sound howling-suppressed sound frequency signal segments generated by said computer readable program code (b), said reference frequency signal segments outputted by said computer readable program code (c1), and said adapted reference frequency signal segments generated by said computer readable program code (c2);

a computer readable program code (c4) for respectively calculating frequency signal powers of said adapted reference frequency signal segments collectively forming a frame generated by said computer readable program code (c2);

a computer readable program code (c5) for respectively smoothing said frequency signal powers of said adapted reference frequency signal segments collectively forming a frame calculated by said computer readable program code (c4) to generate smoothed frequency signal powers of said adapted reference frequency signal segments collectively forming a frame;

a computer readable program code (c6) for inputting said smoothed frequency signal powers of said adapted reference frequency signal segments collectively forming a frame generated by said computer readable program code (c5) to calculate a total average value of said smoothed frequency signal powers of said frame;

a computer readable program code (c7) for inputting frequency signal power ratios of said smoothed frequency signal powers of said adapted reference frequency signal segments collectively forming said frame generated by said computer readable program code (c5) to respectively calculate frequency signal power ratios of said smoothed frequency signal powers of said adapted reference frequency signal segments thus inputted to said total average value of said frequency signal powers of said frame calculated by said computer readable program code (c6) to respectively generate frequency signal power ratios each corresponding to frequency segments in said frame;

a computer readable program code (c8) for respectively comparing said frequency signal power ratios in said frame calculated by said computer readable program code (c7) with a predetermined first howling detecting threshold value to detect howling frequency signal power ratios and howling frequency segments respectively corresponding to said howling frequency signal power ratios in said frame each of which exceeds said first howling detecting threshold value from among said frequency signal power ratios;

a computer readable program code (c9) for respectively counting the number of target frames in which said howling frequency signal power ratios are detected by said computer readable program code (c8) with respect to said howling frequency segments; and a computer readable program code (c10) for judging whether a howling sound component is present or not for each of said howling frequency segments by comparing the number of target frames counted by said computer readable program code (c9) with respect to each of said howling frequency segments detected by said computer readable program code (c8) and a predetermined second howling detecting threshold value to detect howling sound frequency signal segments each in which it is judged that said howling sound component is present because of the fact that the number of target frames counted by said computer readable program code (c9) with respect to said howling frequency segment exceeds said second howling detecting threshold value and non-howling sound frequency signal segments each in which it is judged that said howling sound component is not present because of the fact that the number of target frames counted by said computer readable program code (c9) with respect to said howling frequency segment does not exceed said second howling detecting threshold value.

50. A computer program product as set forth in claim 49, in which said computer readable program code (c) has computer readable program codes for generating judging information indicating a howling sound frequency signal segment corresponding to a howling frequency segment, transferring said judging information and said total average value of said smoothed frequency signal powers to said computer readable program code (b), and stopping operations of said computer readable program code (c6), said computer readable program code (c7), said computer readable program code (c8), said computer readable program code (c9), and said computer readable program code (c10) with respect to said howling frequency segment when said howling sound frequency signal segment is detected by said computer readable program code (c), and said computer readable program code (b) has a computer readable program code for inputting judging information indicating a howling sound frequency signal segment corresponding to a howling frequency segment and said total average value of said smoothed frequency signal powers generated when said howling sound frequency signal segment is detected by said computer readable program code (c), said computer readable program code (b) includes:

a computer readable program code (b1-1) for storing said total average value of said smoothed frequency signal powers generated when said howling sound frequency signal segment is detected by said computer readable program code (c);

a computer readable program code (b1) for calculating a reference power ratio by dividing a smoothed frequency signal power of an adapted reference frequency signal segment with respect to said howling frequency segment generated by said computer readable program code (c5) in said total average value of said smoothed frequency signal powers stored by said computer readable program code (b1-1) to generate a reference power ratio with respect to said howling frequency segment;

a computer readable program code (b2) for comparing said reference power ratio with respect to said howling frequency segment generated by said computer readable program code (b1) with a predetermined gain control threshold value to judge if said reference power ratio with respect to said howling frequency segment is to be processed in a gain adjusting manner on the basis of the result of the comparison;

a computer readable program code (b3) for setting an adjusted gain value for said howling sound frequency signal segment when it is judged by said computer readable program code (b2) that said reference power ratio with respect to said howling frequency segment is to be processed in a gain adjusting manner or setting a gain through value for said howling sound frequency signal segment when it is judged by said computer readable program code (b2) that said reference power ratio with respect to said howling frequency segment is not to be processed in a gain adjusting manner to generate an adjusted gain value for said howling sound frequency signal segment; and a computer readable program code (b4) for respectively adjusting gains for said sound frequency signal segments converted by said computer readable program code (a) by multiplying the gains of said howling sound frequency signal segments detected by said computer readable program code (c) in said adjusted gain value generated by said computer readable program code (b3), and passing through said non-howling sound frequency signal segments detected by said computer readable program code (c), whereby said computer readable program code (b2) has a computer readable program code for generating a control signal indicating that said computer readable program code (b2) is not operating with respect to said howling frequency segment when it is judged by said computer readable program code (b2) that said reference power ratio with respect to said howling frequency segment is not to be processed in a gain adjusting manner, and said signal computer readable program code (c) has a computer readable program code for resuming operations of said computer readable program code (c6), said computer readable program code (c7), said computer readable program code (c8), said computer readable program code (c9), and said computer readable program code (c10) with respect to said howling frequency segment when said control signal with respect to said howling frequency segment is received by said computer readable program code (c).

51. A computer program product comprising a computer usable storage medium having computer readable code embodied therein for detecting and suppressing howling sound components, said computer readable code comprising:

a computer readable program code (a) for converting a plurality of sound time signal segments each corresponding to a time segment into a plurality of sound frequency signal segments each corresponding to a frequency segment;

a computer readable program code (b) for respectively adjusting gains for said sound frequency signal segments converted by said computer readable program code (a) to generate howling-suppressed sound frequency signal segments;

a computer readable program code (c) for judging whether a howling sound component is present or not for each of said howling-suppressed sound frequency signal segments generated by said computer readable program code (b) to detect howling sound frequency signal segments each in which it is judged that said howling sound component is present and non-howling sound frequency signal segments each in which it is judged that said howling sound component is not present; and a computer readable program code (d) for synthesizing said howling-suppressed sound frequency signal segments suppressed by said computer readable program code (b) to generate howling-suppressed sound time signal segments, and in which said computer readable program code (b) has a computer readable program code for respectively adjusting gains for said sound frequency signal segments converted by said computer readable program code (a) by changing the gains of said howling sound frequency signal segments detected by said computer readable program code (c) and passing through said non-howling sound frequency signal segments detected by said computer readable program code (c), said computer readable program code (a) has a computer readable program code for converting a plurality of sound time signal segments collected for a predetermined number of sample periods into a plurality of sound frequency signal segments collectively forming one frame;

said computer readable program code (c) includes:

a computer readable program code (c31) for respectively delaying said howling-suppressed sound frequency signal segments collectively forming a frame generated by said computer readable program code (b) for a predetermined number of frames to be outputted as reference frequency signal segments collectively forming a frame;

a computer readable program code (c32) for respectively convolving said reference frequency signal segments outputted by said computer readable program code (c31) with coefficients to generate adapted reference frequency signal segments collectively forming a frame;

a computer readable program code (c33) for respectively updating said coefficients on the basis of said sound howling-suppressed sound frequency signal segments generated by said computer readable program code (b), said reference frequency signal segments outputted by said computer readable program code (c31), and said adapted reference frequency signal segments generated by said computer readable program code (c32), said adapted reference frequency signal segments divided into a number of frequency bands;

a computer readable program code (c34) for respectively calculating frequency band powers of said frequency bands of said adapted reference frequency signal segments collectively forming a frame generated by said computer readable program code (c32);

a computer readable program code (c35) for respectively smoothing said frequency band powers of said frequency bands collectively forming a frame calculated by said computer readable program code (c34) to generate smoothed frequency band powers of said frequency bands collectively forming a frame;

a computer readable program code (c36) for inputting said smoothed frequency band powers of said frequency bands collectively forming a frame generated by said computer readable program code (c35) to calculate a total average value of said smoothed frequency band powers of said frame;

a computer readable program code (c37) for inputting frequency band power ratios of said smoothed frequency band powers of said frequency bands collectively forming said frame generated by said computer readable program code (c35) to respectively calculate frequency band power ratios of said smoothed frequency band powers of said frequency bands thus inputted to said total average value of said frequency band powers of said frame calculated by said computer readable program code (c36) to respectively generate frequency band power ratios each corresponding to frequency bands in said frame;

a computer readable program code (c38) for respectively comparing said frequency band power ratios in said frame calculated by said computer readable program code (c37) with a predetermined first howling detecting threshold value to detect howling frequency band power ratios and howling frequency bands respectively corresponding to said howling frequency band power ratios in said frame each of which exceeds said first howling detecting threshold value from among said frequency band power ratios;

a computer readable program code (c39) for respectively counting the number of target frames in which said howling frequency band power ratios are detected by said computer readable program code (c38) with respect to said howling frequency bands; and a computer readable program code (c40) for judging whether a howling sound component is present or not for each of said howling frequency bands by comparing the number of target frames counted by said computer readable program code (c39) with respect to each of said howling frequency bands detected by said computer readable program code (c38) and a predetermined second howling detecting threshold value to detect howling sound frequency bands each in which it is judged that said howling sound component is present because of the fact that the number of target frames counted by said computer readable program code (c39) with respect to said howling frequency band exceeds said second howling detecting threshold value and non-howling sound frequency bands each in which it is judged that said howling sound component is not present because of the fact that the number of target frames counted by said computer readable program code (c39) with respect to said howling frequency band does not exceed said second howling detecting threshold value.

52. A computer program product as set forth in claim 51, in which said computer readable program code (c) has computer readable program codes for generating judging information indicating a howling frequency band, transferring said judging information and said total average value of said smoothed frequency band powers to said computer readable program code (b), and stopping operations of said computer readable program code (c36), said computer readable program code (c37), said computer readable program code (c38), said computer readable program code (c39), and said computer readable program code (c40) with respect to said howling frequency band when said howling sound frequency band is detected by said computer readable program code (c), and said computer readable program code (b) has a computer readable program code for inputting judging information indicating a howling frequency band and said total average value of said smoothed frequency band powers generated when said howling sound frequency band is detected by said computer readable program code (c), said computer readable program code (b) includes:

a computer readable program code (b31-1) for storing said total average value of said smoothed frequency band powers generated when said howling sound frequency band is detected by said computer readable program code (c);

a computer readable program code (b31) for calculating a reference power ratio by dividing a smoothed frequency band power of a frequency band with respect to said howling frequency band generated by said computer readable program code (c35) by said total average value of said smoothed frequency band powers stored by said computer readable program code (b31-1) to generate a reference power ratio with respect to said howling frequency band;

a computer readable program code (b32) for comparing said reference power ratio with respect to said howling frequency band generated by said computer readable program code (b31) with a predetermined gain control threshold value to judge if said reference power ratio with respect to said howling frequency band is to be processed in a gain adjusting manner on the basis of the result of the comparison;

a computer readable program code (b33) for setting an adjusted gain value for said howling sound frequency band when it is judged by said computer readable program code (b32) that said reference power ratio with respect to said howling frequency band is to be processed in a gain adjusting manner or setting a gain through value for said howling sound frequency band when it is judged by said computer readable program code (b32) that said reference power ratio with respect to said howling frequency band is not to be processed in a gain adjusting manner to generate an adjusted gain value for said howling sound frequency band; and a computer readable program code (b34) for respectively adjusting gains for said sound frequency signal segments converted by said computer readable program code (a) by multiplying the gains of said howling sound frequency bands detected by said computer readable program code (c) by said adjusted gain value generated by said computer readable program code (b33), and passing through said non-howling sound frequency bands detected by said computer readable program code (c), whereby said computer readable program code (b32) has a computer readable program code for generating a control signal indicating that said computer readable program code (b32) is not operating with respect to said howling frequency band when it is judged by said computer readable program code (b32) that said reference power ratio with respect to said howling frequency band is not to be processed in a gain adjusting manner, and said signal computer readable program code (c) has a computer readable program code for resuming operations of said computer readable program code (c36), said computer readable program code (c37), said computer readable program code (c38), said computer readable program code (c39), and said computer readable program code (c40) with respect to said howling frequency band when said control signal is received by said computer readable program code (c) with respect to said howling frequency band.

53. A computer program product comprising a computer usable storage medium having computer readable code embodied therein for detecting and suppressing howling sound components comprising:

a computer readable program code (e) for converting a plurality of sound time signal segments each corresponding to a time segment into a plurality of sound frequency signal bandwidths each corresponding to a frequency bandwidth:

a computer readable program code (f) for respectively adjusting gains for said sound frequency signal bandwidths converted by said computer readable program code (e) to generate howling-suppressed sound frequency signal bandwidths:

a computer readable program code (g) for judging whether a howling sound component is present or not for each of said howling-suppressed sound frequency signal bandwidths generated by said computer readable program code (f) to detect howling sound frequency signal bandwidths each in which it is judged that said howling sound component is present and non-howling sound frequency signal bandwidths each in which it is judged that said howling sound component is not present; and a computer readable program code (h) for synthesizing said howling-suppressed sound frequency signal bandwidths suppressed by said computer readable program code (f) to generate howling-suppressed sound time signal segments, and in which said computer readable program code (f) has a computer readable program code for respectively adjusting gains for said sound frequency signal bandwidths converted by said computer readable program code (e) by changing the gains of said howling sound frequency signal bandwidths detected by said computer readable program code (g) and passing through said non-howling sound frequency signal bandwidths detected by said computer readable program code (g);

said computer readable program code (e) has a computer readable program code for converting a plurality of sound time signal segments collected for a predetermined number of sample periods into a plurality of sound frequency signal bandwidths collectively forming one signal unit;

said computer readable program code (g) includes:

a computer readable program code (g1) for respectively delaying said howling-suppressed sound frequency signal bandwidths collectively forming a signal unit generated by said computer readable program code (f) for a predetermined number of signal units to be outputted as reference frequency signal bandwidths collectively forming a signal unit;

a computer readable program code (g2) for respectively convolving said reference frequency signal bandwidths outputted by said computer readable program code (g1) with coefficients to generate adapted reference frequency signal bandwidths collectively forming a signal unit;

a computer readable program code (g3) for respectively updating said coefficients on the basis of said sound howling-suppressed sound frequency signal bandwidths generated by said computer readable program code (f), said reference frequency signal bandwidths outputted by said computer readable program code (g1), and said adapted reference frequency signal bandwidths generated by said computer readable program code (g2);

a computer readable program code (g4) for respectively calculating bandwidth powers of said adapted reference frequency signal bandwidths collectively forming a signal unit generated by said computer readable program code (g2);

a computer readable program code (g5) for respectively smoothing said bandwidth powers of said adapted reference frequency signal bandwidths collectively forming a signal unit calculated by said computer readable program code (g4) to generate smoothed bandwidth powers of said adapted reference frequency signal bandwidths collectively forming a signal unit;

a computer readable program code (g6) for inputting said smoothed bandwidth powers of said adapted reference frequency signal bandwidths collectively forming a signal unit generated by said computer readable program code (g5) to calculate a total average value of said smoothed bandwidth powers of said signal unit;

a computer readable program code (g7) for inputting bandwidth power ratios of said smoothed bandwidth powers of said adapted reference frequency signal bandwidths collectively forming said signal unit generated by said computer readable program code (g5) to respectively calculate bandwidth power ratios of said smoothed bandwidth powers of said adapted reference frequency signal bandwidths thus inputted to said total average value of said bandwidth powers of said signal unit calculated by said computer readable program code (g6) to respectively generate bandwidth power ratios each corresponding to frequency bandwidths in said signal unit;

a computer readable program code (g8) for respectively comparing said bandwidth power ratios in said signal unit calculated by said computer readable program code (g7) with a predetermined first howling detecting threshold value to detect howling bandwidth power ratios and howling frequency bandwidths respectively corresponding to said howling bandwidth power ratios in said signal unit each of which exceeds said first howling detecting threshold value from among said bandwidth power ratios;

a computer readable program code (g9) for respectively counting the number of target signal units in which said howling bandwidth power ratios are detected by said computer readable program code (g8) with respect to said howling frequency bandwidths; and a computer readable program code (g10) for judging whether a howling sound component is present or not for each of said howling frequency bandwidths by comparing the number of target signal units counted by said computer readable program code (g9) with respect to each of said howling frequency bandwidths detected by said computer readable program code (g8) and a predetermined second howling detecting threshold value to detect howling sound frequency signal bandwidths each in which it is judged that said howling sound component is present because of the fact that the number of target signal units counted by said computer readable program code (g9) with respect to said howling frequency bandwidth exceeds said second howling detecting threshold value and non-howling sound frequency signal bandwidths each in which it is judged that said howling sound component is not present because of the fact that the number of target signal units counted by said, computer readable program code (g9) with respect to said howling frequency bandwidth does not exceed said second howling detecting threshold value.

54. A computer program product as set forth in claim 53, in which said computer readable program code (g) has a computer readable program code for generating judging information indicating a howling sound frequency signal bandwidth corresponding to a howling frequency bandwidth, transferring said judging information and said total average value of said smoothed bandwidth powers to said computer readable program code (f), and stopping operations of said computer readable program code (g6), said computer readable program code (g7), said computer readable program code (g8), said computer readable program code (g9), and said computer readable program code (g10) with respect to said howling frequency bandwidth when said howling sound frequency signal bandwidth is detected by said computer readable program code (g), said computer readable program code (f) has a computer readable program code for inputting judging information indicating a howling sound frequency signal bandwidth corresponding to a howling frequency bandwidth and said total average value of said smoothed bandwidth powers generated when said howling sound frequency signal bandwidth is detected by said computer readable program code (g), said computer readable program code (f) includes: a computer readable program code (f1-1) for storing said total average value of said smoothed bandwidth powers generated when said howling sound frequency signal bandwidth is detected by said computer readable program code (g);

a computer readable program code (f1) for calculating a reference power ratio by dividing a smoothed bandwidth power of an adapted reference frequency signal bandwidth with respect to said howling frequency bandwidth generated by said computer readable program code (g5) by said total average value of said smoothed bandwidth powers stored by said computer readable program code (f1-1) to generate a reference power ratio with respect to said howling frequency bandwidth;

a computer readable program code (f2) for comparing said reference power ratio with respect to said howling frequency bandwidth generated by said computer readable program code (f1) with a predetermined gain control threshold value to judge if said reference power ratio with respect to said howling frequency bandwidth is to be processed in a gain adjusting manner on the basis of the result of the comparison;

a computer readable program code (f3) for setting an adjusted gain value for said howling sound frequency signal bandwidth when it is judged by said computer readable program code (f2) that said reference power ratio with respect to said howling frequency bandwidth is to be processed in a gain adjusting manner or setting a gain through value for said howling sound frequency signal bandwidth when it is judged by said computer readable program code (f2) that said reference power ratio with respect to said howling frequency bandwidth is not to be processed in a gain adjusting manner to generate an adjusted gain value for said howling sound frequency signal bandwidth; and a computer readable program code (f4) for respectively adjusting gains for said sound frequency signal bandwidths converted by said computer readable program code (e) by multiplying the gains of said howling sound frequency signal bandwidths detected by said computer readable program code (g) by said adjusted gain value generated by said computer readable program code (f3), and passing through said non-howling sound frequency signal bandwidths detected by said computer readable program code (g), whereby said computer readable program code (f2) has a computer readable program code for generating a control signal indicating that said computer readable program code (f2) is not operating with respect to said howling frequency bandwidth when it is judged by said computer readable program code (f2) that said reference power ratio with respect to said howling frequency bandwidth is not to be processed in a gain adjusting manner, and said signal computer readable program code (g) has a computer readable program code for resuming operations of said computer readable program code (g6), said computer readable program code (g7), said computer readable program code (g8), said computer readable program code (g9), and said computer readable program code (g10) with respect to said howling frequency bandwidth when said control signal with respect to said howling frequency bandwidth is received by said computer readable program code (g).

* * * * *